US012581010B2

(12) United States Patent 
Lee et al.

(10) Patent No.: US 12,581,010 B2 
(45) Date of Patent: Mar. 17, 2026

(54) METHOD FOR PROCESSING CONTENT AND ELECTRONIC DEVICE SUPPORTING THE SAME

(71) Applicant: Samsung Electronics Co., Ltd., Suwon-si (KR)

(72) Inventors: Younsun Lee, Suwon-si (KR); Juyoung Kim, Suwon-si (KR); Changhwan Kim, Suwon-si (KR); Hyunjung Moon, Suwon-si (KR); Sungchan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 18/461,915

(22) Filed: Sep. 6, 2023

(65) Prior Publication Data

US 2024/0080387 A1 Mar. 7, 2024

Related U.S. Application Data

(63) Continuation of application No. PCT/KR2023/013368, filed on Sep. 6, 2023.

(30) Foreign Application Priority Data

Sep. 6, 2022 (KR) ........................ 10-2022-0112632 
Oct. 19, 2022 (KR) ........................ 10-2022-0134975

(51) Int. Cl. 
*H04M 1/72469* (2021.01) 
*G06F 3/04842* (2022.01) 
(Continued)

(52) U.S. Cl. 
CPC .... *H04M 1/72469* (2021.01); *G06F 3/04842* (2013.01); *G06F 3/04886* (2013.01); *H04M 1/0214* (2013.01)

(58) Field of Classification Search 
CPC ........... H04M 1/72469; H04M 1/0214; H04M 2250/16; G06F 3/04842; G06F 3/04886; G06F 1/1616; G06F 2203/04803 
See application file for complete search history.

(56) References Cited

U.S. PATENT DOCUMENTS

2006/0238494 A1 10/2006 Narayanaswami et al. 
2010/0201645 A1 8/2010 Asami 
(Continued)

FOREIGN PATENT DOCUMENTS

CN 113923298 A 1/2022 
CN 114666427 A 6/2022 
(Continued)

OTHER PUBLICATIONS

International Search Report dated Dec. 8, 2023, International Application No. PCT/KR2023/013368.

*Primary Examiner* — Cao H Nguyen 
(74) *Attorney, Agent, or Firm* — Jefferson IP Law, LLP

(57) ABSTRACT

An electronic device is provided. The electronic device includes a display module including a plurality of displays, and at least one processor operatively connected with the display module, wherein the at least one processor is configured to identify one or more user inputs to a first display among the plurality of displays, select a content from among one or more content displayed on the first display, based on the identified one or more user inputs, identify a distance from one end of the electronic device to the selected content, based on a position of the selected content, and display the selected content on at least a partial area of a second display among the plurality of displays based on the identified distance, in response to detecting a folding event of the electronic device, wherein the at least a partial area of the (Continued)

second display is distanced away from the one end of the electronic device by the identified distance.

20 Claims, 35 Drawing Sheets

(51) Int. Cl.
   G06F 3/04886    (2022.01)
   H04M 1/02    (2006.01)

(56)    References Cited

U.S. PATENT DOCUMENTS

| | | | |
|---|---|---|---|
| 2013/0300661 A1 | 11/2013 | Ezra et al. | |
| 2015/0177962 A1 | 6/2015 | Seong et al. | |
| 2015/0212692 A1 | 7/2015 | Hyun et al. | |
| 2015/0338888 A1 | 11/2015 | Kim et al. | |
| 2016/0139760 A1 | 5/2016 | Xu | |
| 2020/0167033 A1 | 5/2020 | Kim et al. | |
| 2020/0174646 A1* | 6/2020 | Park | G06F 3/0486 |
| 2021/0089177 A1 | 3/2021 | Cho | |
| 2021/0096725 A1 | 4/2021 | Garg et al. | |
| 2021/0120207 A1* | 4/2021 | Lee | H04N 7/142 |
| 2022/0303379 A1* | 9/2022 | Lee | G06F 3/0488 |
| 2022/0317847 A1 | 10/2022 | Kim et al. | |
| 2023/0152966 A1 | 5/2023 | Kim | |

FOREIGN PATENT DOCUMENTS

| | | | |
|---|---|---|---|
| JP | 2013-543998 A | 12/2013 | |
| JP | 2014-021528 A | 2/2014 | |
| JP | 2014-209334 A | 11/2014 | |
| KR | 10-2015-0089813 A | 8/2015 | |
| KR | 10-2019-0001076 A | 1/2019 | |
| KR | 10-2020-0064792 A | 6/2020 | |
| KR | 10-2021-0037542 A | 4/2021 | |
| KR | 10-2021-0045187 A | 4/2021 | |
| KR | 10-2021-0082910 A | 7/2021 | |
| KR | 10-2022-0010995 A | 1/2022 | |
| KR | 10-2022-0058543 A | 5/2022 | |
| KR | 10-2022-0064850 A | 5/2022 | |
| KR | 10-2432119 B1 | 8/2022 | |

* cited by examiner

900

1000

START

IDENTIFY USER INPUT TO FIRST DISPLAY ～1001

SELECT CONTENT DISPLAYED
THROUGH FIRST DISPLAY ～1003

IDENTIFY DISTANCE FROM ONE END OF
ELECTRONIC DEVICE TO SELECTED CONTENT ～1005

DISPLAY SELECTED CONTENT THROUGH SECOND
DISPLAY BASED ON IDENTIFIED DISTANCE IN
RESPONSE TO DETECTING FOLDING EVENT ～1007

END

1600

START

DISPLAY FIRST WINDOW AND SECOND
WINDOW THROUGH FIRST DISPLAY — 1601

IDENTIFY USER INPUTS TO FIRST WINDOW AND SECOND WINDOW — 1603

SELECT CONTENT CORRESPONDING TO USER INPUT
CLOSER IN DISTANCE TO ONE END OF ELECTRONIC DEVICE — 1605

DISPLAY WINDOW CORRESPONDING TO SELECTED
CONTENT AND SELECTED CONTENT THROUGH SECOND DISPLAY,
BASED ON DETECTING FOLDING EVENT — 1607

END

2100

START

DETECT EVENT ASSOCIATED WITH CHANGE IN CONTENT AREA — 2101

DISPLAY BOUNDING BOX THROUGH FIRST DISPLAY — 2103

CHANGE CONTENT AREA BASED ON
USER INPUT TO BOUNDING BOX — 2105

IDENTIFY DISTANCE FROM ONE END OF ELECTRONIC
DEVICE TO CONTENT IN CHANGED AREA — 2107

DISPLAY CONTENT IN CHANGED AREA THROUGH SECOND
DISPLAY, BASED ON DETECTING FOLDING EVENT — 2109

END

METHOD FOR PROCESSING CONTENT AND ELECTRONIC DEVICE SUPPORTING THE SAME

CROSS-REFERENCE TO RELATED APPLICATION(S)

This application is a continuation application, claiming priority under § 365(c), of an International application No. PCT/KR2023/013368, filed on Sep. 6, 2023, which is based on and claims the benefit of a Korean patent application number 10-2022-0112632, filed on Sep. 6, 2022, in the Korean Intellectual Property Office, and of a Korean patent application number 10-2022-0134975, filed on Oct. 19, 2022, in the Korean Intellectual Property Office, the disclosure of each of which is incorporated by reference herein in its entirety.

TECHNICAL FIELD

The disclosure relates to a method for processing content and an electronic device supporting the same.

BACKGROUND ART

Electronic device may refer to a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, etc. For example, the electronic devices may output stored information as voices or images. As electronic devices are highly integrated, and high-speed or high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. These electronic devices have been downsized to be conveniently carried by users.

As mobile communication services spread up to multimedia services, users may use multimedia services as well as voice calls or text messaging, on their electronic device. To rid the user of any inconvenience in using multimedia services, a trend is to pack an electronic device with a larger display. Recently, flexible display-equipped foldable electronic devices come along.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide a method for processing content and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a display module including a plurality of displays and at least one processor operatively connected with the display module. The at least one processor may be configured to identify one or more user inputs to a first display among the plurality of displays. The at least one processor may be configured to select a content from among one or more content displayed on the first display, based on the identified one or more user inputs. The at least one processor may be configured to identify a distance from one end of the electronic device to the selected content, based on a position of the selected content. The at least one processor may be configured to display the selected content on at least a partial area of a second display among the plurality of displays based on the identified distance, in response to detecting a folding event of the electronic device, wherein the at least a partial area of the second display is distanced away from the one end of the electronic device by the identified distance.

In accordance with another aspect of the disclosure, a method for processing content by an electronic device is provided. The method includes identifying one or more user inputs to a first display among a plurality of displays of the electronic device. The method includes selecting a content from among one or more content displayed on the first display, based on the identified one or more user inputs. The method includes identifying a distance from one end of the electronic device to the selected content, based on a position of the selected content. The method includes displaying the selected content on at least a partial area of a second display among the plurality of displays based on the identified distance, in response to detecting a folding event of the electronic device, wherein the at least a partial area of the second display is distanced away from the one end of the electronic device by the identified distance.

According to an embodiment of the disclosure, in a non-transitory computer readable storage medium storing instructions, the instructions may be configured to, when executed by at least one processor of an electronic device, cause the electronic device to perform operations. The operations include identifying one or more user inputs to a first display among a plurality of displays of the electronic device. The operations include selecting a content from among one or more content displayed on the first display, based on the identified one or more user inputs. The operations include identifying a distance from one end of the electronic device to the selected content, based on a position of the selected content. The operations include displaying the selected content on at least a partial area of a second display among the plurality of displays based on the identified distance, in response to detecting a folding event of the electronic device, wherein the at least a partial area of the second display is distanced away from the one end of the electronic device by the identified distance.

Other aspects advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
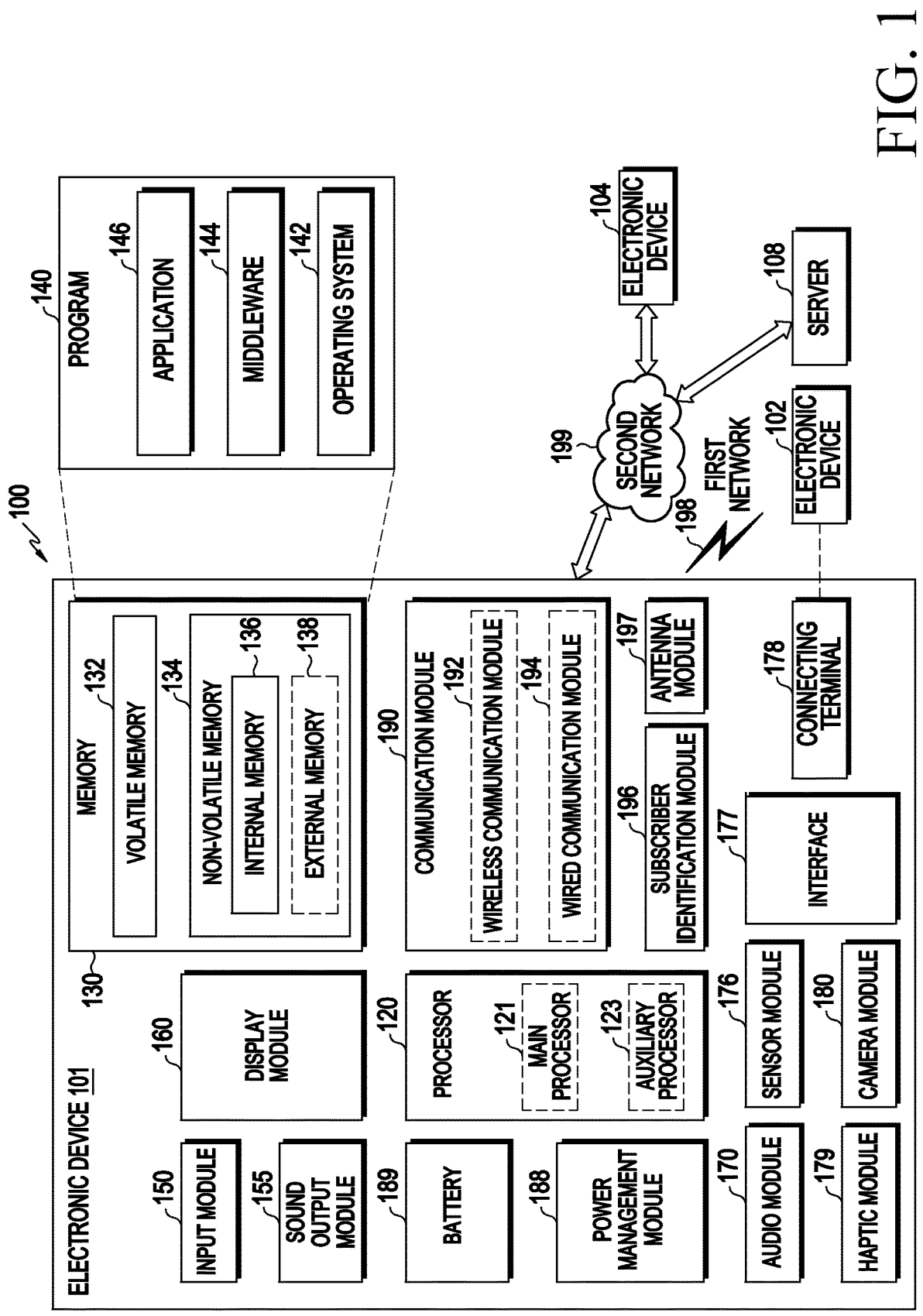
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
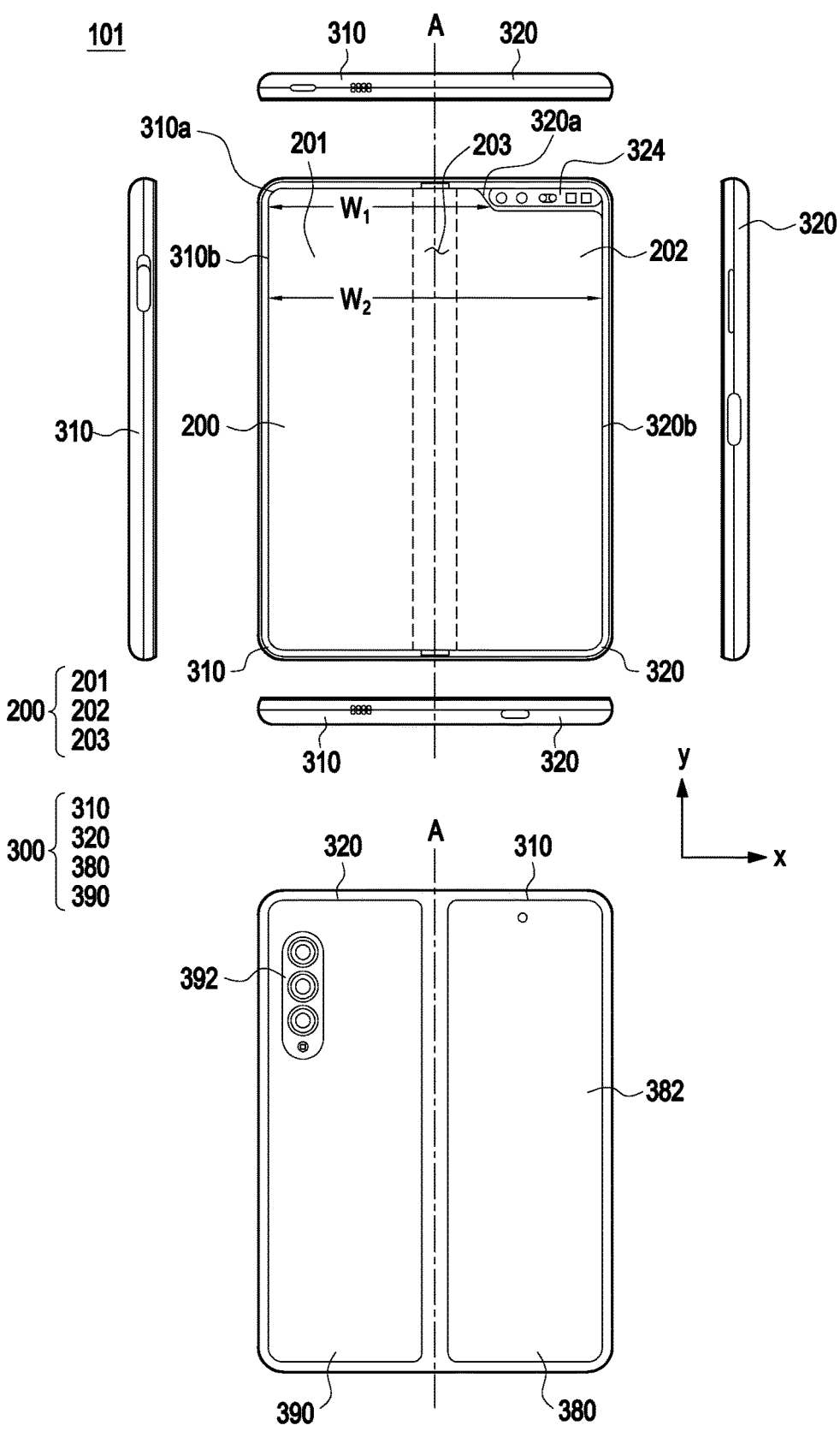
FIG. 2 is a view illustrating an unfolded state of an electronic device according to an embodiment of the disclosure.

FIG. 2 is a view illustrating an unfolded state of an electronic device according to an embodiment of the disclosure.

Figure 3:
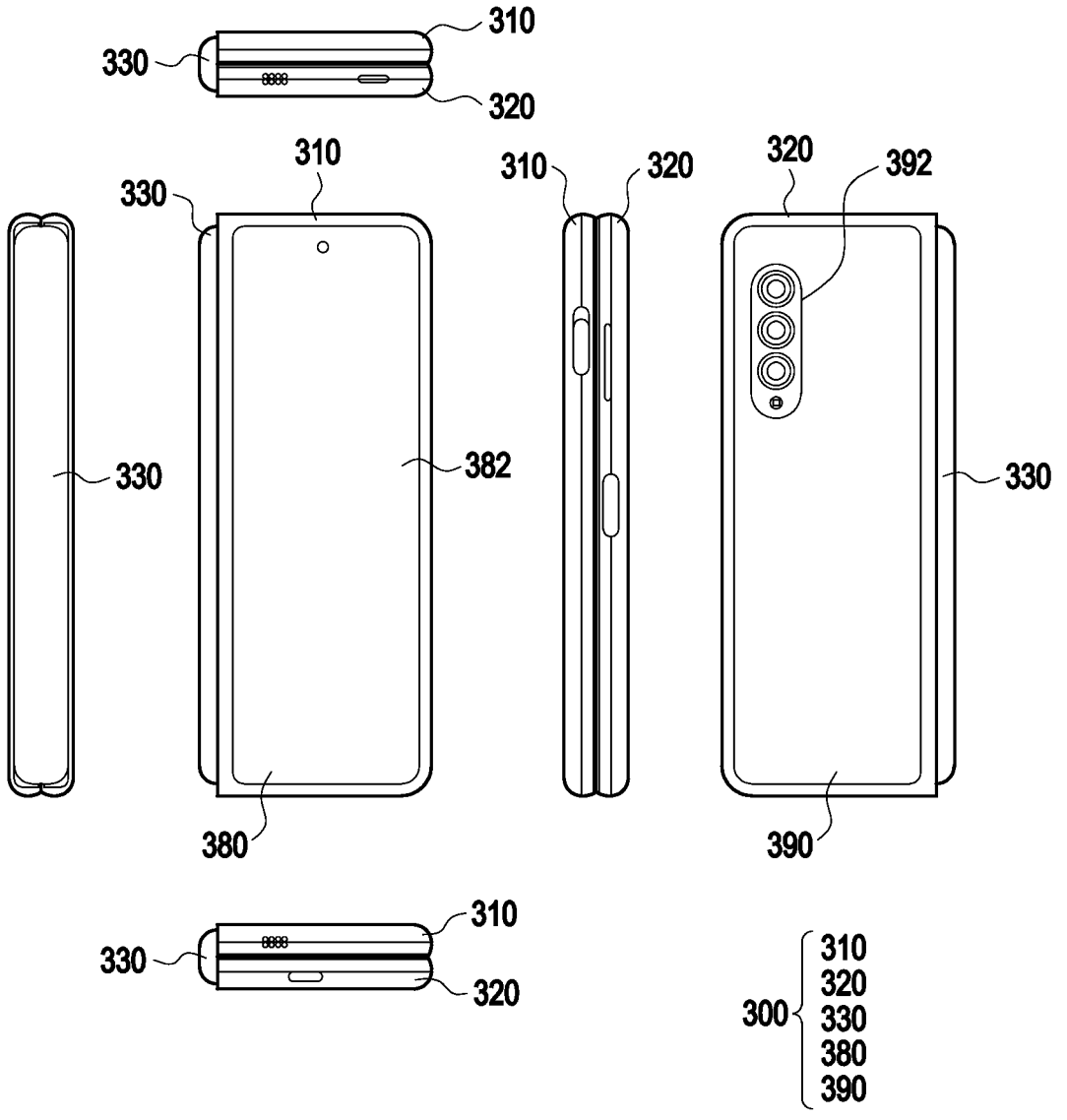
FIG. 3 is a view illustrating a folded state of an electronic device according to an embodiment of the disclosure.

FIG. 3 is a view illustrating a folded state of an electronic device according to an embodiment of the disclosure.

Referring to FIGS. 2 and 3, according to an embodiment, an electronic device 101 may include a foldable housing 300, a hinge cover 330 covering a foldable portion of the foldable housing 300, and a flexible or foldable display 200 (hereinafter, simply "display 200") (e.g., the display module 160 of FIG. 1) disposed in a space formed by the foldable housing 300. According to an embodiment, the surface where the flexible display 200 is disposed (or the surface where the display 200 is viewed from the outside of the electronic device 101) may be defined as the front surface of the electronic device 101. The opposite surface of the front surface may be defined as a rear surface of the electronic device 101. The surface surrounding the space between front and back surfaces may be defined as a side surface of the electronic device 101.

According to an embodiment, the foldable housing 300 may include a first housing structure 310, a second housing structure 320 including a sensor area 324, a first rear cover 380, a second rear cover 390, and a hinge structure (e.g., the hinge structure 510 of FIG. 4 described below). The foldable housing 300 of the electronic device 101 are not limited to the shape and coupling shown in FIGS. 2 and 3 but may rather be implemented in other shapes or via a combination and/or coupling of other components. For example, in an embodiment, the first housing structure 310 and the first rear cover 380 may be integrally formed with each other, and the second housing structure 320 and the second rear cover 390 may be integrally formed with each other.

According to an embodiment, the first housing structure 310 may be connected to the hinge structure (e.g., the hinge structure 510 of FIG. 4 to be described below) and may include a first surface (e.g., the first surface 311 of FIG. 4) facing in a first direction and a second surface (e.g., the second surface 312 of FIG. 4 to be described below) facing in a second direction opposite to the first direction. The second housing structure 320 may be connected to the hinge structure 510, include a third surface facing in a third direction (e.g., the third surface 321 of FIG. 4 described below) and a fourth surface (e.g., the fourth surface 322 of FIG. 4 described below) facing in a fourth direction opposite to the third direction, and rotate about the hinge structure 510 (or hinge shaft) with respect to the first housing structure 310. The electronic device 101 may transform into a folded state or an unfolded state, which is described below with reference to FIG. 4. Here, the direction may mean a direction parallel to the plane or a direction normal to the plane.

According to an embodiment, the first surface of the electronic device 101 may face the third surface in a fully folded state. In the fully unfolded state, the third direction may be substantially the same as the first direction.

According to an embodiment, the first housing structure 310 and the second housing structure 320 may be disposed on both sides of the folding axis A, and may have an overall symmetrical shape with respect to the folding axis A. As described below, the angle or distance between the first housing structure 310 and the second housing structure 320 may be varied depending on whether the electronic device 101 is in the unfolded state, the folded state, or the partially unfolded (or partially folded) intermediate state. According to an embodiment, the second housing structure 320 further includes the sensor area 324 where various sensors are disposed, unlike the first housing structure 310 but, in the remaining area, the second housing structure 320 may be symmetrical in shape with the first housing structure 310.

According to an embodiment, referring to FIG. 2, the first housing structure 310 and the second housing structure 320 together may form a recess to receive the display 200. In an embodiment, due to the sensor area 324, the recess may have two or more different widths in the direction perpendicular to the folding axis A.

According to an embodiment, the recess may have a first width w1 between a first portion 310*a* of the first housing structure 310, which is parallel with the folding axis A, and a first portion 320*a* of the second housing structure 320, which is formed at an edge of the sensor area 324. The recess may have a second width w2 formed by a second portion 310*b* of the first housing structure 310 and a second portion 320*b* of the second housing structure 320, which does not correspond to the sensor area 324 and is parallel with the folding axis A. In this case, the second width w2 may be longer than the first width w1. As another example, the first portion 310*a* of the first housing structure 310 and the first portion 320*a* of the second housing structure 320, which are asymmetrical with each other, may form the first width w1 of the recess, and the second portion 310*b* of the first housing structure 310 and the second portion 320*b* of the second housing structure 320, which are symmetrical with each other, may form the second width w2 of the recess. In an embodiment, the first portion 320*a* and second portion 320*b* of the second housing structure 320 may have different distances from the folding axis A. The width of the recess is not limited thereto. According to an embodiment, the recess may have a plurality of widths due to the shape of the sensor area 324 or the asymmetric portions of the first housing structure 310 and the second housing structure 320.

According to an embodiment, at least a portion of the first housing structure 310 and the second housing structure 320 may be formed of a metal or a non-metal material having a predetermined degree of rigidity to support the display 200. At least a portion formed of metal may provide a ground plane of the electronic device 101 and may be electrically connected with a ground line formed on a printed circuit board (e.g., the circuit board unit 520 of FIG. 4).

According to an embodiment, the sensor area 324 may be formed adjacent to a corner of the second housing 320 and to have a predetermined area. However, the placement, shape, or size of the sensor area 324 is not limited to those illustrated. For example, in an embodiment, the sensor area 324 may be provided in a different corner of the second housing structure 320 or in any area between the top corner and the bottom corner. In an embodiment, components for performing various functions, embedded in the electronic device 101, may be exposed, i.e., visible, through the sensor area 324 or one or more openings in the sensor area 324 to the front surface of the electronic device 101. In an embodiment, the components may include various kinds of sensors. The sensor may include, e.g., at least one of a front camera, a receiver, or a proximity sensor.

According to an embodiment, the first rear cover 380 may be disposed on one side of the folding axis A on the rear surface of the electronic device 101 and have, e.g., a substantially rectangular periphery which may be surrounded by the first housing structure 310. Similarly, the second rear cover 390 may be disposed on the opposite side of the folding axis A on the rear surface of the electronic device 101 and its periphery may be surrounded by the second housing structure 320.

According to an embodiment, the first rear cover 380 and the second rear cover 390 may be substantially symmetrical in shape with respect to the folding axis A. However, the first rear cover 380 and the second rear cover 390 are not necessarily symmetrical in shape. In an embodiment, the electronic device 101 may include the first rear cover 380 and the second rear cover 390 in various shapes. In an embodiment, the first rear cover 380 may be integrally formed with the first housing structure 310, and the second rear cover 390 may be integrally formed with the second housing structure 320.

In an embodiment, the first rear cover 380, the second rear cover 390, the first housing structure 310, and the second housing structure 320 may form a space where various components (e.g., a printed circuit board or battery) of the electronic device 101 may be disposed. According to an embodiment, one or more components may be arranged or visually exposed on/through the rear surface of the electronic device 101. For example, at least a portion of a sub display may be visually exposed, i.e., visible, through a first rear surface area 382 of the first rear cover 380. In an embodiment, one or more components or sensors may be visually exposed through a second rear surface area 392 of the second rear cover 390. In an embodiment, the sensor may include a proximity sensor and/or a rear camera.

According to an embodiment, a front camera exposed to the front surface of the electronic device 101 through one or more openings prepared in the sensor area 324 or a rear camera exposed through a second rear surface area 392 of the second rear cover 390 may include one or more lenses, an image sensor, and/or an image signal processor. The flash may include, e.g., a light emitting diode (LED) or a xenon lamp. In an embodiment, two or more lenses (an infrared (IR) camera, a wide-angle lens, and a telephoto lens) and image sensors may be disposed on one surface of the electronic device 101.

Referring to FIG. 3, the hinge cover 330 may be disposed between the first housing structure 310 and the second housing structure 320 to hide the internal components (e.g., the hinge structure 510 of FIG. 4 described below). According to an embodiment, the hinge cover 330 may be hidden by a portion of the first housing structure 310 and second housing structure 320 or be exposed to the outside depending on the state (e.g., the unfolded state, intermediate state, or folded state) of the electronic device 101.

According to an embodiment, referring to FIG. 2, in the unfolded state (e.g., a fully unfolded state) of the electronic device 101, the hinge cover 330 may be hidden not to be exposed by the first housing structure 310 and the second housing structure 320. As another example, referring to FIG. 3, in the folded state (e.g., a fully folded state) of the electronic device 101, the hinge cover 330 may be exposed to the outside between the first housing structure 310 and the second housing structure 320. As another example, in an intermediate state in which the first housing structure 310 and the second housing structure 320 are folded with a certain angle, the hinge cover 330 may be partially exposed to the outside between the first housing structure 310 and the second housing structure 320. However, in this case, the exposed area may be smaller than that in the completely folded state. In an embodiment, the hinge cover 330 may include a curved surface.

According to an embodiment, the display 200 may be disposed in a space formed by the foldable housing 300. For example, the display 200 may be seated in a recess formed by the foldable housing 300 and may be seen from the outside through the front surface of the electronic device 101. For example, the display 200 may constitute most of the front surface of the electronic device 101. Thus, the front surface of the electronic device 101 may include the display 200 and a partial area of the first housing structure 310 and a partial area of the second housing structure 320, which are adjacent to the display 200. The rear surface of the electronic device 101 may include the first rear cover 380, a partial area of the first housing structure 310, which is adjacent to the first rear cover 380, the second rear cover 390, and a partial area of the second housing structure 320, which is adjacent to the second rear cover 390.

According to an embodiment, the display 200 may mean a display at least a portion of which may be transformed into a flat or curved surface. According to an embodiment, the display 200 may include a folding area 203, a first area 201 disposed on one side of the folding area 203 (e.g., the left side of the folding area 203 of FIG. 2), and a second area 202 disposed on the opposite side of the folding area 203 (e.g., the right side of the folding area 203 of FIG. 2).

However, the segmentation of the display 200 referring to FIG. 2 is merely an example, and the display 200 may be divided into a plurality of (e.g., four or more, or two) areas depending on the structure or function of the display 200. For example, in the embodiment illustrated in FIG. 2, the display 200 may be divided into the areas by the folding area 203 or folding axis (axis A) extending in parallel with the y axis but, in an embodiment, the display 200 may be divided into the areas with respect to another folding area (e.g., a folding area parallel with the x axis) or another folding axis (e.g., a folding axis parallel with the x axis).

According to an embodiment, the first area 201 and the second area 202 may be overall symmetrical in shape with respect to the folding area 203. However, unlike the first area 201, the second area 202 may include a notch depending on the presence of the sensor area 324, but the rest may be symmetrical in shape with the first area 201. In other words, the first area 201 and the second area 202 may include symmetrical portions and asymmetrical portions.

Described below are the operation of the first housing structure 310 and the second housing structure 320 and each area of the display 200 depending on the state (e.g., the folded state, unfolded state, or intermediate state) of the electronic device 101.

According to an embodiment, when the electronic device 101 is in the unfolded state (e.g., FIG. 2), the first housing structure 310 and the second housing structure 320 may be disposed to face in the same direction while being angled at 180 degrees therebetween. The surface of the first area 201 and the surface of the second area 202 of the display 200 may be angled at 180 degrees therebetween while facing in the same direction (e.g., forward of the front surface of the electronic device). The folding area 203 may be substantially coplanar with the first area 201 and the second area 202.

According to an embodiment, when the electronic device 101 is in the folded state (e.g., FIG. 3), the first housing structure 310 and the second housing structure 320 may face each other. The surface of the first area 201 and the surface of the second area 202 of the display 200 may be angled at a small angle (e.g., ranging from 0 degrees to 10 degrees) therebetween while facing each other. At least a portion of the folding area 203 may be formed as a curve having a predetermined curvature.

According to an embodiment, in the intermediate state of the electronic device 101, the first housing structure 310 and the second housing structure 320 may be arranged at a certain angle therebetween. The surface of the first area 201 of the display 200 and the surface of the second area 202 may form an angle which is larger than the angle in the folded state and smaller than the angle in the unfolded state. The folding area 203 may at least partially have a curved surface with a predetermined curvature and, in this case, the curvature may be smaller than that when it is in the folded state.

Figure 4:
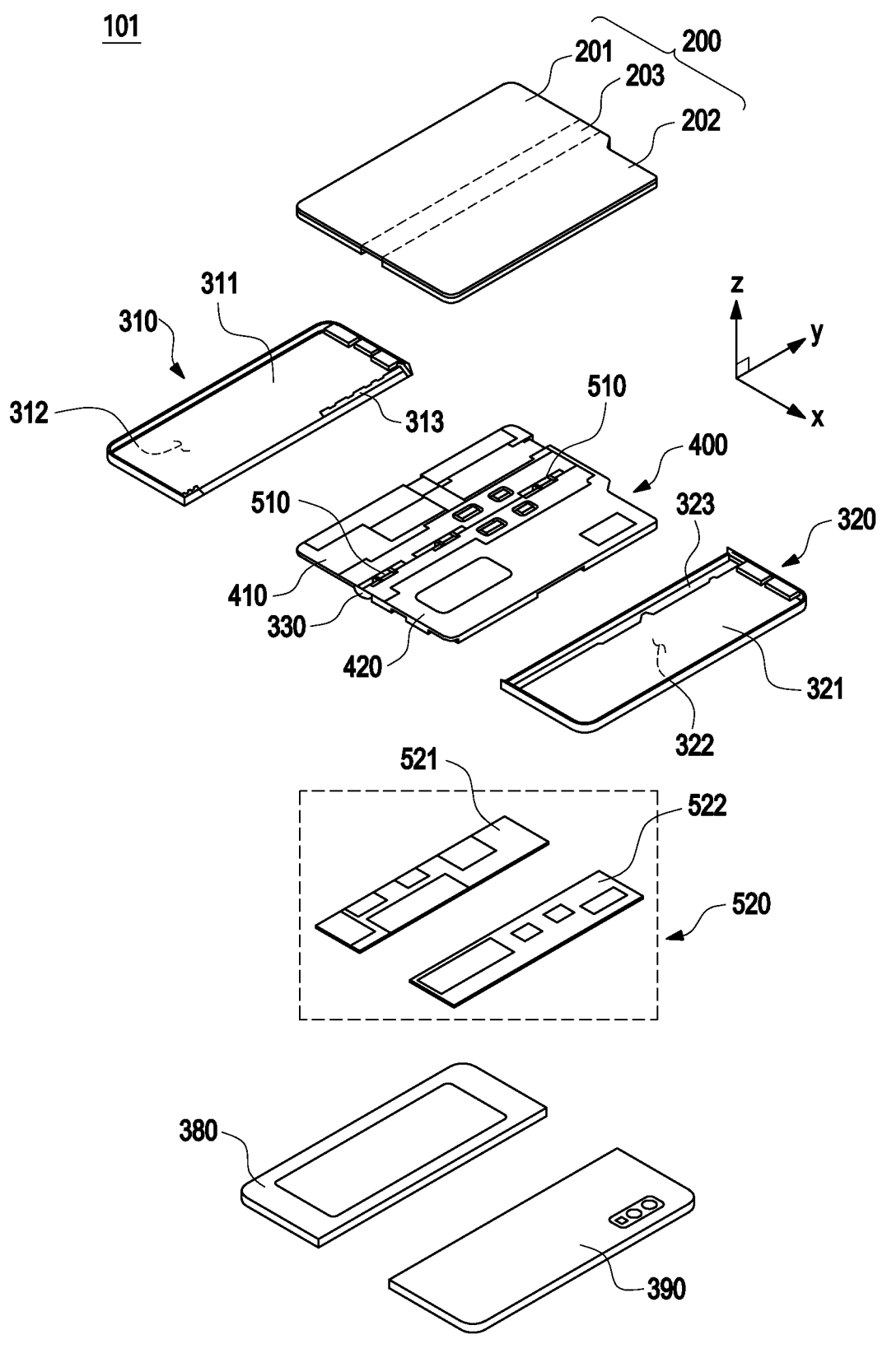
FIG. 4 is an exploded perspective view illustrating an electronic device according to an embodiment of the disclosure.

FIG. 4 is an exploded perspective view illustrating an electronic device 101 according to an embodiment of the disclosure.

Referring to FIG. 4, in an embodiment, the electronic device 101 may include a foldable housing 300, a display device 200, and a board unit 520. The foldable housing may include a first housing structure 310, a second housing structure 320, a bracket assembly 400, a first rear cover 380, a second rear cover 390, and a hinge structure 510.

According to an embodiment, the display device 200 may include a display panel (e.g., a flexible display panel) and one or more plates or layers on which the display panel is seated. According to an embodiment, the supporting plate may be disposed between the display panel and the bracket assembly 400. An adhesive structure (not shown) may be positioned between the supporting plate and the bracket assembly 400, attaching the supporting plate and the bracket assembly 400.

According to an embodiment, the bracket assembly 400 may include a first bracket assembly 410 and a second bracket assembly 420. The hinge structure 510 may be disposed between the first bracket assembly 410 and the second bracket assembly 420, and when the hinge structure 510 is viewed from the outside, a hinge cover 330 covering the hinge structure 510 may be disposed. In an embodiment, a printed circuit board (e.g., a flexible printed circuit (FPC))

may be disposed to cross the first bracket assembly 410 and the second bracket assembly 420.

According to an embodiment, the board unit 520 may include a first main circuit board 521 disposed on the first bracket assembly 410 side and a second main circuit board 522 disposed on the second bracket assembly 420 side. The first main circuit board 521 and the second main circuit board 522 may be disposed in a space formed by the bracket assembly 400, the first housing structure 310, the second housing structure 320, the first rear cover 380, and the second rear cover 390. Components for implementing various functions of the electronic device 101 may be mounted on the first main circuit board 521 and the second main circuit board 522.

According to an embodiment, the first housing structure 310 and the second housing structure 320 may be assembled together to be coupled to two opposite sides of the bracket assembly 400, with the display 200 coupled to the bracket assembly 400. For example, the first housing structure 310 and the second housing structure 320 may slide to two opposite sides of the bracket assembly 400 and fit with the bracket assembly 400.

According to an embodiment, the first housing structure 310 may include a first surface 311 and a second surface 312 facing away from the first surface 311, and the second housing structure 320 may include a third surface 321 and a fourth surface 322 facing away from the third surface 321. According to an embodiment, the first housing structure 310 may include a first rotation supporting surface 313, and the second housing structure 320 may include a second rotation supporting surface 323 corresponding to the first rotation supporting surface 313. The first rotation supporting surface 313 and the second rotation supporting surface 323 may include a curved surface corresponding to a curved surface included in the hinge cover 330.

According to an embodiment, the first rotation supporting surface 313 and the second rotation supporting surface 323, in the unfolded state of the electronic device 101 (e.g., the electronic device 101 of FIG. 2), may cover the hinge cover 330, allowing the hinge cover 330 to be not or minimally exposed through the rear surface of the electronic device 101. As another example, the first rotation supporting surface 313 and the second rotation supporting surface 323, in the folded state of the electronic device 101 (e.g., the electronic device 101 of FIG. 3), may rotate along the curved surface included in the hinge cover 330, allowing the hinge cover 330 to be maximally exposed through the rear surface of the electronic device 101.

Figure 5:
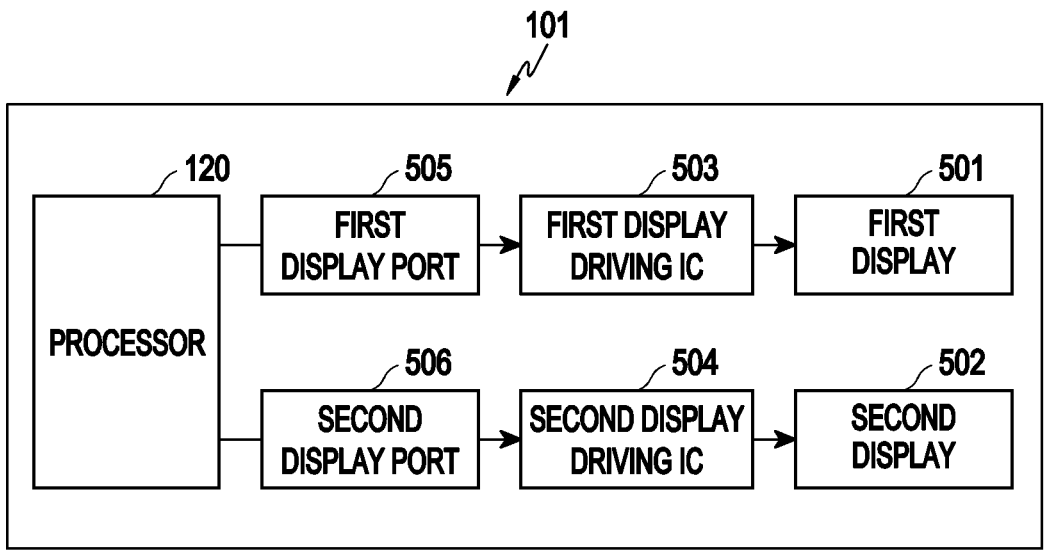
FIG. 5 is a block diagram illustrating an electronic device according to an embodiment of the disclosure.

FIG. 5 is a block diagram illustrating a foldable electronic device according to an embodiment of the disclosure.

According to an embodiment, the electronic device 101 may include a first display 501 and a second display 502. For example, the first display 501 may be exposed through the first rear cover 380 of the first housing structure 310 of FIG. 2. For example, the first display 501 may be exposed through the first rear area 382 of FIG. 2. In an embodiment, the first display 501 may have a relatively small size as compared to the second display 502 described below in more detail and, in that sense, may be referred to as a sub display.

According to an embodiment, the second display 502 may be exposed to the outside in the unfolded state of the electronic device 101. At least a portion (e.g., a portion corresponding to the hinge) of the second display 502 is flexible, and when the electronic device 101 is folded, the second display 502 may also be folded. The second display 502 may be the flexible display 200 in FIG. 2, but to be distinguished from the first display 501, it is referred to as the second display 502. As described above, the first area and the second area of the second display 502 may face each other in the folded state. The first area and the second area may be distinguished based on, e.g., a boundary line included in a portion corresponding to the hinge. Further, the first area and the second area of the second display 502 may form substantially the same plane in the unfolded state. The size of the second display 502 may be larger than, e.g., the first display 501. Or, the resolution of the second display 502 may be expressed as higher than that of the first display 501.

According to an embodiment, the processor 120 may transfer data for outputting a screen through a first display port (DP) 505 to a first display driving integrated circuit (IC) 503, e.g., in the folded state of the electronic device 101. The first display driving IC 503 may output a signal to the data line based on the received data while scanning the gate line of the first display 501. Accordingly, the first display 501 may display a screen. The scheme for driving the first display 501 by the first display driving IC 503 is not limited.

According to an embodiment, the processor 120 may transfer data for outputting a screen through second first display port 506 to a second display driving IC 504, e.g., in the unfolded state of the electronic device 101. The second display driving IC 504 may output a signal to the data line based on the received data while scanning the gate line of the second display 502. Accordingly, the second display 502 may display a screen. The scheme for driving the second display 502 by the second display driving IC 504 is not limited. The processor 120 may stop the operation of the first display driving IC 503 in the unfolded state of the electronic device 101. However, depending on the implementation, the first display driving IC 503 may be controlled to operate. In this case, the screen may be displayed on the first display 501 even in the unfolded state of the electronic device 101.

FIG. 5 illustrates that the first display driving IC 503 and the second display driving IC 504 are implemented as different pieces of hardware. According to an embodiment, the first display driving IC 503 and the second display driving IC 504 may be implemented as different pieces of hardware or one IC. Further, in an embodiment, the first display driving IC 503 and the second display driving IC 504 may also be implemented as a touch and display driver IC (TDDIC) that additionally supports the first of inputting an electrical signal to the touchscreen panel (TSP) for detecting the position of the touch or receiving and processing an output signal.

Figure 6:
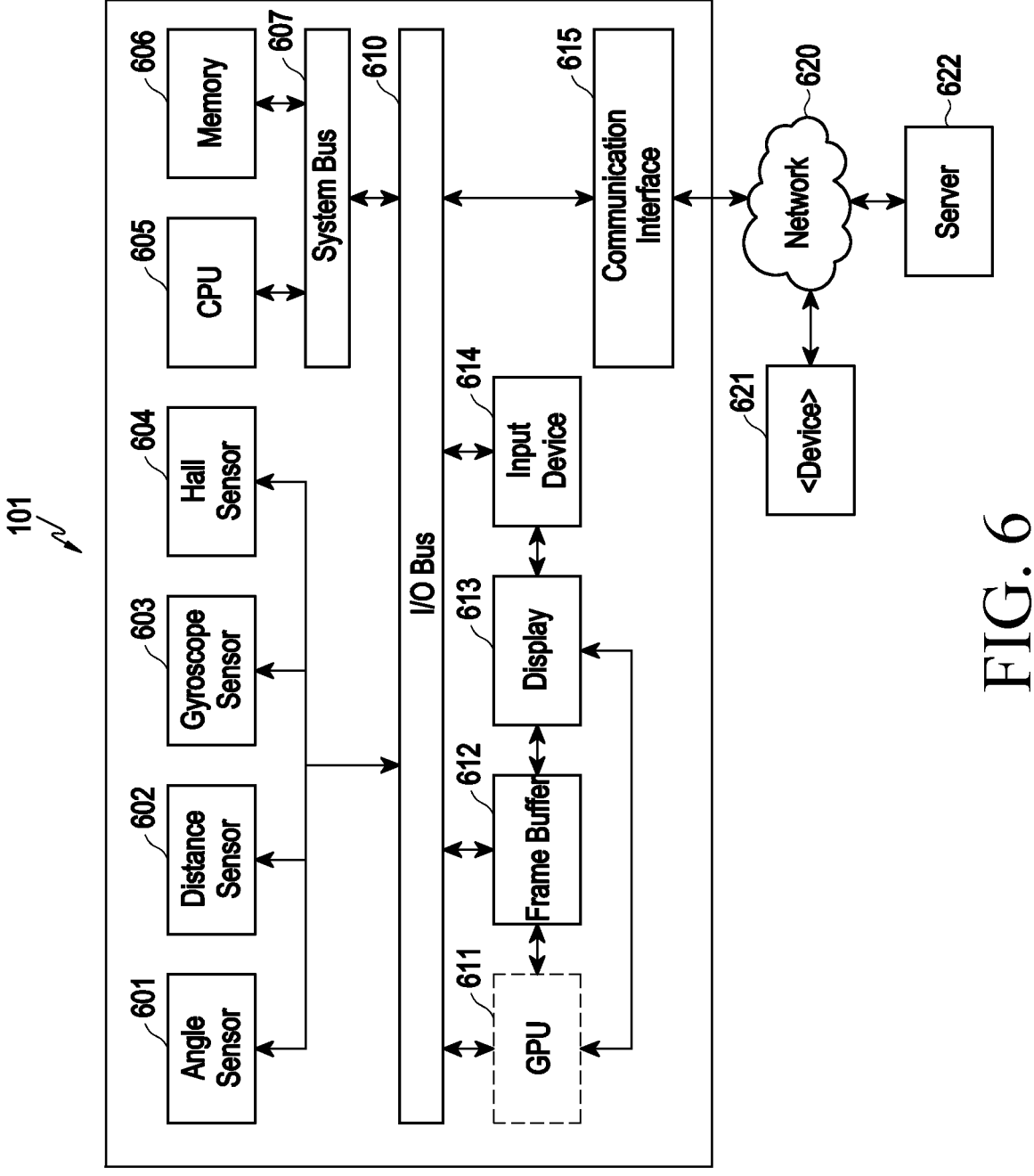
FIG. 6 is a block diagram illustrating an electronic device according to an embodiment of the disclosure.

FIG. 6 is a block diagram illustrating an electronic device according to an embodiment of the disclosure.

According to an embodiment, an electronic device 101 may include at least one of an angle sensor 601, a distance sensor 602, a gyroscope sensor 603, a hall sensor 604, a CPU 605 (e.g., the processor 120 of FIG. 1), a memory 606 (e.g., the memory 130 of FIG. 1), a system bus 607, an input/output (I/O) bus 610, a GPU 611, a frame buffer 612, a display 613, an input device 614 (e.g., the input module 150 of FIG. 1), or a communication interface 615 (e.g., the communication module 190 of FIG. 1).

According to an embodiment, at least one of the angle sensor 601, the distance sensor 602, the gyroscope sensor 603, or the hall sensor 604 may be included in the sensor module 176 of FIG. 1. The angle sensor 601 may sense, e.g., a parameter associated with an angle formed by the first housing structure 310 and the second housing structure 320 of the electronic device 101. For example, the first housing structure 310 and the second housing structure 320 may be folded by the hinge structure 510. The angle sensor 601 may also sense the degree of rotation of the hinge structure 510.

The parameter sensed by the angle sensor 601 is not limited as long as it is a parameter associated with angles formed by the first housing structure 310 and the second housing structure 320. The distance sensor 602 may sense a parameter associated with the distance between the first housing structure 310 and the second housing structure 320, for example. The gyroscope sensor 603 may sense a parameter associated with rotation or posture of at least one of the first housing structure 310 or the second housing structure 320. The hall sensor 604 may sense a parameter associated with whether the first housing structure 310 and the second housing structure 320 are close to each other. Meanwhile, in addition to the parameters by the above-described sensors, sensors for sensing parameters associated with whether the first housing structure 310 and the second housing structure 320 are folded or unfolded may be additionally (or alternatively) included in the device 101.

According to an embodiment, the CPU 605 may receive at least one piece of sensing information via the input/output bus 610 and the system bus 607, and may determine whether the electronic device 101 is in a folded state or an unfolded state based on the at least one piece of sensing information. The CPU 605 may perform a designated operation based on whether the electronic device 101 is in a folded or unfolded state. For example, the CPU 605 may control to display a screen on at least one (e.g., the first display 501) of the displays 613 when the electronic device 101 is in a folded state, and control to display a screen on another at least another one (e.g., the second display 502) of the displays 613 when the electronic device 101 is in an unfolded state. During the transition period between states, the CPU 605 may control to display a transition screen on the display configured to newly display a screen and, if the screen configuration is complete, display the configured screen instead of the transition screen, which is described below in greater detail.

According to an embodiment, the GPU 611 may quickly and efficiently synthesize graphic information about the display 613. The GPU 611 may provide a separate instruction set for association functions and special effects for processing graphic elements. If the GPU 611 is used simultaneously with the CPU 605, when processing the same graphic element, it is possible to process faster than when processed by the CPU 605 alone. According to the implementation, the electronic device 101 may not include the GPU 611.

According to an embodiment, the memory 606 (e.g., the memory 130 of FIG. 1) may include at least one of volatile memory or non-volatile memory, as described above, and may store instructions or data for configuring the screen.

According to an embodiment, the frame buffer 612 may store pixel color values output through the display 613. The frame buffer 612 may be implemented as a memory in the GPU 611 or in a display device controller (e.g., DDIC) for controlling the display 613. Alternatively, in terms of software, it may be implemented as a virtual device, such as a frame buffer device of the operating system (e.g., Linux). In the frame buffer 612, data to be displayed on the display, such as data for the first screen, the reconstructed screen, or the transition screen, may be stored and output for use in displaying the screen.

According to an embodiment, the input device 614 (e.g., the input module 150 of FIG. 1) and the communication interface 615 (e.g., the communication module 190 of FIG. 1) are described in connection with FIG. 1, and no detailed description thereof is given below. The communication interface 615 may communicate with a device 621 or server 622 via, e.g., a network 620 (e.g., at least one of the first network 198 or the second network 199).

According to an embodiment, at least one of the system bus 607 or the input/output bus 610 is an interface for exchanging information between devices (or hardware) constituting the system, and may transmit/receive data, addresses, and control signals therethrough.

Figure 7A:
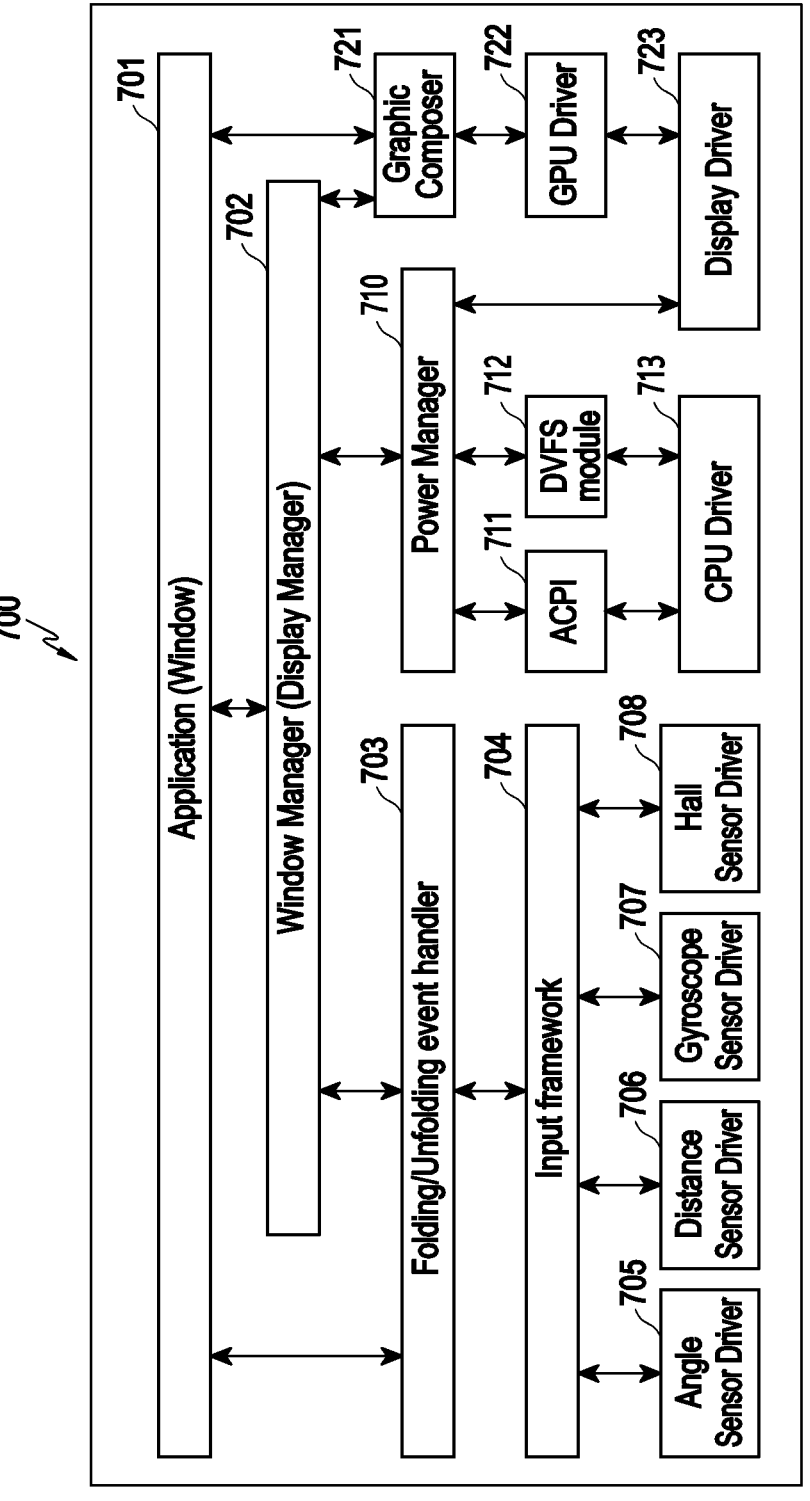
FIG. 7A is a block diagram illustrating a software module according to an embodiment of the disclosure.

FIG. 7A is a block diagram illustrating a software module according to an embodiment of the disclosure.

According to an embodiment, the software module 700 defined in the electronic device 101 may include at least one of an application (or, window) 701, a window manager (or, display manager 702), a folding/unfolding event handler 703, an input framework 704, an angle sensor driver 705, a distance sensor driver 706, a gyroscope sensor driver 707, a hall sensor driver 708, a power manager 710, advanced configurable power management interface (ACPI) 711, a dynamic voltage frequency scaling (DVFS) module 712, a CPU driver 713, a graphic composer 721, a GPU driver 722, or a display driver 723.

According to an embodiment, the display manager may control the state of the display. The window manager 702 may identify at least one of the size, position, or transparency of the window displayed on the display. The window manager 702 may transfer a drawing control command to the application 701 (or window) based on the identified information. According to the implementation of the system, the display manager and the window manager 702 may be integrated. For convenience of description, below, an expression in which the window manager 702 performs a specific operation is used. The operation performed by the window manager 702 may be understood as performed by the window manager 702 or the display manager.

According to an embodiment, the power manager 710 may manage power states of the entire system or some modules constituting the device to efficiently adjust system current consumption. Further, the power manager 710 may adjust an operating parameter (e.g., at least one of CPU operating voltage, CPU operating frequency, number of operating cores, or number of threads) of the CPU 605. The power manager 710 may control the advanced configurable power management interface (ACPI) 711 or the DVFS module 712 to control the operating parameters of the CPU 605.

According to an embodiment, the ACPI 711 may manage the power of the system and may provide an independent method of controlling the power of the devices and the CPU operating frequency based on the system state for efficient power management. For example, in a working state, the ACPI 711 may provide power to both the CPU 605 and the display 613, and in a sleep state, the ACPI 711 may provide power to the CPU 605 but not to the display 613.

Figure 7B:
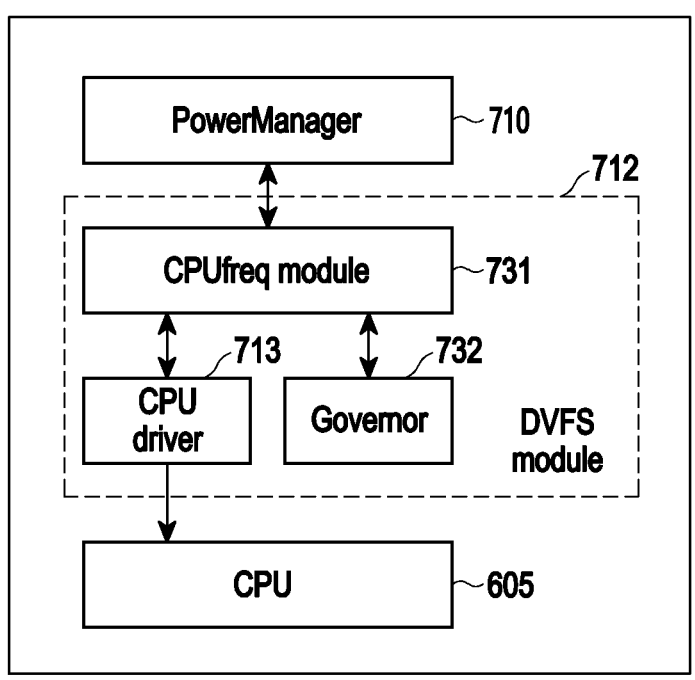
FIG. 7B is a block diagram illustrating a dynamic voltage frequency scaling (DVFS) module, a power manager, and a central processing unit (CPU) according to an embodiment of the disclosure.

The DVFS module 712 is described in more detail with reference to FIG. 7B. FIG. 7B is a block diagram illustrating a DVFS module, a power manager, and a CPU according to an embodiment of the disclosure. According to an embodiment, the DVFS module 712 may include at least one of a CPU frequency module (CPUfreq module) 731, a CPU driver 713, or a governor 732. In FIG. 7B, the CPU driver 713 is shown as being included in the DVFS module 712, and, as in FIG. 7A, the CPU driver 713 may be implemented outside the DVFS module 712. The DVFS module 712 may be a software-based power management module. Since the performance and current consumption of the CPU 605 have a trade-off relationship, the DVFS module 712 may control at least one of the parameters associated with the performance of the CPU 605, such as operating voltage, operating frequency, number of operating cores, or number of threads, taking into account current consumption. The DVFS module 712 may temporarily boost the performance of the CPU 605 accordingly. In an embodiment, the performance of CPU 605 may be enhanced during the state transition period. This is described below in more detail. The CPU driver 713 may be a software module that directly controls the CPU 605. The governor 732 may provide a policy for changing at least one of the operating voltage or the operating frequency of the CPU 605 according to a purpose or situation. The frequency module 731 may be an integrated interface for ensuring independent development or operation of the CPU driver 713 and the governor 732. The power manager 710 may change the policy of the governor 732 through the CPU frequency module 731 or may instruct to directly control the operating parameters of the CPU 605 separately from the existing policy.

According to an embodiment, the input framework 704 may select one of the folded state or the unfolded state based on at least one piece of sensing information obtained through at least one of the angle sensor driver 705, the distance sensor driver 706, the gyroscope sensor driver 707, or the hall sensor driver 708. The input framework 704 may output information indicating the identified state. The information indicating the identified state may be referred to as a folding event or an unfolding event.

According to an embodiment, the folding/unfolding event handler 703 may receive information indicative of the identified state (e.g., folding event or unfolding event) and control the on/off of each of the first display 501 or the second display 502 via the power manager 710.

According to an embodiment, the graphic composer 721 may be a module that synthesizes graphic information about each window of the display into data in the frame buffer. As described above, the frame buffer may store graphic information to be output to the display. For example, the graphic composer 721 may transmit and receive data to and from GPU driver 722. The GPU driver 722 may output data based on a processing result to the display driver 723. The display driver 723 may output data to at least some of the displays 501 and 502 to output actual screens based on the received data.

Figure 8:
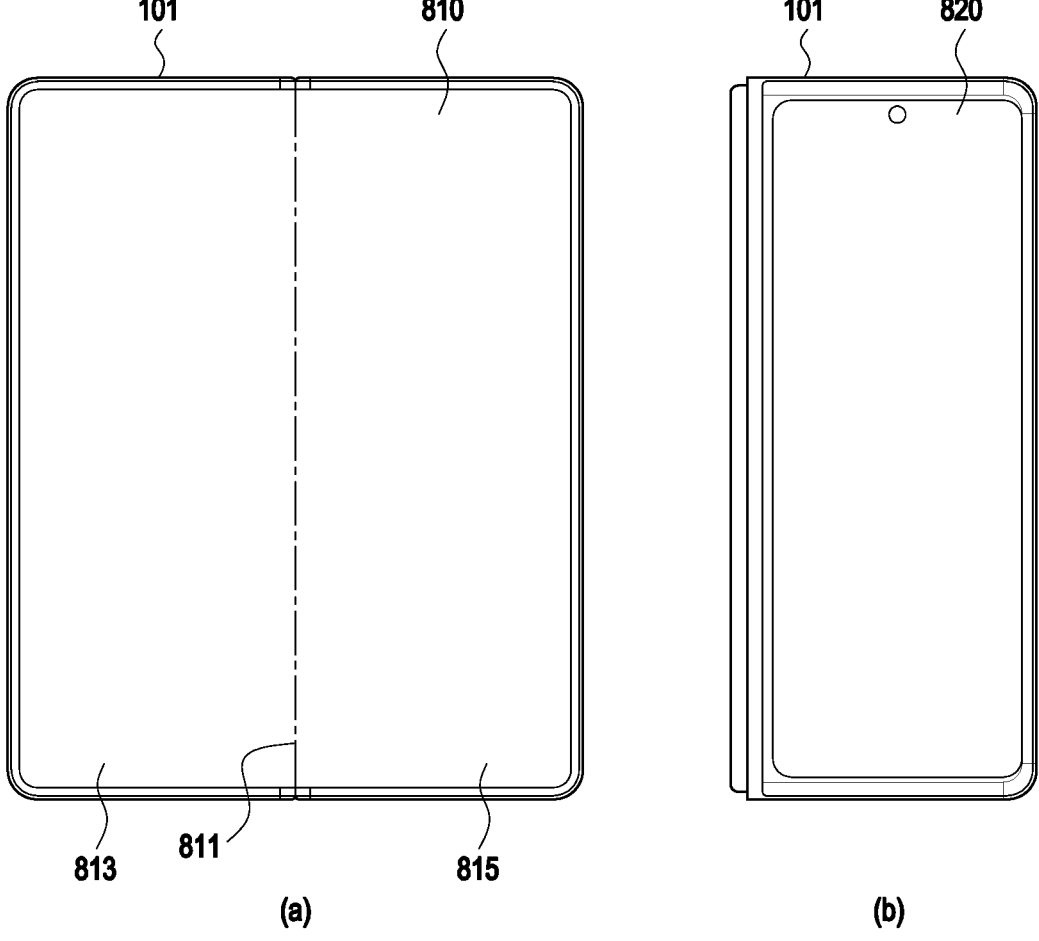
FIG. 8 is a view illustrating a folded state and unfolded state of an electronic device according to an embodiment of the disclosure.

FIG. 8 is a view illustrating a folded state and unfolded state of an electronic device according to an embodiment of the disclosure.

Part (a) of FIG. 8 illustrates a folded state of the electronic device 101. Part (b) of FIG. 8 illustrates an unfolded state of the electronic device 101.

According to an embodiment, the electronic device 101 may include a first display 810 and a second display 820. The first display 810 may be the second display 502 of FIG. 5. The second display 820 may be the first display 501 of FIG. 5. For example, the first display 810 may be exposed to the outside in the unfolded state of the electronic device 101. At least a portion (e.g., a portion corresponding to the hinge) of the first display 810 is flexible, and when the electronic device 101 is folded, the first display 810 may also be folded. The first display 810 may be the flexible display 200 in FIG. 2, but to be distinguished from the second display 820, it is referred to as the first display 810. The first surface 813 and the second surface 815 of the first display 810 may face each other in the folded state. The first surface and the second surface may be distinguished based on, e.g., a boundary line 811 included in a portion corresponding to the hinge. Further, the first surface 813 and the second surface 815 of the first display 810 may form substantially the same plane in the unfolded state. The size of the first display 810 may be larger than, e.g., the second display 820. The first display 810 may be referred to as a "main display". Or, the resolution of the first display 810 may be expressed as higher than that of the second display 820. In an embodiment, the size of the first surface 813 may be the same as, e.g., the size of the second display 820. The size of the second surface 815 may be the same as that of the second display 820. For example, the second display 820 may be exposed through the first rear cover 380 of the first housing structure 310 of FIG. 2. For example, the second display 820 may be exposed through the first rear area 382 of FIG. 2. The second display 820 may have a relatively small size as compared to the first display 810 described below in more detail and, in that sense, may be referred to as a sub display. In an embodiment, a direction parallel to the content displayed on the first display 810 or the second display 820 may be referred to as a "horizontal direction". In an embodiment, a direction perpendicular to the content displayed on the first display 810 or the second display 820 may be referred to as a "vertical direction".

Figure 9:
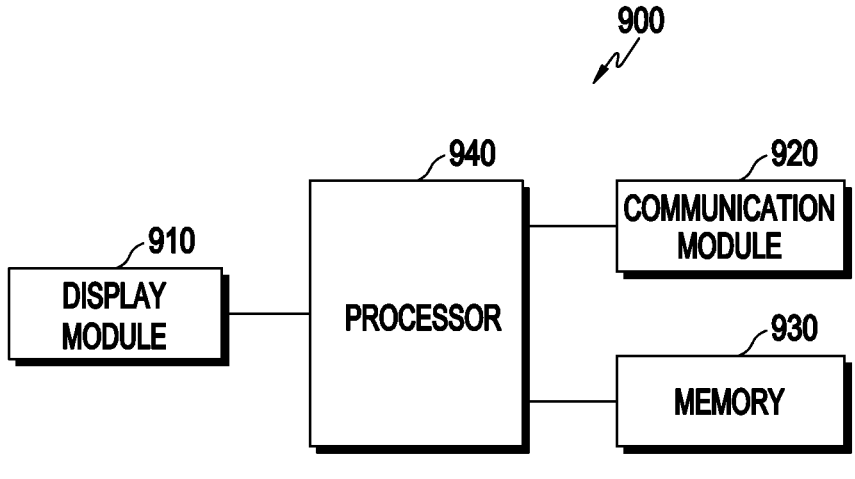
FIG. 9 is a block diagram illustrating an electronic device according to an embodiment of the disclosure.

FIG. 9 is a block diagram illustrating an electronic device 900 according to an embodiment of the disclosure.

Referring to FIG. 9, in an embodiment, an electronic device 900 (e.g., the electronic device 101 of FIG. 1) may include a display module 910, a communication module 920, a memory 930, and a processor 940.

In an embodiment, the display module 910 may include the display module 160 of FIG. 1. In an embodiment, the display module 910 may include the display 200 of FIG. 2. In one embodiment, the display module 910 may include the first display 501 and the second display 502 of FIG. 5. In an embodiment, the display module 910 may include the display 613 of FIG. 6. In an embodiment, the display module 910 may include the first display 810 (e.g., the second display 502 of FIG. 5) of FIG. 8 and the second display 820 (e.g., the first display 501 of FIG. 5).

In an embodiment, the display module 910 may display one or more content on the first display 810 or the second display 820. For example, the display module 910 may display content, such as an image or text, on the first display 810 or the second display 820. The content is not limited to the above-described examples.

In an embodiment, the communication module 920 may be included in the communication module 190 of FIG. 1 or the communication interface 615 of FIG. 6. In an embodiment, the communication module 920 may communicate with an external electronic device (e.g., the electronic device 102 of FIG. 1) through a first network (e.g., the first network 198 of FIG. 1). In an embodiment, the communication module 920 may communicate with an external electronic device (e.g., the electronic device 104 and server 108 of FIG. 1) via a second network (e.g., the second network 199 of FIG. 1). For example, the communication module 920 may receive data including one or more content from the server 108.

In an embodiment, the memory 930 may be included in the memory 130 of FIG. 1 or the memory 606 of FIG. 6. In an embodiment, the memory 930 may store information for performing the operation of determining the position where the content is displayed. Information stored in the memory 930 is described below.

In an embodiment, the processor 940 may be included in the processor 120 of FIG. 1 or the CPU 605 of FIG. 6.

In an embodiment, the processor 940 may control an overall operation for determining the position of content. In an embodiment, the processor 940 may include one or more processors for determining the position of the content.

According to an embodiment, the electronic device 900 may include at least one processor operatively connected to the display module 910, the communication module 920, and the memory 930. The operation performed by the processor 940 to determine the position of the content is described below with reference to FIGS. 10 to 12, 13A, 13B, 14, 15A, 15B, 16, 17A, 17B, 18A, 18B, 19, 20A, 20B, 21, 22A to 22C, 23, 24A, 24B, 25A, and 25B.

In FIG. 9, the electronic device 900 is illustrated as including the display module 910, the communication module 920, the memory 930, and/or the processor 940, but is not limited thereto. For example, the electronic device 900 may further include at least one component shown in FIG. 1.

Figure 10:
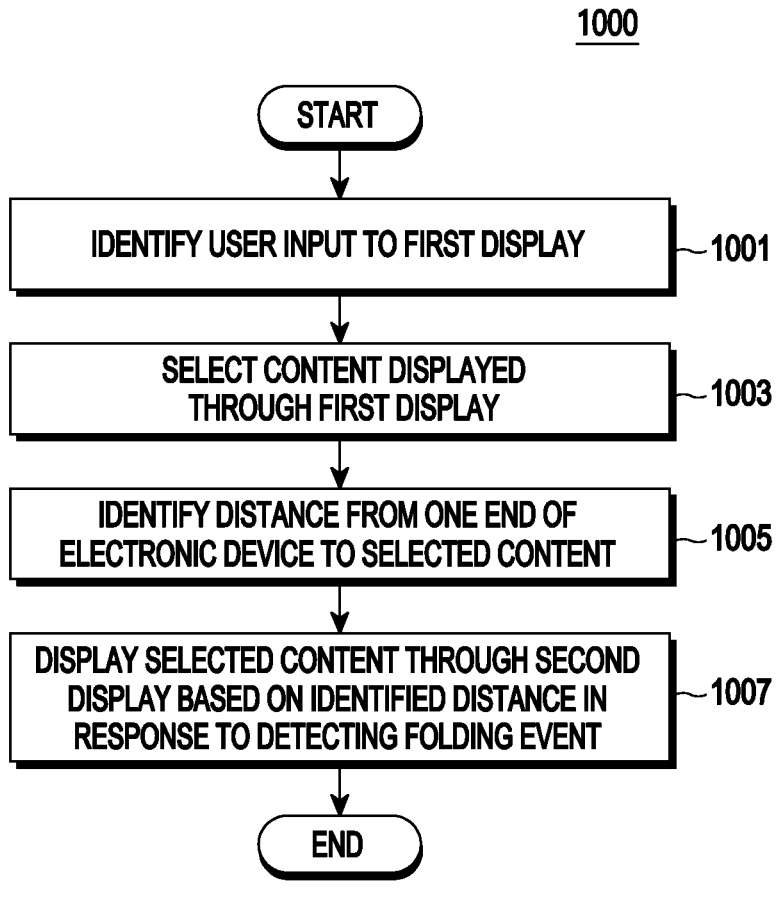
FIG. 10 is a flowchart illustrating a method for displaying selected content, based on detecting a folding event of an electronic device according to an embodiment of the disclosure.

FIG. 10 is a flowchart 1000 illustrating a method for displaying selected content, based on detecting a folding event of an electronic device 900 according to an embodiment of the disclosure.

In an embodiment, the electronic device 900 may display the selected content on the second display 820 after the folding event, in the identical position as the position where the selected content is displayed on the first display 810 before the folding event.

Referring to FIG. 10, in operation 1001, in one embodiment, the electronic device 900 (e.g., the processor 940) may identify a user input for the first display (e.g., the first display 810 of FIG. 8).

In an embodiment, the electronic device 900 may identify one or more user inputs for the first display 810 among the plurality of displays. In an embodiment, the user input may be a touch on the first display 810 but is not limited thereto. In an embodiment, the electronic device 900 may simultaneously identify a plurality of user inputs on the first display 810. For example, the electronic device 900 may identify the user input for the first display 810 based on identifying the amount of charge change obtained by the sensor module (e.g., the sensor module 176 of FIG. 1).

In operation 1003, in an embodiment, the electronic device 900 may select the displayed content through the first display 810.

In an embodiment, the electronic device 900 may select any one of one or more content displayed on the first display 810 based on the identified one or more user inputs. In one embodiment, the electronic device 900 may identify the position of the identified user input. The electronic device 900 may select content corresponding to the position of the user input. A specific example in which the electronic device 900 selects the content displayed on the first display 810 based on the user input is described below with reference to FIG. 11.

In operation 1005, in an embodiment, the electronic device 900 may identify a distance from one end of the electronic device 900 to the selected content.

In an embodiment, the electronic device 900 may identify a distance from one end of the electronic device 900 to the selected content based on the position of the selected content. In an embodiment, the electronic device 900 may identify, based on obtaining information regarding the position of the selected content and/or obtaining information regarding the distance, a distance from one end of the electronic device 900 to the selected content. For example, the electronic device 900 may identify the position of the content on the first display 810 based on a density independent pixel (DP or DIP) value of the selected content. In an embodiment, the DP may be a unit indicating the position of content on the display.

In an embodiment, the electronic device 900 may identify a first distance from one end of the electronic device 900 to the selected content on the first display 810, based on identifying the DP value of the selected content. In an embodiment, the first distance may be a distance from the one end of the electronic device 900 to center of the selected content. In an embodiment, the center of the selected content on the first display 810 may be referred to as a "first position". In an embodiment, the center of the selected content may be set based on the location of the central axis of the selected content. The central axis of the selected content may be parallel to one end of the electronic device 900. The central axis may be a straight line in a horizontal direction, and those skilled in the art will easily understand that a specific direction of the central axis may not be limited to the above-described example. In an embodiment, one end of the electronic device 900 may be one end of a housing of the electronic device 900. One end of the electronic device 900 may also be one end of a panel (or display) of the electronic device 900. A panel of the electronic device 900 may include a display area (or effective area) and a non-display area. In an embodiment, the first position may be a position corresponding to a circumscribed rectangle including the selected content. In an embodiment, the first position may be a start position or an end position in the first direction for the selected content. In an embodiment, the position corresponding to the center of the selected content may be changed to examples of the first position described above. The first position, which is the criterion for the position of the selected content, is not limited to the above-described example. In an embodiment, the selected content may be displayed within a rectangular area of the first display 810. The electronic device 900 may identify a first position value for the selected content based on identifying the DP value of the selected content. For example, the electronic device 900 may identify the center position of the selected content in the vertical direction. In an embodiment, the electronic device 900 may identify a distance from an upper end of the electronic device 900 to a center position of the selected content in a vertical direction. In an embodiment, the electronic device 900 may identify information related to the first position. For example, the electronic device 900 may identify a DP value associated with the first position.

In operation 1007, according to an embodiment, the electronic device 900 may display the selected content through the second display (e.g., the second display 820 of FIG. 8) based on the identified distance, in response to detecting a folding event.

In an embodiment, the electronic device 900 may display the selected content in at least a partial area of the second display 820 based on the identified distance, in response to detecting the folding event of the electronic device 900, wherein the at least a partial area of the second display 820 is distanced away from the one end of the electronic device 900 by the identified distance. In an embodiment, the folding event may be an action to change the state of the electronic device 900 from an unfolded state to a folded state in which the first surface (e.g., the first surface 813 of FIG. 8) and the second surface (e.g., the second surface 815 of FIG. 8) of the first display 810 face each other. In an embodiment, the folding event may be referred to as an "in-folding event".

In an embodiment, the electronic device 900 may determine the position of the selected content on the second display 820 such that the second distance from one end of the electronic device 900 to the selected content on the second display 820 matches the first distance on the first display 810. For example, the electronic device 900 may determine the position of the selected content on the second display 820 such that the distance from one end of the electronic device 900 to the center of the selected content matches the identified first distance. In an embodiment, the electronic device 900 may determine that the DP value corresponding to the first position of the selected content on the first display 810 is the DP value corresponding to the center position in the vertical direction of the selected content on the second display 820. In an embodiment, the electronic device 900 may display the selected content through the second display 820 based on the determined position. The electronic device 900 may maintain the first position of the selected content on the second display 820 even after the folding event by identifying the DP value corresponding to the first position of the selected content.

In an embodiment, the size of the second display 820 may be smaller than the size of the first surface 813 or the second surface 815 of the first display 810. The electronic device 900 may identify a ratio of the distance from an upper end of the electronic device 900 to the selected content to the length of the first display 810 in the vertical direction. Based on the detection of the folding event, the electronic device 900 may determine the first position in the vertical direction of the selected content so that the first position of the selected content is maintained on the second display according to the ratio identified.

In an embodiment, the electronic device 900 may adjust the size of the selected content on the second display 820 based on identifying the length of the selected content in the second direction on the first display 810. In an embodiment, based on detecting the folding event, the electronic device 900 may identify whether the length of the selected content in the second direction on the first display 810 exceeds a threshold length. For example, the electronic device 900 may identify whether the horizontal length of the selected content on the first display 810 exceeds half of the horizontal length of the first display 810. In an embodiment, the electronic device 900 may adjust the size of the selected content based on the length in the second direction of the second display 820, based on identifying that the length in the second direction of the selected content on the first display 810 exceeds the threshold length. For example, the electronic device 900 may adjust the size of the selected content corresponding to the length of the second display 820 in the horizontal direction. In an embodiment, the electronic device 900 may display the resized content through the second display 820.

In an embodiment, the electronic device 900 may dispose the selected content on the second display 820 after detecting a folding event by identifying the selected content. In an embodiment, the one or more content displayed on the first display 810 before the folding event may be the content identified from an external electronic device (e.g., the server 108 of FIG. 1). In an embodiment, the type of the selected content may be an image. The electronic device 900 may identify whether the selected content displayed on the second display 820 is the same content as the selected content displayed on the folded state after the folding event, based on image recognition. For example, the electronic device 900 may identify the selected content by recognizing one or more features within the selected content. The image recognition method used by the electronic device 900 is not limited to the above-described example. A detailed description of image recognition and a specific method for recognizing features in an image will be omitted. In an embodiment, the type of the selected content may be text. The electronic device 900 may identify whether the selected content displayed on the second display 820 is the same content as the selected content displayed on the folded state after the folding event, based on identifying a text matching rate. For example, the electronic device 900 may identify the selected content by identifying a matching rate between content in the form of a string. A method for the electronic device 900 to identify the text matching rate is not limited to the above-described example. A detailed description of the specific method for identifying the text matching rate will be omitted.

In an embodiment, the electronic device 900 may dispose the selected content on the second display 820 after detecting a folding event, based on identifying index information corresponding to the selected content. In an embodiment, the one or more content displayed on the first display 810 before the folding event may be the content pre-stored in the memory (e.g., the memory 930 of FIG. 9). In an embodiment, the electronic device 900 may previously store index information corresponding to each content in the memory 930. In an embodiment, the electronic device 900 may identify whether the selected content displayed on the second display 820 is the same content as the selected content displayed on the folded state after the folding event, based on identifying the index information about the selected content. In an embodiment, after identifying the selected content, the electronic device 900 may display the selected content through the second display 820 based on the identified distance. In an embodiment, the electronic device 900 may display the remaining content through the second display 820 based on index numbers respectively corresponding to the remaining content displayed on the first display 810.

In an embodiment, the electronic device 900 may maintain the position in the vertical direction of the selected content on the second display 820 after the folding event to be identical to the position in the vertical direction of the selected content on the first display 810 before the folding event. In an embodiment, the electronic device 900 may determine the position of one or more content on the second display 820 after the folding event, based on the pre-trained position estimation model. In an embodiment, the position estimation model may estimate a DP value corresponding to the content such that the center position in the vertical direction of any one of a plurality of content displayed on the first display 810 before the folding event is maintained on the second display 820 after the folding event. In an embodiment, the position estimation model may use the DP value corresponding to the content displayed on the first display 810 and the DP value corresponding to the content displayed on the second display 820 as training data. For example, based on detecting the folding event, the electronic device 900 may input the DP values respectively corresponding to one or more content displayed on the first display 810 before the folding event, to the pre-trained position estimation model, based on detecting the folding event. The position estimation model may estimate the DP values respectively corresponding to one or more content on the second display. The electronic device 900 may determine the position of the one or more content on the second display 820 based on the DP value output by the position estimation model.

Figure 11:
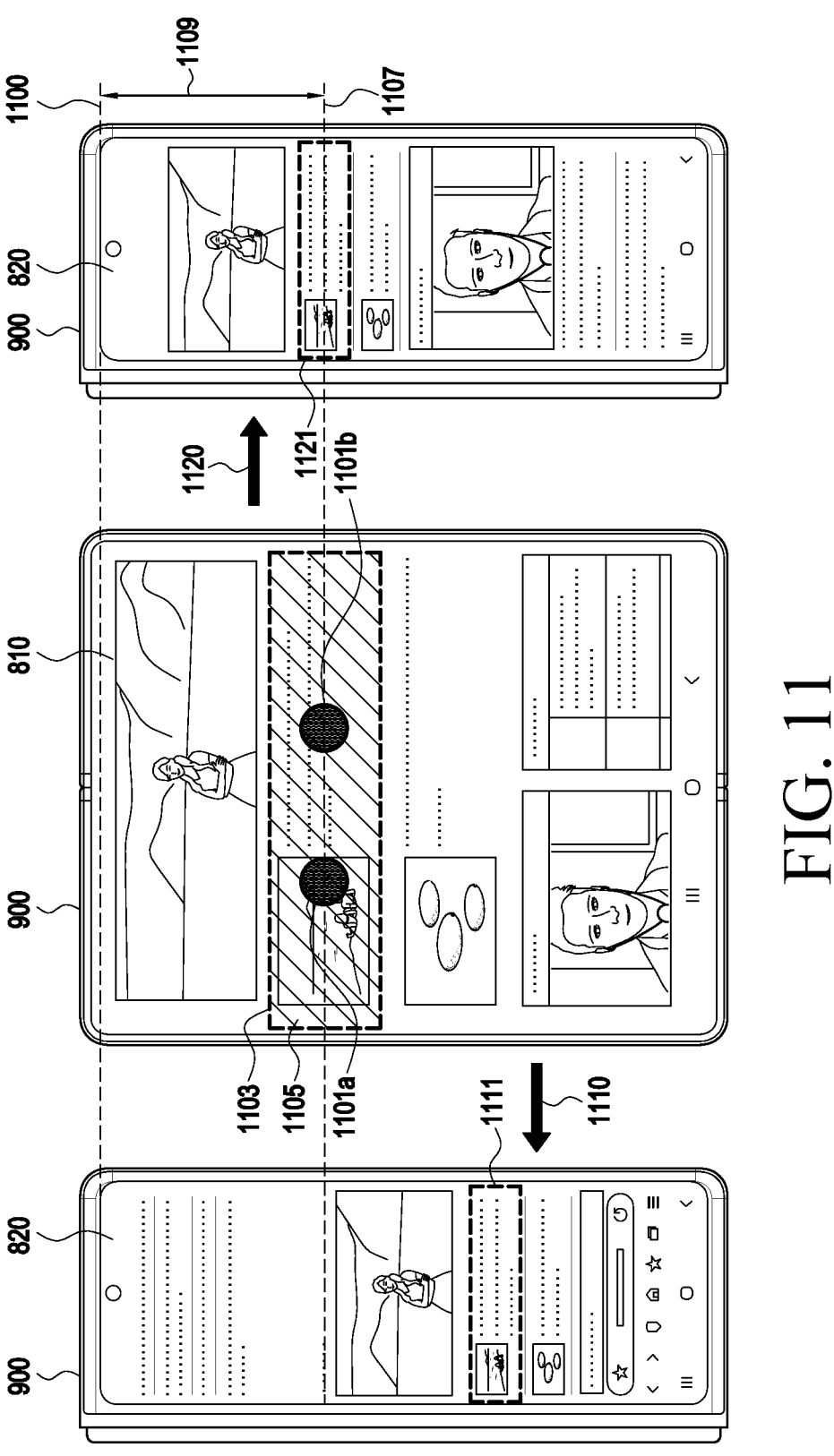
FIG. 11 is a view illustrating an example of displaying selected content, based on detecting a folding event of an electronic device according to an embodiment of the disclosure.

FIG. 11 is a view illustrating an example of displaying selected content, based on detecting a folding event of an electronic device 900 according to an embodiment of the disclosure.

Referring to FIG. 11, in an embodiment, the electronic device 900 (e.g., the processor 940 of FIG. 9) may display one or more content on the first display 810. For example, the electronic device 900 may display one or more content related to an application on the first display 810 by executing the application stored in a memory (e.g., the memory 930 of FIG. 9). In an embodiment, the electronic device 900 (e.g., the communication module 920 of FIG. 9) may receive one or more content from an external electronic device (e.g., the server 108 of FIG. 1), via a network (e.g., the second network 199 of FIG. 1). The electronic device 900 may display one or more of the received content through the first display 810 based on detecting that the electronic device 900 is in an unfolded state.

In an embodiment, the electronic device 900 may identify a plurality of user inputs 1101a and 1101b for the first display 810. For example, the user input may be an action for simultaneously touching a plurality of areas within the first display 810. The user input is not limited to the above-described examples. In an embodiment, the plurality of user inputs 1101a and 1101b may be referred to as a "first user input" 1101a and a "second user input" 1101b, respectively.

In an embodiment, the electronic device 900 may select any one content 1103 from among one or more content displayed on the first display 810 based on the identified plurality of user inputs 1101a and 1101b. In an embodiment, the electronic device 900 may identify an area corresponding to each of the identified user inputs 1101a and 1101b on the first display 810. The electronic device 900 may select the content 1103 including an area corresponding to each of the user inputs 1101a and 1101b. In an embodiment, the electronic device 900 may display a visual effect 1105 in the area corresponding to the selected content through the first display 810.

In an embodiment, the electronic device 900 may identify a distance from one end of the electronic device 900 to the selected content based on the position of the selected content. In an embodiment, the electronic device 900 may identify a distance from one end of the electronic device 900 to the center of the selected content. For example, the electronic device 900 may identify a distance 1109 from an upper end 1100 of the electronic device 900 to a center position 1107 of the selected content in the vertical direction. In an embodiment, the electronic device 900 may identify the distance 1109 by identifying the DP value corresponding to the selected content.

In an embodiment, referring to reference numeral 1110, based on detecting the folding event, the electronic device 900 may randomly display one or more content displayed on the first display 810 before the folding event, through the second display 820. In an embodiment, the electronic device 900 may randomly display the selected content (1111) on the second display 820. In an embodiment, the DP value in the vertical direction corresponding to the selected content 1111 displayed on the second display 820 may be different from the DP value in the vertical direction corresponding to the selected content 1103 on the first display 810. In an embodiment, the electronic device 900 may maintain the center position of the selected content 1111 in the vertical direction on the second display 820 to be the same as the center position 1107 of the content 1103 in the vertical direction on the first display 810, based on an additional user input. In an embodiment, the additional user input may be a swipe action on the second display 820 in the direction toward the upper end 1100 of the electronic device 900. The additional user input is not limited to the above-described examples.

In an embodiment, referring to reference numeral 1120, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. In an embodiment, the electronic device 900 may determine the position of the selected content 1121 on the second display 820 such that the distance from the one end of the electronic device 900 to the center of the selected content is identical to the identified distance 1109. For example, the electronic device 900 may determine the DP value in the vertical direction corresponding to the selected content 1121 so that the center position 1107 of the selected content 1121 in the vertical direction remains identical on the first display 810 and the second display 820. The electronic device 900 may display the selected content 1121 through the second display 820 based on the determined DP value. The electronic device 900 may maintain the center position of the selected content 1121 in the vertical direction on the second display 820 to be the same as the center position 1107 of the content 1103 in the vertical direction on the first display 810, based on detecting a folding event even without an additional user input.

Figure 12:
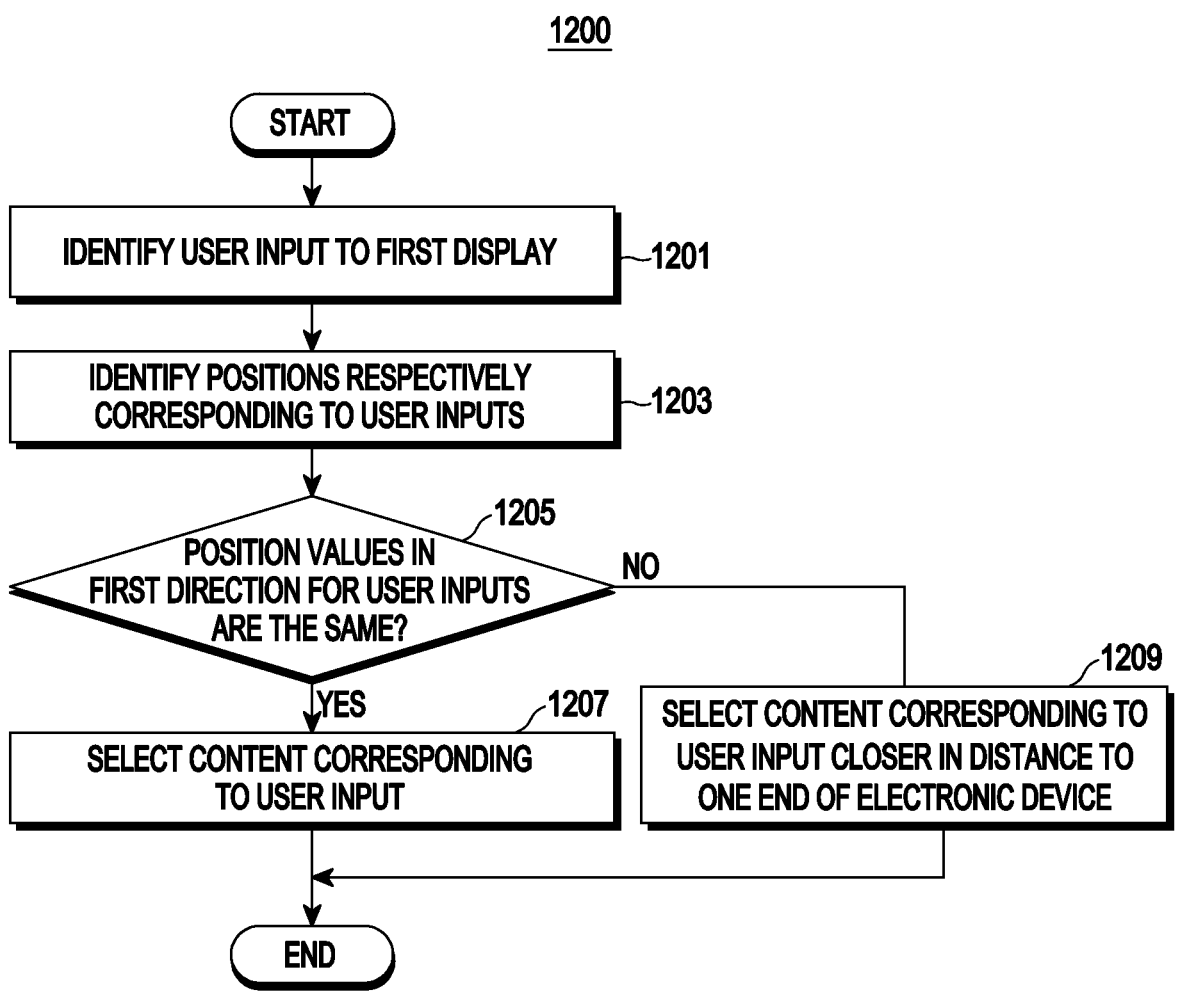
FIG. 12 is a flowchart illustrating an operation of selecting content, based on a position corresponding to a user input of an electronic device according to an embodiment of the disclosure.

FIG. 12 is a flowchart 1200 illustrating an operation of selecting content, based on a position corresponding to a user input of an electronic device 900 according to an embodiment of the disclosure.

Referring to FIG. 12, in operation 1201, in one embodiment, the electronic device 900 (e.g., the processor 940 of FIG. 9) may identify a user input for the first display (e.g., the first display 810 of FIG. 8). In an embodiment, the electronic device 900 may simultaneously identify a plurality of user inputs on the first display 810. Since operation 1201 is at least partially the same or similar to the operation 1001, no detailed description thereof is presented below.

In operation 1203, in an embodiment, the electronic device 900 may identify the position corresponding to each user input. In an embodiment, the electronic device 900 may identify the center position corresponding to each user input. In an embodiment, the electronic device 900 may identify the DP value of the center position corresponding to each user input.

In operation 1205, in an embodiment, the electronic device 900 may identify whether the position values in the first direction for the user inputs are the identical. In an embodiment, the electronic device 900 may identify whether the position values in the vertical direction for the user inputs are identical. For example, the electronic device 900 may identify whether the DP value in the vertical direction for the first user input (e.g., the first user input 1101a of FIG. 11) is the same as the DP value in the vertical direction for the second user input (e.g., the second user input 1101b of FIG. 11).

In operation 1207, in an embodiment, the electronic device 900 may select the content corresponding to the user inputs based on identifying that the position values in the first direction for the user inputs are the identical (yes in operation 1207). For example, the electronic device 900 may identify whether the DP value in the vertical direction for the first user input 1101a is the same as the DP value in the vertical direction for the second user input 1101b. The electronic device 900 may select the content 1103 corresponding to the first user input 1101a and the second user input 1101b.

In operation 1209, in an embodiment, based on identifying that the position values in the first direction for the user inputs are different from each other (no in operation 1207), the electronic device 900 may select the content corresponding to a user input closest in distance to one end of the electronic device 900 from among the plurality of user inputs. In an embodiment, the electronic device 900 may select a content corresponding to a user input most adjacent to one end of the electronic device 900, based on identifying that the position values in the first direction of the user inputs are different. An example in which the electronic device 900 selects the content corresponding to the user input closer in distance to the one end of the electronic device 900 is described below with reference to FIGS. 13A and 13B.

Figure 13A:
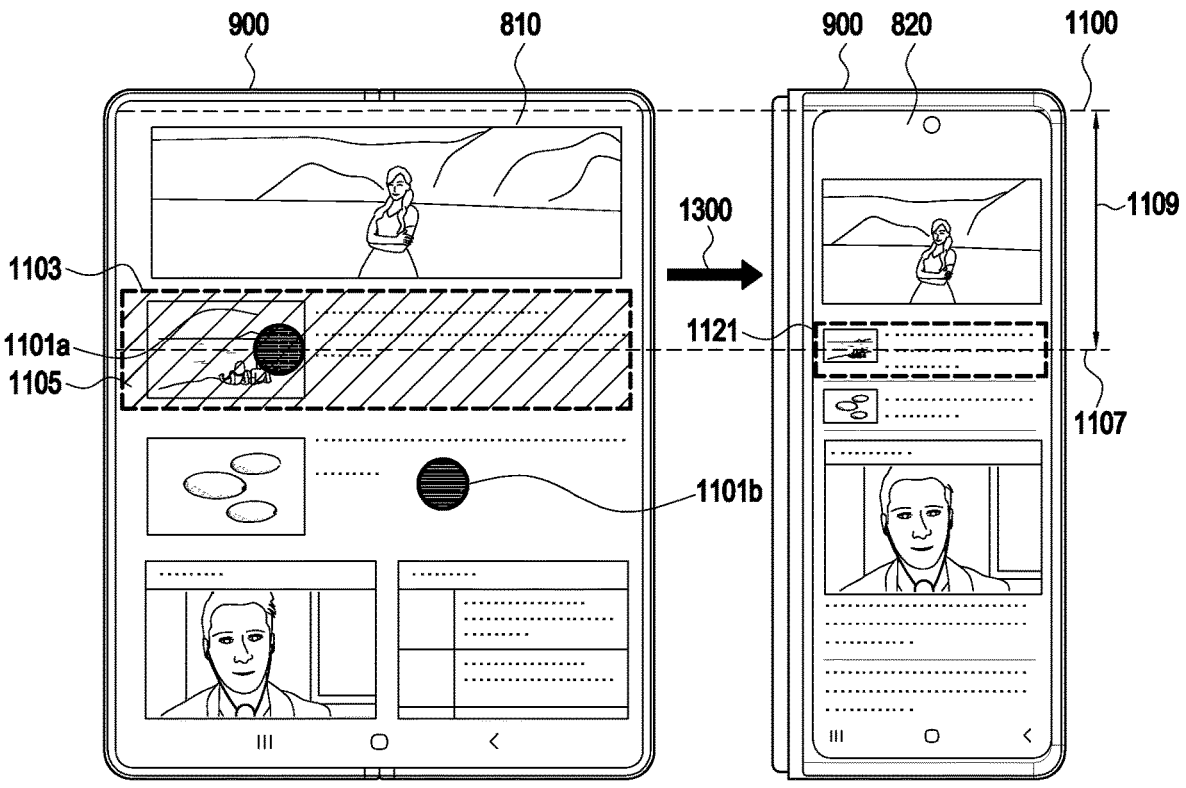
FIGS. 13A and 13B are views illustrating an example of selecting content, based on a position corresponding to a user input of an electronic device according to various embodiments of the disclosure.
Figure 13B:
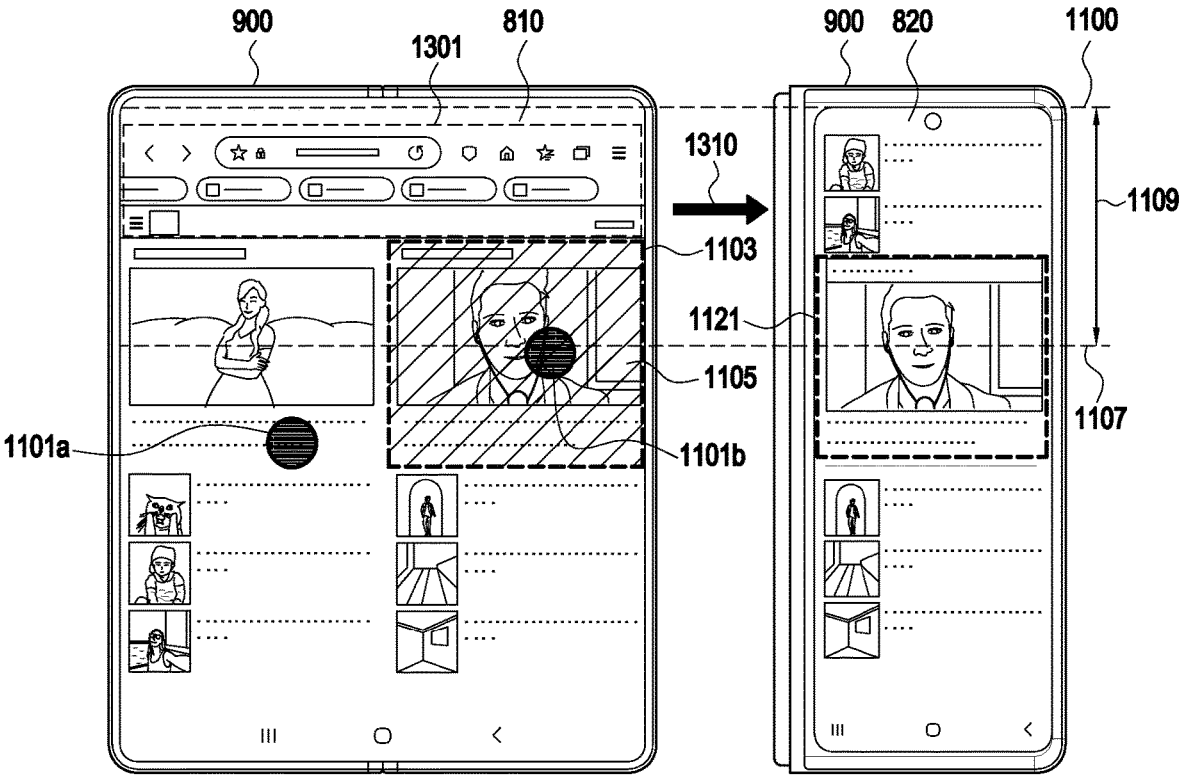

FIGS. 13A and 13B are views illustrating an example of selecting content, based on a position corresponding to a user input of an electronic device according to various embodiments of the disclosure.

In an embodiment, the electronic device 900 may select any one content from among the content respectively corresponding to the user inputs based on identifying that the content respectively corresponding to the user inputs differ from each other.

Referring to FIG. 13A, in an embodiment, the electronic device 900 (e.g., the processor 940) may display one or more content through the first display 810 in the unfolded state of the electronic device 900. A method in which the electronic device 900 displays one or more content through the first display 810 is at least partially identical or similar to that described in connection with FIG. 11, and no detailed description thereof is given.

In an embodiment, the electronic device 900 may simultaneously identify the first user input 1101a and the second user input 1101b on the first display 810. In an embodiment, the electronic device 900 may identify the positions respectively corresponding to the first user input 1101a and the second user input 1101b. The method in which the electronic device 900 identifies the position corresponding to the user input is at least partially identical or similar to that described in connection with FIG. 11, and no detailed description thereof is given.

In an embodiment, the electronic device 900 may identify whether the position values in the first direction for the first user input 1101a and the second user input 1101b, respectively, are the identical. For example, the electronic device 900 may identify whether the DP values in the vertical direction corresponding to the first user input 1101a and the second user input 1101b, respectively, are the identical. In an embodiment, the electronic device 900 may select the content 1103 corresponding to a user input closer in distance to an upper end 1100 of the electronic device 900 based on identifying that the DP values in the vertical direction corresponding to the first user input 1101a and the second user input 1101b, respectively, are different from each other. In an embodiment, the electronic device 900 may display a visual effect 1105 in the area corresponding to the selected content through the first display 810. In an embodiment, the electronic device 900 may identify a distance 1109 from an upper end 1100 of the electronic device to the selected content 1103.

In an embodiment, referring to reference numeral 1300, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. The electronic device 900 may determine the DP value in the vertical direction corresponding to the selected content 1121 so that the center position 1107 of the selected content 1105 or 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display 820 based on detecting a folding event even without an additional user input.

Referring to FIG. 13B, in an embodiment, the electronic device 900 (e.g., the processor 940) may display one or more content through the first display 810 in the unfolded state of the electronic device 900. In an embodiment, the electronic device 900 may display one or more content on the screen of the first display 810 divided in the vertical direction, based on layout information about content, received from an external electronic device (e.g., the server 108 of FIG. 1). For example, the electronic device 900 may display an execution screen of a web browsing application through the first display 810. The execution screen of the web browsing application may display a plurality of objects corresponding to a plurality of functions on at least a partial area 1301 of the first display 810.

In an embodiment, the electronic device 900 may simultaneously identify the first user input 1101*a* and the second user input 1101*b* on the first display 810. In an embodiment, the electronic device 900 may identify the positions respectively corresponding to the first user input 1101*a* and the second user input 1101*b*. The method in which the electronic device 900 identifies the position corresponding to the user input is at least partially identical or similar to that described in connection with FIG. 11, and no detailed description thereof is given.

In an embodiment, the electronic device 900 may identify whether the position values in the first direction for the first user input 1101*a* and the second user input 1101*b*, respectively, are the identical. For example, the electronic device 900 may identify whether the DP values in the vertical direction corresponding to the first user input 1101*a* and the second user input 1101*b*, respectively, are the identical. In an embodiment, the electronic device 900 may select the content 1103 corresponding to a user input closer in distance to an upper end 1100 of the electronic device 900 based on identifying that the DP values in the vertical direction corresponding to the first user input 1101*a* and the second user input 1101*b*, respectively, are different from each other. In an embodiment, the electronic device 900 may display a visual effect 1105 in the area corresponding to the selected content through the first display 810. In an embodiment, the electronic device 900 may identify a distance 1109 from an upper end 1100 of the electronic device to the selected content 1103. For example, regardless of the size or position of the area 1301 associated with the plurality of firsts, the electronic device 900 may maintain the center position in the vertical direction for the selected content 1103 even after the folding event, by identifying the distance 1109 from the upper end 1100 of the electronic device to the selected content 1103.

In an embodiment, referring to reference numeral 1310, the electronic device 900 may display the selected content 1121 in at least a partial area of the second display 820, based on detecting a folding event, wherein the at least a partial area of the second display 820 is distanced away from the one end of the electronic device 900 by the identified distance. The electronic device 900 may determine the DP value in the vertical direction corresponding to the selected content 1121 so that the center position 1107 of the selected content 1105 or 1121 in the vertical direction remains identical on the first display 810 and the second display 820. The electronic device 900 may display the selected content

1121 through the second display 820 based on the determined DP value. The electronic device 900 may maintain the center position in the vertical direction for the selected content to be the same on the first display 810 and the second display 820 based on detecting a folding event even without an additional user input.

Figure 14:
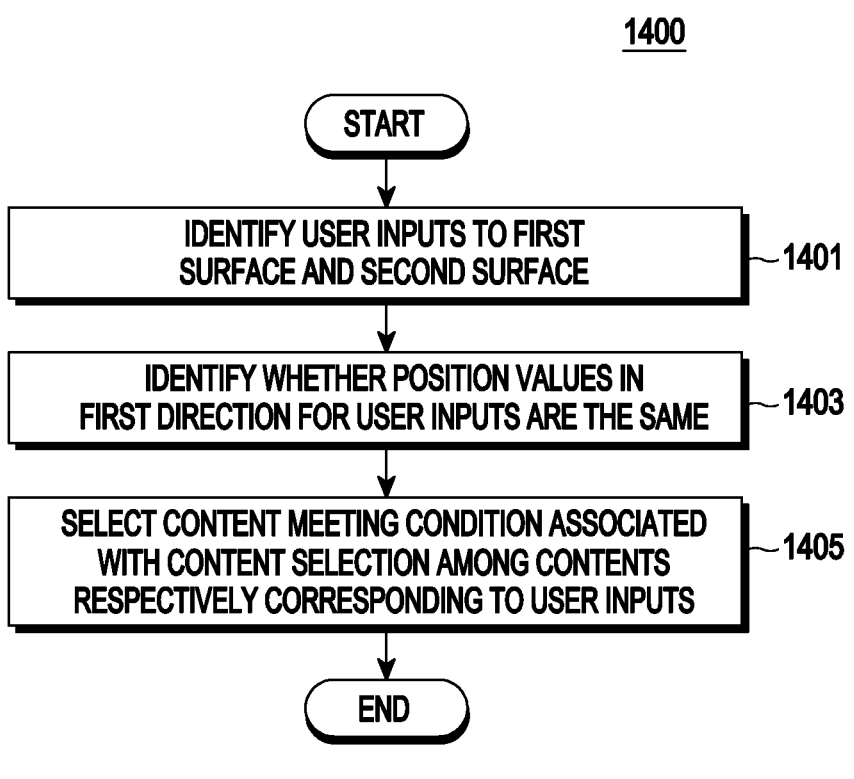
FIG. 14 is a flowchart illustrating an operation of selecting content, based on a user input to a first surface and a second surface of an electronic device according to an embodiment of the disclosure.

FIG. 14 is a flowchart 1400 illustrating an operation of selecting content, based on a user input to a first surface (e.g., the first surface 813 of FIG. 8) and a second surface (e.g., the second surface 815 of FIG. 8) of an electronic device 900 according to an embodiment of the disclosure.

In an embodiment, the electronic device 900 may select content satisfying a condition associated with selection of content, based on identifying that the position values in the first direction corresponding to the user inputs for the first surface 813 and the second surface, respectively, are the identical.

Referring to FIG. 14, in operation 1401, in an embodiment, the electronic device 900 (e.g., the processor 940) may identify user inputs on the first surface 813 and the second surface 815 of the first display (e.g., the first display 810 of FIG. 8). In an embodiment, the electronic device 900 may simultaneously identify a first user input on the first surface 813 and a second user input on the second surface 815. In an embodiment, the electronic device 900 may identify the positions corresponding to the first user input and the second user input. For example, the electronic device 900 may identify which area of the first surface 813 or the second surface 815 the user input corresponds to based on the DP value in the horizontal direction corresponding to each of the first user input and the second user input.

In operation 1403, in an embodiment, the electronic device 900 may identify whether the position values in the first direction for the user inputs are the identical. In an embodiment, the electronic device 900 may identify whether the DP values in the vertical direction corresponding to the first user input and the second user input, respectively, are the identical. In an embodiment, the electronic device 900 may select the content corresponding to a user input closer to one end of the electronic device 900 based on identifying that the DP values in the vertical direction corresponding to the first user input and the second user input, respectively, are different from each other.

In operation 1405, according to an embodiment, the electronic device 900 may select content that meets a condition associated with the selection of content from among content respectively corresponding to user inputs In an embodiment, the electronic device 900 may select the content meeting the condition associated with content selection from among the content respectively corresponding to the user inputs, based on identifying that the position values in the vertical direction corresponding to the first user input and the second user input, respectively, are the identical.

In an embodiment, the condition associated with content selection may include being content positioned on the first surface 813. The electronic device 900 may select the content corresponding to the first user input based on identifying that the position values in the vertical direction corresponding to the first user input and the second user input, respectively, are the identical.

In an embodiment, the condition associated with content selection may include being content positioned on the primary surface among the first surface 813 and the second surface 815. In an embodiment, the primary surface may be a surface on which user input is identified relatively frequently, and may also be referred to as a "main use surface" or "primary use surface". In an embodiment, the electronic device 900 may previously store, in the memory (e.g., the memory 930 of FIG. 9), an input pattern associated with which area of the first surface 813 or the second surface 815 of the first display 810 the position of the user input belongs to. The electronic device 900 may identify the primary use surface of the first surface 813 and the second surface 815 based on the input pattern for the first display 810. The electronic device 900 may select the content corresponding to the user input on the primary use surface based on identifying the primary use surface.

Figure 15A:
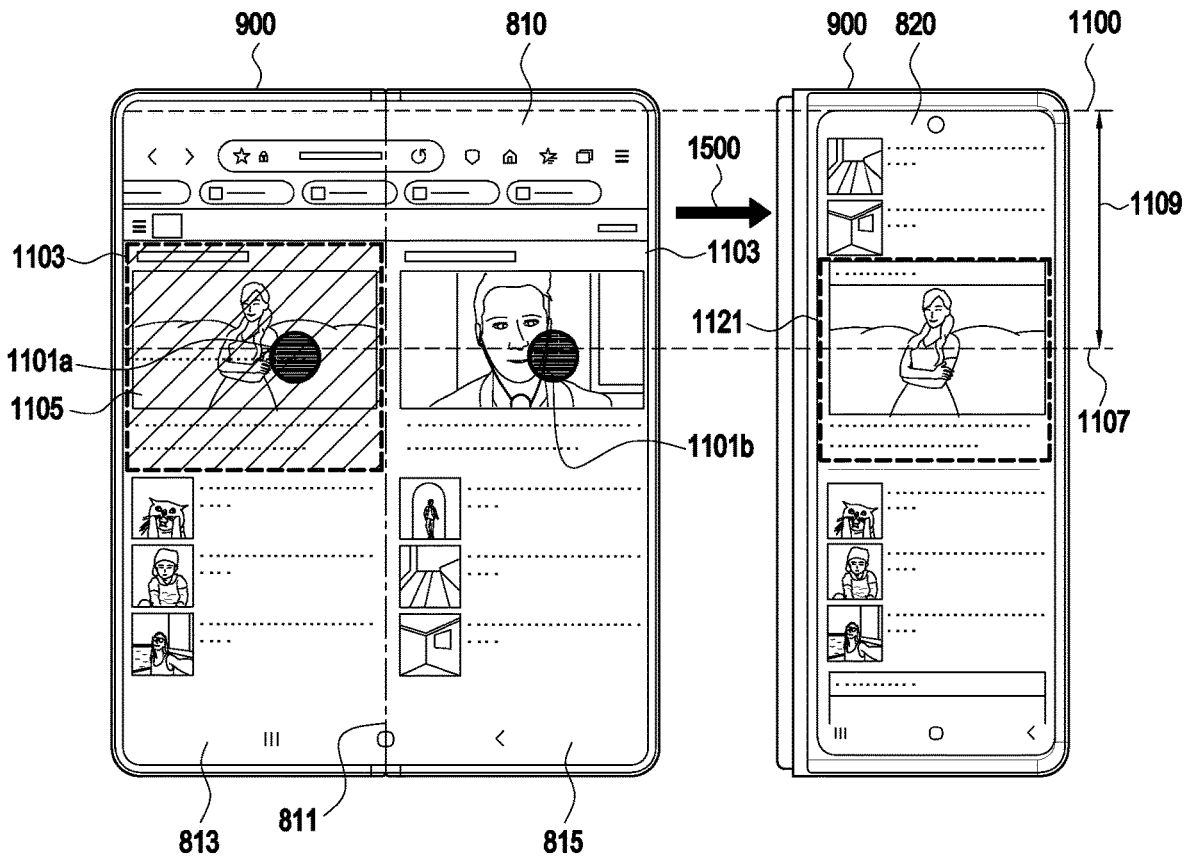
FIGS. 15A and 15B are views illustrating an example of selecting content, based on a user input to a first surface and a second surface of an electronic device according to various embodiments of the disclosure.
Figure 15B:
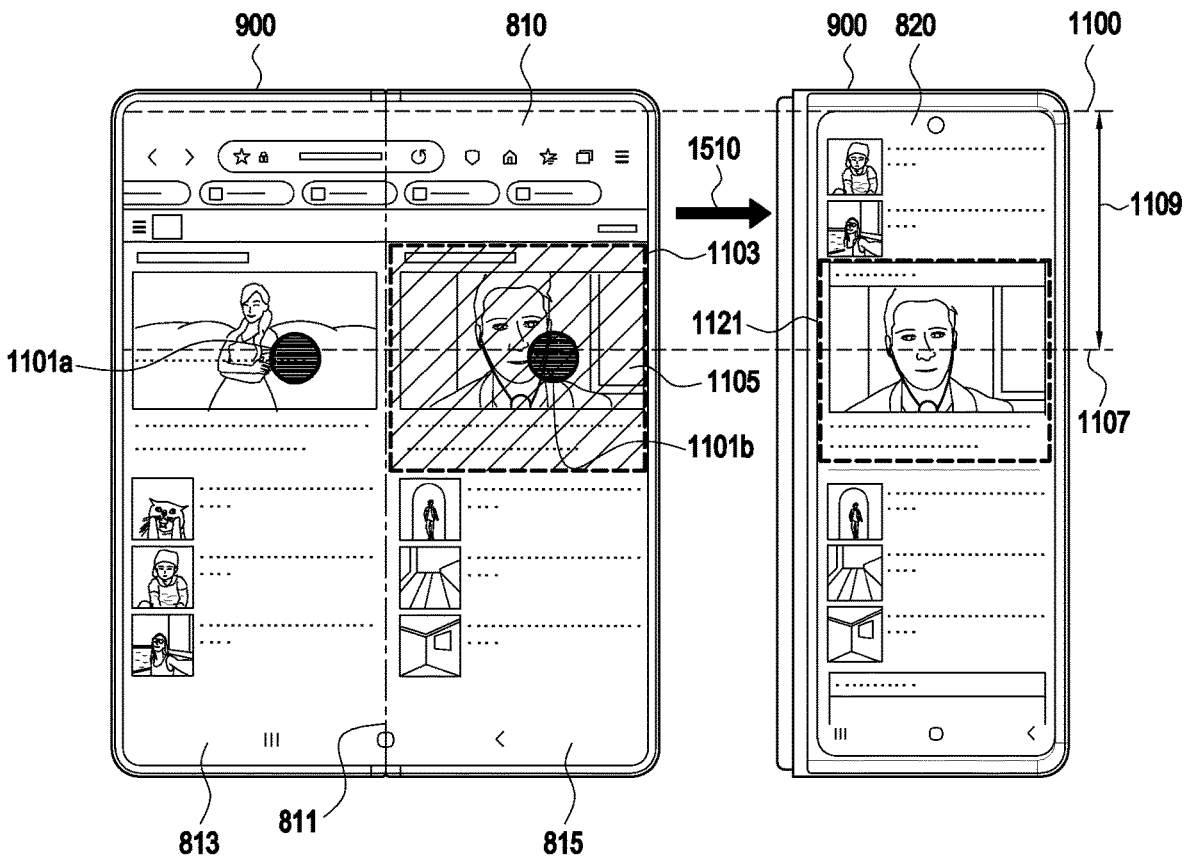

FIGS. 15A and 15B are views illustrating an example of selecting content, based on a user input to a first surface and a second surface of an electronic device according to various embodiments of the disclosure.

Referring to FIG. 15A, in an embodiment, the electronic device 900 (e.g., the processor 940) may display one or more content through the first display 810. In an embodiment, the electronic device 900 may identify a first user input 1101a on the first surface 813 of the first display 810 and a second user input 1101b on the second surface 815.

In an embodiment, the electronic device 900 may identify whether position values of user inputs in the first direction are the identical. In an embodiment, the electronic device 900 may identify whether the DP values in the vertical direction corresponding to the first user input 1101a and the second user input 1101b, respectively, are the identical. The electronic device 900 may select the content meeting the condition associated with content selection from among the content respectively corresponding to the user inputs, based on identifying that the DP values in the vertical direction corresponding to the first user input 1101a and the second user input 1101b, respectively, are the identical.

In an embodiment, the condition associated with content selection may include being content positioned on the first surface 813. The electronic device 900 may select the content 1103 corresponding to the first user input 1101a based on identifying that the position values in the vertical direction corresponding to the first user input and the second user input, respectively, are the identical.

In an embodiment, the condition associated with content selection may include being content positioned on the primary use surface of the first surface 813 and the second surface 815. In an embodiment, the electronic device 900 may identify the primary use surface of the first surface 813 and the second surface 815 based on a pre-stored input pattern for the first display 810. In an embodiment, the electronic device 900 may identify (or determine) the first surface as the primary use surface. The electronic device 900 may select the content 1103 corresponding to the first user input 1101a from among the content respectively corresponding to the user inputs. In an embodiment, the electronic device 900 may display a visual effect 1105 in the area corresponding to the selected content 1103 through the first display 810. In an embodiment, the electronic device 900 may identify a distance 1109 from an upper end 1100 of the electronic device to the selected content 1103.

In an embodiment, referring to reference numeral 1500, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. The electronic device 900 may determine the DP value in the vertical direction corresponding to the selected content 1121 so that the center position 1107 of the selected content 1103 or 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display 820 based on detecting a folding event even without an additional user input.

Referring to FIG. 15B, in an embodiment, the electronic device 900 (e.g., the processor 940) may display one or more content through the first display 810. In an embodiment, the electronic device 900 may identify a first user input 1101a on the first surface 813 of the first display 810 and a second user input 1101b on the second surface 815.

In an embodiment, the electronic device 900 may identify whether position values of user inputs in the first direction are the identical. In an embodiment, the electronic device 900 may identify whether the DP values in the vertical direction corresponding to the first user input 1101a and the second user input 1101b, respectively, are the identical. The electronic device 900 may select the content meeting the condition associated with content selection from among the content respectively corresponding to the user inputs, based on identifying that the DP values in the vertical direction corresponding to the first user input 1101a and the second user input 1101b, respectively, are the identical.

In an embodiment, the condition associated with content selection may include being content positioned on the second surface 815. The electronic device 900 may select the content 1103 corresponding to the second user input 1101b based on identifying that the position values in the vertical direction corresponding to the first user input and the second user input, respectively, are the identical.

In an embodiment, the condition associated with content selection may include being content positioned on the primary use surface of the first surface 813 and the second surface 815. In an embodiment, the electronic device 900 may identify the primary use surface of the first surface 813 and the second surface 815 based on a pre-stored input pattern for the first display 810. In an embodiment, the electronic device 900 may identify (or determine) the second surface as the primary use surface. The electronic device 900 may select the content 1103 corresponding to the second user input 1101b from among the content respectively corresponding to the user inputs. In an embodiment, the electronic device 900 may display a visual effect 1105 in the area corresponding to the selected content 1103 through the first display 810. In an embodiment, the electronic device 900 may identify a distance 1109 from an upper end 1100 of the electronic device to the selected content 1103.

In an embodiment, referring to reference numeral 1510, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. The electronic device 900 may determine the DP value in the vertical direction corresponding to the selected content 1121 so that the center position 1107 of the selected content 1103 or 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display 820 based on detecting a folding event even without an additional user input.

Figure 16:
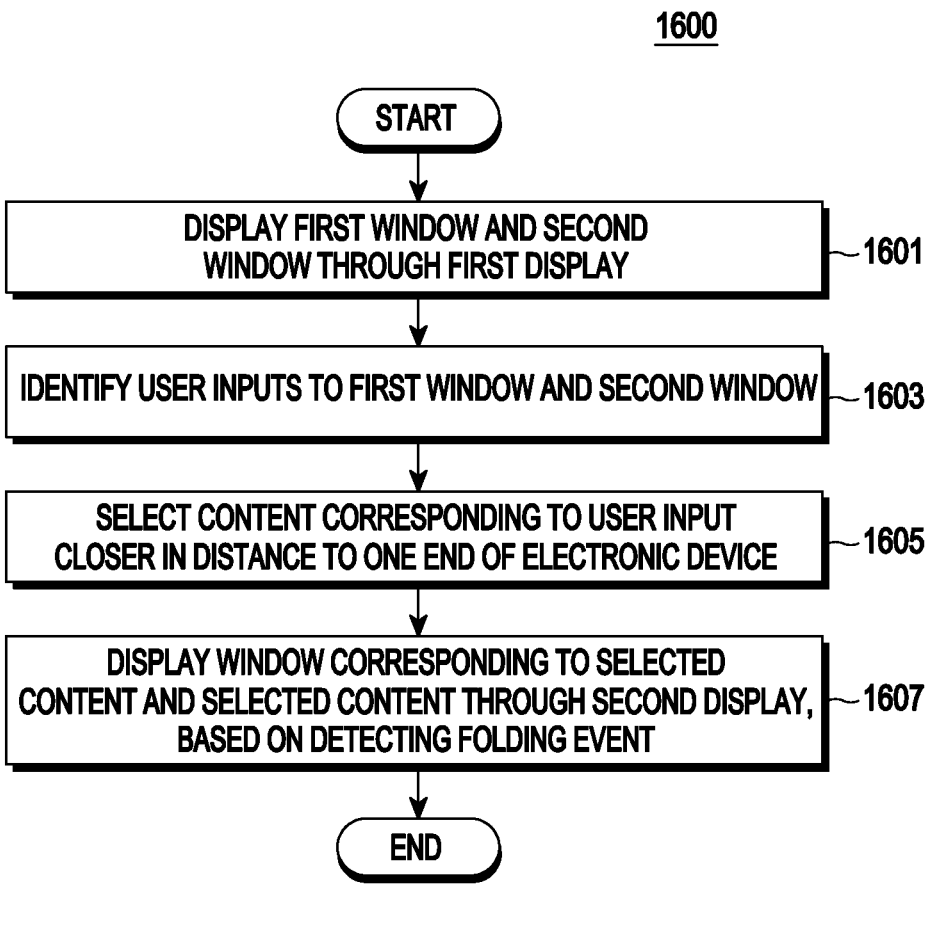
FIG. 16 is a flowchart illustrating a method for displaying a window including selected content, based on detecting a folding event of an electronic device according to an embodiment of the disclosure.

FIG. 16 is a flowchart 1600 illustrating a method for displaying a window including selected content, based on detecting a folding event of an electronic device 900 according to an embodiment of the disclosure.

In an embodiment, upon detecting a folding event, the electronic device 900 may display either a main executable screen or an auxiliary executable screen of an application through the second display 820, based on a user input.

Referring to FIG. 16, in operation 1601, in an embodiment, the electronic device 900 (e.g., the processor 940) may display a first window and a second window through the first display (e.g., the first display 810 of FIG. 8). In an embodiment, the electronic device 900 may display the main execution screen of the application on the first window. In an embodiment, the electronic device 900 may display one or more content on the first window. In an embodiment, the electronic device 900 may display the auxiliary execution screen of the application on the second window. In an embodiment, the electronic device 900 may display the first window and the second window on the same layer of the first display 810. In an embodiment, the electronic device 900 may display the second window on a layer higher than the layer of the first window through the first display 810.

In operation 1603, in an embodiment, the electronic device 900 may identify user inputs on the first window and the second window. In an embodiment, the electronic device 900 may simultaneously identify a first user input on the first window and a second user input on the second window. The electronic device 900 may identify the first user input and the second user input by identifying the position corresponding to the user input on the first display 810.

In operation 1605, in an embodiment, the electronic device 900 may select a content closer in distance to one end of the electronic device 900. In an embodiment, the electronic device 900 may select the content corresponding to the user input closer in distance to the one end of the electronic device 900 among the user inputs. For example, the electronic device 900 may identify a user input closer in distance to an upper end of the electronic device 900 based on the DP value in each user input in the vertical direction. In an embodiment, the electronic device 900 may select the content meeting a condition associated with content selection according to operation 1405, based on identifying that the DP values of the user inputs in the vertical direction are the identical. In an embodiment, the electronic device 900 may select the content corresponding to the user input closer in distance to the upper end of the electronic device 900, based on identifying that the DP values of the user inputs in the vertical direction are different from each other.

In operation 1607, in an embodiment, the electronic device 900 may display the window corresponding to the selected content and the selected content, based on detecting a folding event. In an embodiment, the electronic device 900 may display the window including the selected content of the first window and the second window and the selected content, through the second display 820 based on detecting a folding event.

Figure 17A:
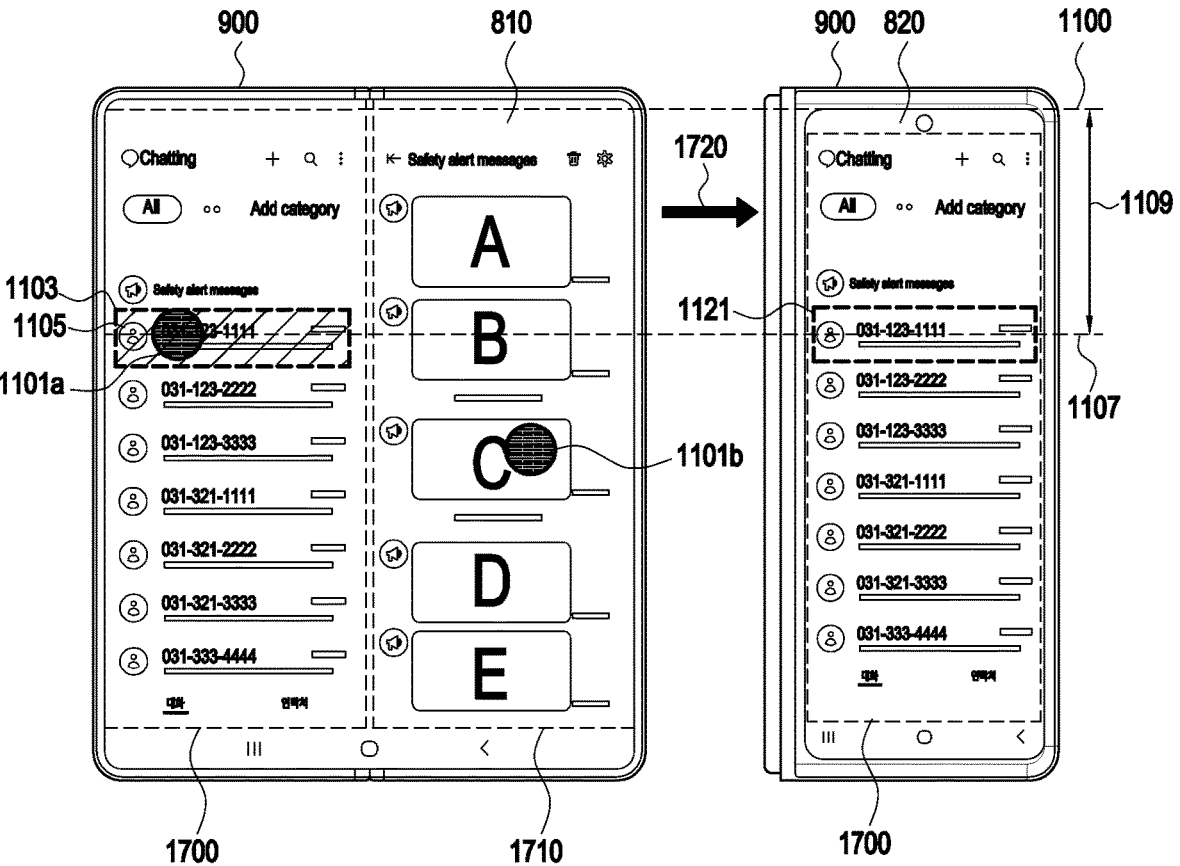
FIGS. 17A and 17B are views illustrating an example of displaying a window including selected content, based on detecting a folding event of an electronic device according to various embodiments of the disclosure.
Figure 17B:
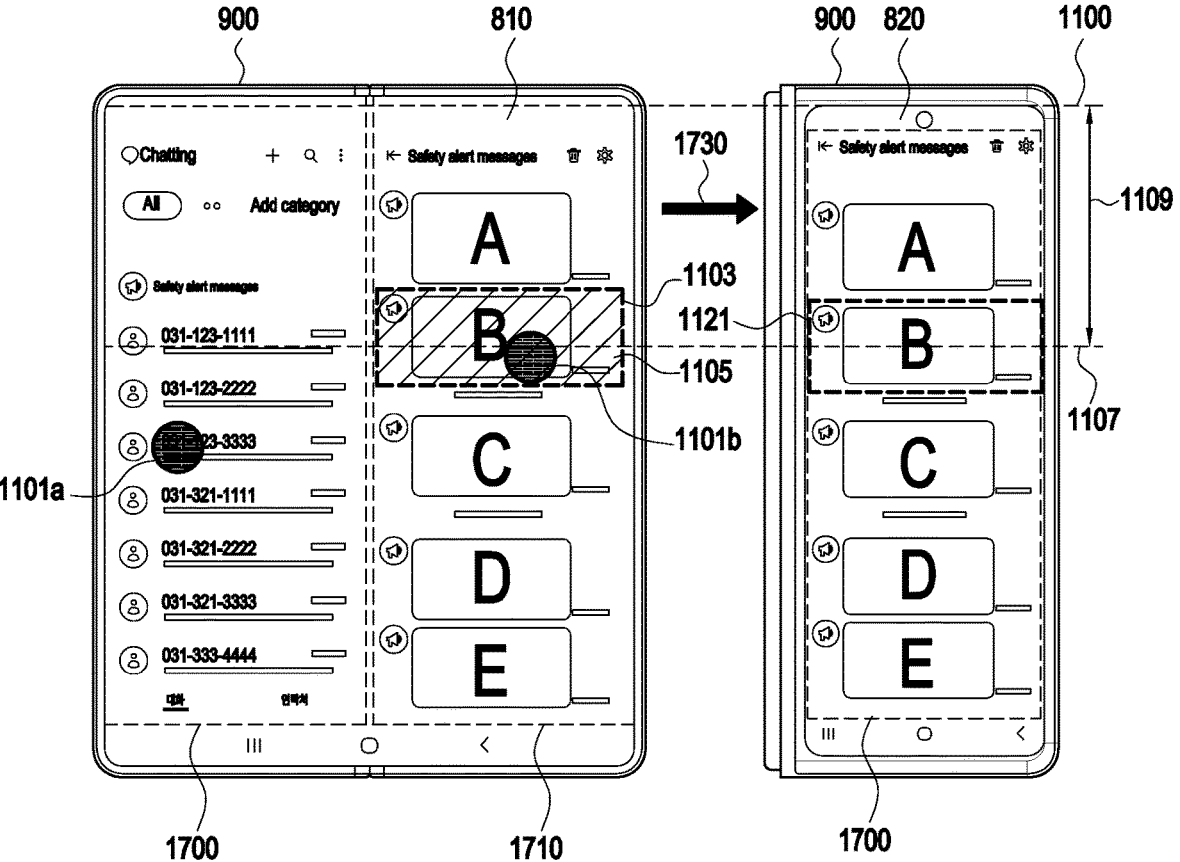

FIGS. 17A and 17B are views illustrating an example of displaying a window including selected content, based on detecting a folding event of an electronic device according to various embodiments of the disclosure.

Referring to FIG. 17A, in an embodiment, the electronic device 900 (e.g., the processor 940) may display a first window 1700 and a second window 1710 through the first display 810. In an embodiment, the electronic device 900 may display the main execution screen of the application on the first window 1700. In an embodiment, the electronic device 900 may display an extended execution screen corresponding to a specific content of the main execution screen, on the second window 1710. For example, the electronic device 900 may display the main execution screen of the messaging application on the first window 1700. The electronic device 900 may sequentially display a plurality of messages respectively corresponding to a plurality of external electronic devices (e.g., the electronic device 104 or server 108 of FIG. 1) from the latest message, on the first window 1700. In an embodiment, the electronic device 900 may display an extended execution screen regarding the message selected by a user input, on the second window 1710, based on the user input on the area corresponding to any one message among the plurality of messages. The electronic device 900 may display the extended execution screen including at least one message transmitted/received to/from a specific external electronic device, on the second window 1710.

In an embodiment, the electronic device 900 may identify user inputs for the respective ones of the first window 1700 and the second window 1710. In an embodiment, the electronic device 900 may simultaneously identify a first user input 1101a on the first window 1700 and a second user input 1101b on the second window 1710. The electronic device 900 may identify the first user input 1101a and the second user input 1101b by identifying the position corresponding to the user input on the first display 810.

In an embodiment, the electronic device 900 may select the content corresponding to the user input closer in distance to the one end of the electronic device 900 among the user inputs. For example, the electronic device 900 may identify a user input closer in distance to an upper end 1100 of the electronic device 900 based on the DP value in each user input in the vertical direction. In an embodiment, the electronic device 900 may select the content 1103 corresponding to the user input closer in distance to the upper end of the electronic device 900, based on identifying that the DP values of the user inputs in the vertical direction are different from each other. In an embodiment, the electronic device 900 may display a visual effect 1105 in the area corresponding to the selected content 1103 through the first display 810. In an embodiment, the electronic device 900 may identify a distance 1109 from an upper end 1100 of the electronic device to the selected content 1103.

In an embodiment, the electronic device 900 may display the window including the selected content 1103 of the first window 1700 and the second window 1710 and the selected content 1103, through the second display 820 based on detecting a folding event. The electronic device 900 may display the first window 1700 corresponding to the selected content 1103 and the selected content 1121 through the second display 820, based on detecting a folding event.

In an embodiment, referring to reference numeral 1720, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. The electronic device 900 may determine the DP value in the vertical direction corresponding to the selected content 1121 so that the center position 1107 of the selected content 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display 820 based on detecting a folding event even without an additional user input.

Referring to FIG. 17B, in an embodiment, the electronic device 900 (e.g., the processor 940) may display a first window 1700 and a second window 1710 through the first display 810. In an embodiment, the electronic device 900 may display the main execution screen of the application on the first window 1700. In an embodiment, the electronic device 900 may display an extended execution screen corresponding to a specific content of the main execution screen, on the second window 1710.

In an embodiment, the electronic device 900 may identify user inputs for the respective ones of the first window 1700 and the second window 1710. In an embodiment, the electronic device 900 may simultaneously identify a first user input 1101a on the first window 1700 and a second user input 1101b on the second window 1710. The electronic device 900 may identify the first user input 1101a and the second user input 1101b by identifying the position corresponding to the user input on the first display 810.

In an embodiment, the electronic device 900 may select the content corresponding to the user input closer in distance to the one end of the electronic device 900 among the user inputs. For example, the electronic device 900 may identify a user input closer in distance to an upper end 1100 of the electronic device 900 based on the DP value in each user input in the vertical direction. In an embodiment, the electronic device 900 may select the content 1103 corresponding to the user input closer in distance to the upper end of the electronic device 900, based on identifying that the DP values of the user inputs in the vertical direction are different from each other. In an embodiment, the electronic device 900 may display a visual effect 1105 in the area corresponding to the selected content 1103 through the first display 810. In an embodiment, the electronic device 900 may identify a distance 1109 from an upper end 1100 of the electronic device to the selected content 1103.

In an embodiment, the electronic device 900 may display the window including the selected content 1103 of the first window 1700 and the second window 1710 and the selected content 1103, through the second display 820 based on detecting a folding event. The electronic device 900 may display the second window 1710 corresponding to the selected content 1103 and the selected content 1121 through the second display 820, based on detecting a folding event.

In an embodiment, referring to reference numeral 1730, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. The electronic device 900 may determine the DP value in the vertical direction corresponding to the selected content 1121 so that the center position 1107 of the selected content 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display 820 based on detecting a folding event even without an additional user input.

Figure 18A:
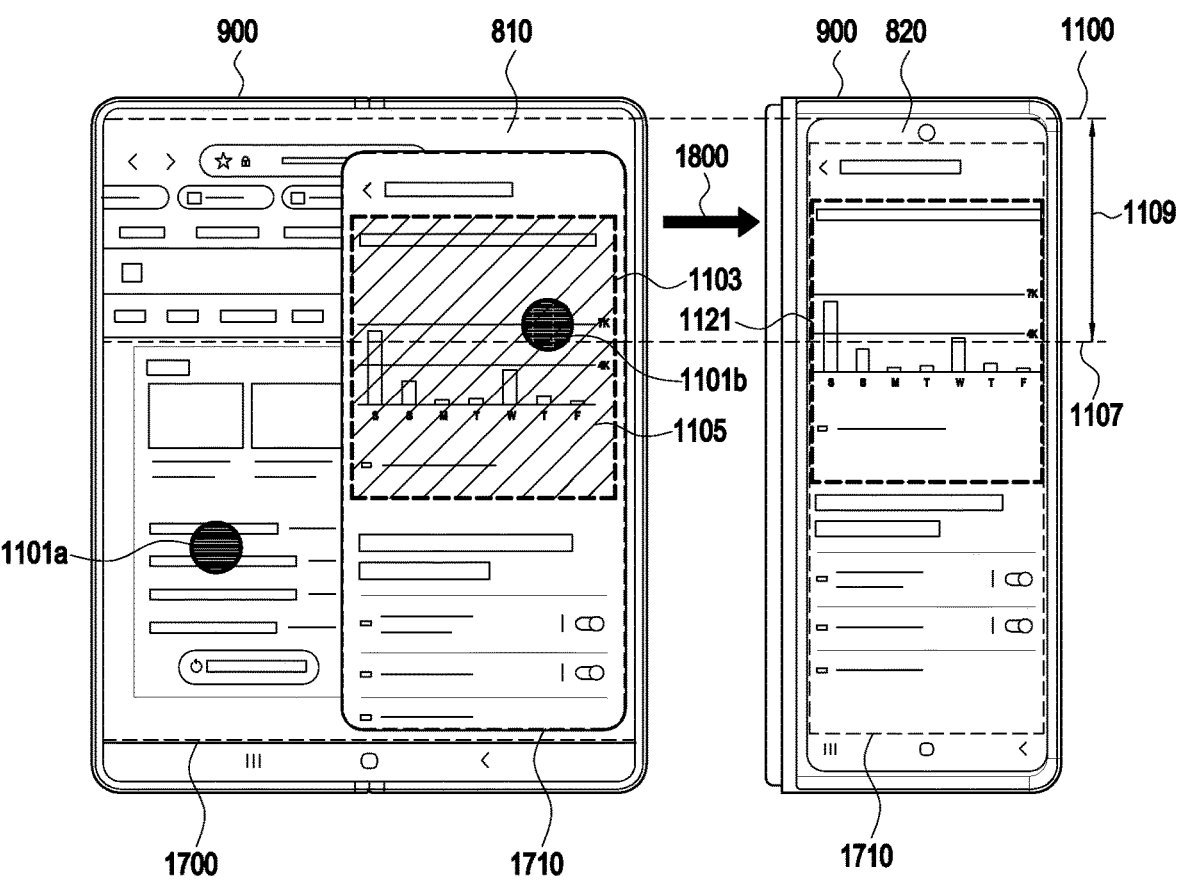
FIGS. 18A and 18B are views illustrating an example of displaying a window including selected content among windows having different layers by an electronic device according to various embodiments of the disclosure.
Figure 18B:
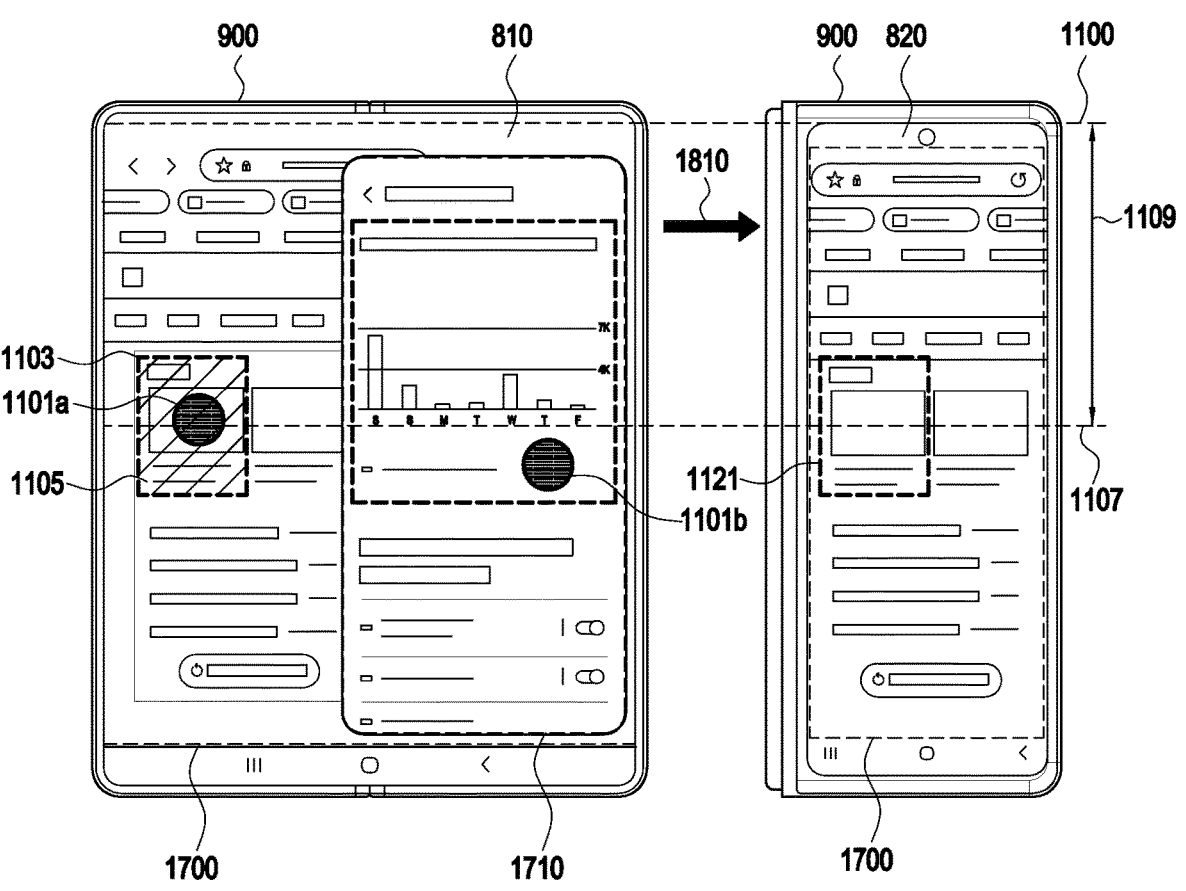

FIGS. 18A and 18B are views illustrating an example of displaying a window including selected content among windows having different layers by an electronic device according to various embodiments of the disclosure.

Referring to FIG. 18A, in an embodiment, the electronic device 900 (e.g., the processor 940) may display a first window 1700 and a second window 1710 through the first display 810. In an embodiment, the electronic device 900 may display the main execution screen of the application on the first window 1700. In an embodiment, the electronic device 900 may display the auxiliary execution screen of the application on the second window 1710. In an embodiment, the electronic device 900 may display the second window 1710 on a higher layer than the layer of the first window 1700 through the first display 810.

In an embodiment, the electronic device 900 may identify user inputs for the respective ones of the first window 1700 and the second window 1710. In an embodiment, the electronic device 900 may simultaneously identify a first user input 1101a on the first window 1700 and a second user input 1101b on the second window 1710. The electronic device 900 may identify the first user input 1101a and the second user input 1101b by identifying the position corresponding to the user input on the first display 810.

In an embodiment, the electronic device 900 may select the content corresponding to the user input closer in distance to the one end of the electronic device 900 among the user inputs. For example, the electronic device 900 may identify a user input closer in distance to an upper end 1100 of the electronic device 900 based on the DP value in each user input in the vertical direction. In an embodiment, the electronic device 900 may select the content 1103 corresponding to the user input closer in distance to the upper end of the electronic device 900, based on identifying that the DP values of the user inputs in the vertical direction are different from each other. In an embodiment, the electronic device 900 may display a visual effect 1105 in the area corresponding to the selected content 1103 through the first display 810. In an embodiment, the electronic device 900 may identify a distance 1109 from an upper end 1100 of the electronic device to the selected content 1103.

In an embodiment, the electronic device 900 may display the window including the selected content 1103 of the first window 1700 and the second window 1710 and the selected content 1103, through the second display 820 based on detecting a folding event. The electronic device 900 may display the first window 1700 corresponding to the selected content 1103 and the selected content 1121 through the second display 820, based on detecting a folding event.

In an embodiment, referring to reference numeral 1800, the electronic device 900 may display the selected content 1121 in at least a partial area of the second display 820, based on detecting a folding event, wherein the at least a partial area of the second display 820 is distanced away from the one end 1100 of the electronic device 900 by the identified distance 1109. The electronic device 900 may determine the DP value in the vertical direction corresponding to the selected content 1121 so that the center position 1107 of the selected content 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display 820 based on detecting a folding event even without an additional user input.

Referring to FIG. 18B, in an embodiment, the electronic device 900 (e.g., the processor 940) may display a first window 1700 and a second window 1710 through the first display 810. In an embodiment, the electronic device 900 may display the main execution screen of the application on the first window 1700. In an embodiment, the electronic device 900 may display the auxiliary execution screen of the application on the second window 1710. In an embodiment, the electronic device 900 may display the second window 1710 on a higher layer than the layer of the first window 1700 through the first display 810. In an embodiment, the electronic device 900 may display the second window 1710 on a higher layer than the layer of the first window 1700, based on a plurality of sequential user inputs on the first window 1700. In an embodiment, the electronic device 900 may display only the first window 1700 through the first display 810, based on a plurality of sequential user inputs on the second window 1710.

In an embodiment, the electronic device 900 may identify user inputs for the respective ones of the first window 1700 and the second window 1710. In an embodiment, the electronic device 900 may simultaneously identify a first user input 1101*a* on the first window 1700 and a second user input 1101*b* on the second window 1710. The electronic device 900 may identify the first user input 1101*a* and the second user input 1101*b* by identifying the position corresponding to the user input on the first display 810.

In an embodiment, the electronic device 900 may select the content corresponding to the user input closer in distance to the one end of the electronic device 900 among the user inputs. For example, the electronic device 900 may identify a user input closer in distance to an upper end 1100 of the electronic device 900 based on the DP value in each user input in the vertical direction. In an embodiment, the electronic device 900 may select the content 1103 corresponding to the user input closer in distance to the upper end of the electronic device 900, based on identifying that the DP values of the user inputs in the vertical direction are different from each other. In an embodiment, the electronic device 900 may display a visual effect 1105 in the area corresponding to the selected content 1103 through the first display 810. In an embodiment, the electronic device 900 may identify a distance 1109 from an upper end 1100 of the electronic device to the selected content 1103.

In an embodiment, the electronic device 900 may display the window including the selected content 1103 of the first window 1700 and the second window 1710 and the selected content 1103, through the second display 820 based on detecting a folding event. The electronic device 900 may display the first window 1700 corresponding to the selected content 1103 and the selected content 1121 through the second display 820, based on detecting a folding event.

In an embodiment, referring to reference numeral 1810, the electronic device 900 may display the selected content 1121 and the first window 1700 in at least a partial area of the second display 820, based on detecting a folding event, wherein the at least a partial area of the second display 820 is distanced away from the one end 1100 of the electronic device 900 by the identified distance 1109. In an embodiment, the electronic device 900 may determine the DP value in the vertical direction corresponding to the selected content 1121 such that the center position 1107 of the selected content 1121 in the vertical direction remains identical on the first display 810 and the second display 820. The electronic device 900 may display the selected content 1121 through the second display 820 based on the determined DP value. The electronic device 900 may maintain the center position in the vertical direction for the selected content to be the same on the first display 810 and the second display

820 based on detecting a folding event even without an additional user input. In an embodiment, the electronic device 900 may display only the first window 1700 through the second display 820 even without a plurality of sequential user inputs on the first display 810, based on detecting a folding event.

Figure 19:
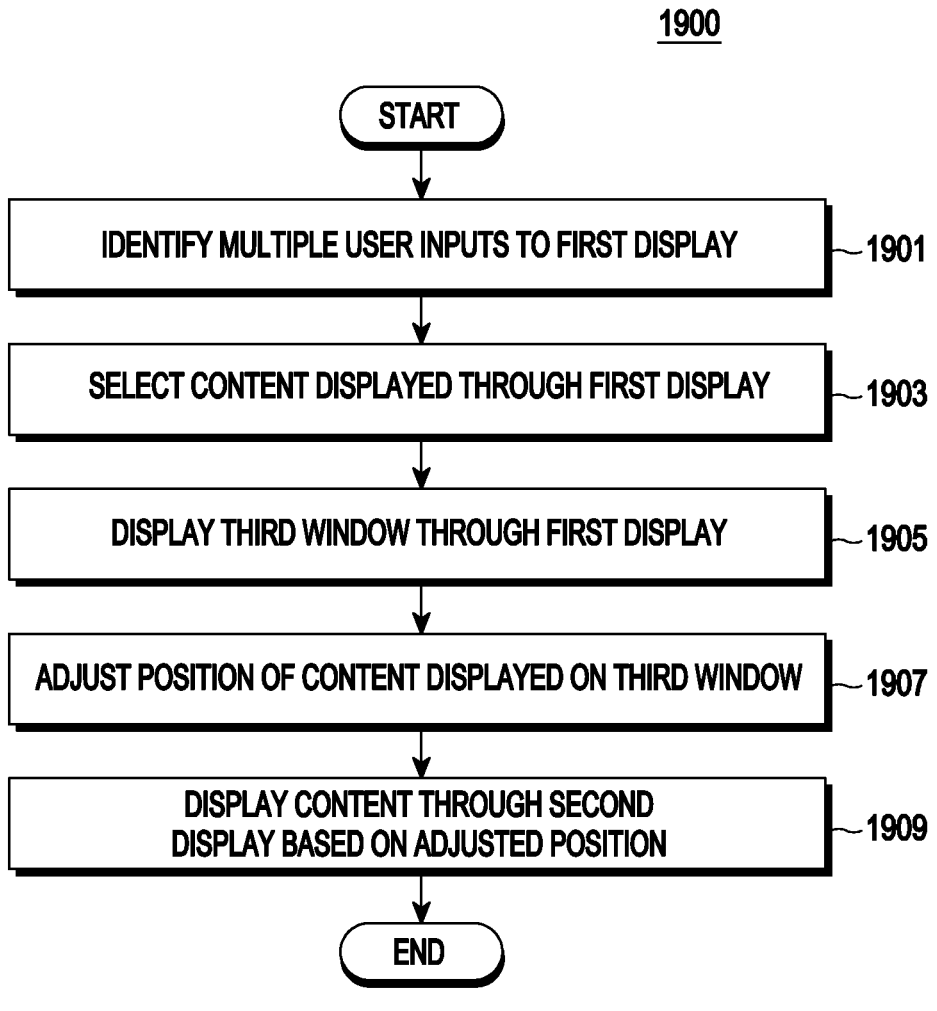
FIG. 19 is a flowchart illustrating a method for adjusting the position of selected content, based on a user input of an electronic device according to an embodiment of the disclosure.

FIG. 19 is a flowchart 1900 illustrating a method for adjusting the position of selected content, based on a user input of an electronic device 900 according to an embodiment of the disclosure.

Referring to FIG. 19, in operation 1901, in one embodiment, the electronic device 900 (e.g., the processor 940) may identify a plurality of user inputs for the first display (e.g., the first display 810 of FIG. 8). In an embodiment, the electronic device 900 may simultaneously identify the first user input and the second user input on the first display 810. Since operation 1901 is at least partially the same or similar to the operation 1001, no detailed description thereof is presented below.

In operation 1903, in an embodiment, the electronic device 900 may select the displayed content through the first display 810 based on a plurality of user inputs. In an embodiment, the electronic device 900 may select the content meeting a condition associated with content selection, based on identifying that the position values of the user inputs in the vertical direction are the identical. In an embodiment, the electronic device 900 may select the content corresponding to the user input closer in distance to one end of the electronic device 900, based on identifying that the position values of the plurality of user inputs in the vertical direction are different from each other. Since operation 1903 is at least partially the same or similar to operation 1209 or operation 1405, no detailed description thereof is presented below.

In operation 1905, in an embodiment, the electronic device 900 may display a third window 2020 through the first display 810.

In an embodiment, the electronic device 900 may identify whether a plurality of user inputs are input on the first display 810 during a preset time. In an embodiment, the electronic device 900 may display the third window for determining the position of the selected content on the second display 820 through the first display 810, based on identifying that user inputs are input during the preset time. In an embodiment, the electronic device 900 may display the third window on a higher layer than the execution screen displayed through the first display 810.

In operation 1907, in an embodiment, the electronic device 900 may adjust the position of the content displayed on the third window. In an embodiment, the electronic device 900 may determine (or adjust) the position of the selected content on the second display 820 based on a user input on the third window. A method in which the electronic device 900 determines the position for displaying the selected content on the second display 820 based on a user input on the third window is described below with reference to FIGS. 20A and 20B.

In operation 1909, in an embodiment, the electronic device 900 may display content through the second display 820 based on the adjusted position. In an embodiment, the electronic device 900 may display the selected content according to the position determined on the third window, through the second display 820, based on detecting a folding event. In an embodiment, the electronic device 900 may identify the position value corresponding to the selected content on the third window. For example, the electronic device 900 may identify the DP value corresponding to the selected content which has been repositioned on the third window. In an embodiment, the electronic device 900 may identify the distance from an upper end of the third window in the vertical direction to the repositioned content. In an embodiment, the electronic device 900 may identify the ratio of the distance from the upper end of the third window in the vertical direction to the repositioned content to the length of the third window in the vertical direction. In an embodiment, the electronic device 900 may determine the position of the selected content so that the ratio of the distance from the upper end of the electronic device 900 to the selected content to the length of the electronic device 900 in the vertical direction remains the same as the ratio identified using the third window, through the second display 820, based on detecting a folding event. In an embodiment, the electronic device 900 may display the selected content through the second display 820 based on the determined position. In an embodiment, the electronic device 900 may display the selected content on at least a partial area of the second display 820 corresponding to the intent of the user of the electronic device 900, based on the third window.

Figure 20A:
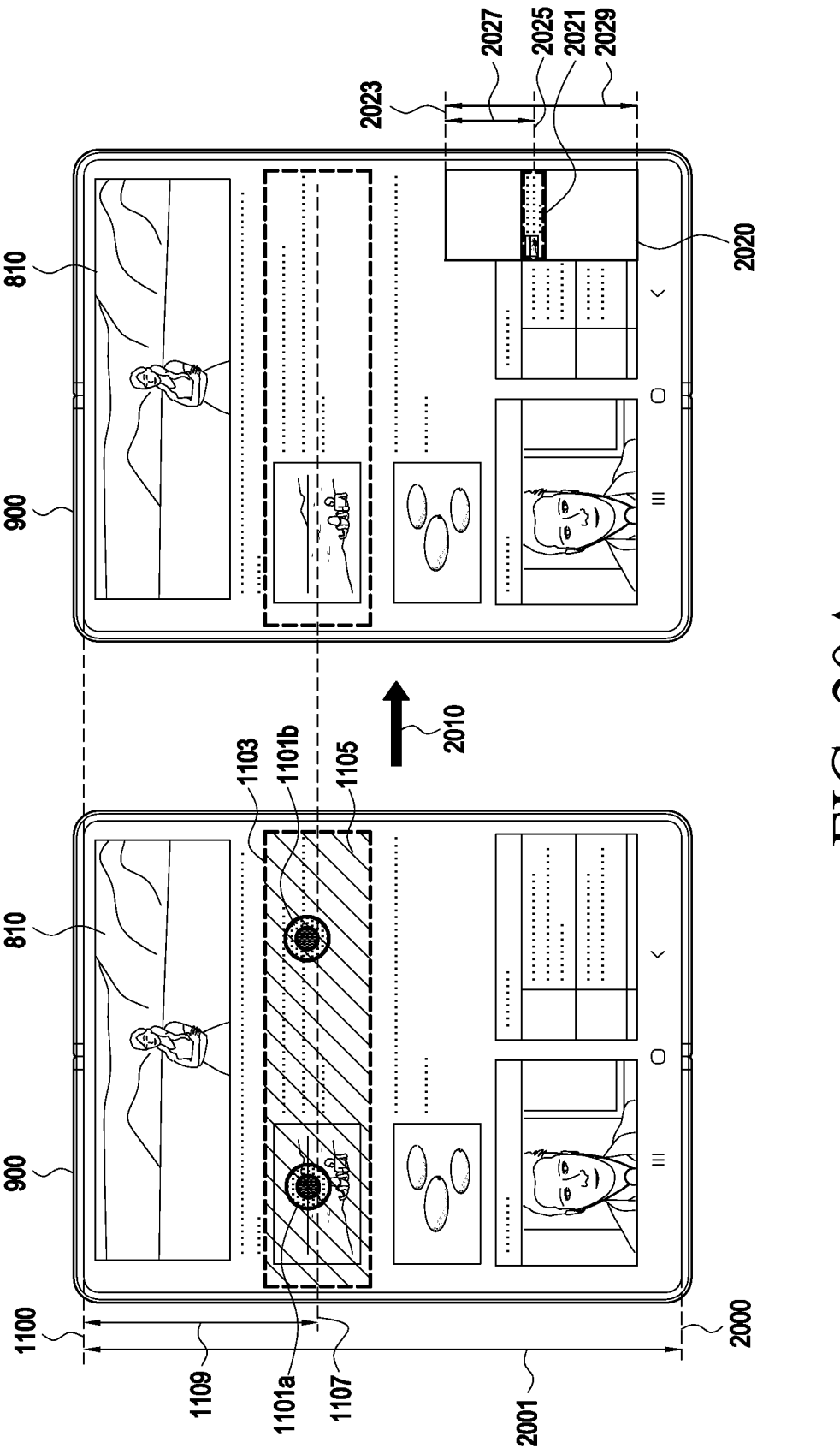
FIGS. 20A and 20B are views illustrating an example adjusting the position of selected content, based on a user input of an electronic device according to various embodiments of the disclosure.
Figure 20B:
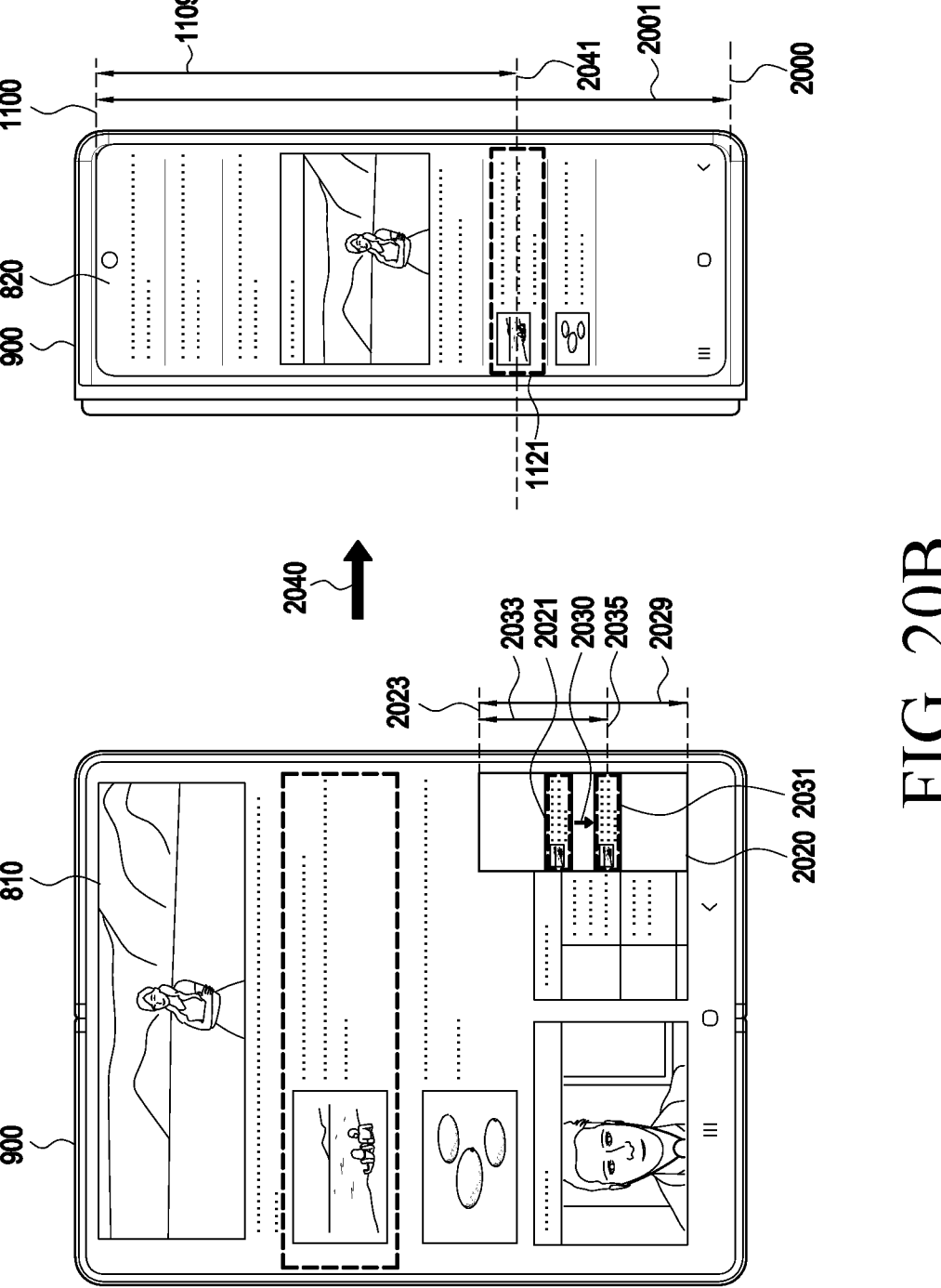

FIGS. 20A and 20B are views illustrating an example adjusting the position of selected content, based on a user input of an electronic device according to various embodiments of the disclosure.

Referring to FIG. 20A, in an embodiment, the electronic device 900 (e.g., the processor 940) may identify a plurality of user inputs on the first display 810. In an embodiment, the electronic device 900 may simultaneously identify the first user input 1101a and the second user input 1101b on the first display 810.

In an embodiment, the electronic device 900 may select the displayed content through the first display 810 based on a plurality of user inputs. In an embodiment, the electronic device 900 may select the content 1103 corresponding to user inputs, based on identifying that the position values in the vertical direction for the plurality of user inputs are the identical. In an embodiment, the electronic device 900 may display a visual effect 1105 in the area corresponding to the selected content 1103 through the first display 810.

In an embodiment, referring to reference numeral 2010, the electronic device 900 may identify whether a plurality of user inputs are input on the first display 810 during a preset time. In an embodiment, the electronic device 900 may display the third window 2020 for determining the position of the selected content on the second display 820 through the first display 810, based on identifying that user inputs are input during the preset time. In an embodiment, the electronic device 900 may display the third window 2020 on a higher layer than the execution screen displayed through the first display 810. In an embodiment, the electronic device 900 may determine the length 2029 of the third window 2020 in the vertical direction so that the ratio of the length 2029 of the third window 2020 in the vertical direction to the distance 2001 from an upper end 1100 of the electronic device 900 to a lower end 2000 has a preset value. In an embodiment, the electronic device 900 may display the selected content 2021 on the third window 2020. In an embodiment, the electronic device 900 may resize the selected content 2021 based on the length of the third window 2020 in the horizontal direction. In an embodiment, the electronic device 900 may determine the position of the selected content 2021 on the third window 2020, based on the distance 1109 from the upper end 1100 of the electronic device 900 to the center position 1107 in the vertical direction of the content 1103 selected corresponding to user inputs. In an embodiment, the electronic device 900 may determine the position of the selected content 2021 on the third window 2020 so that the ratio between the distance 2027 from the upper end 2023 of the third window 2020 to the center position 2025 in the vertical direction for the content 2021 displayed on the third window 2020 and the distance 1109 related to the selected content 1103 corresponding to the user inputs has a preset value.

Referring to FIG. 20B, in an embodiment, the electronic device 900 (e.g., the processor 940) may reposition the content 2021 displayed on the third window 2020. In an embodiment, the electronic device 900 may determine (or adjust) the position of the selected content on the second display 820 based on a user input on the third window 2020. In an embodiment, the user input to the third window 2020 may be a vertical swipe action while touching the third window 2020. The user input to the third window 2020 is not limited to the above-described example. In an embodiment, referring to reference numeral 2030, the electronic device 900 may reposition the selected content 2031 on the third window 2020, based on a user input to the third window 2020. In an embodiment, the electronic device 900 may identify the distance 2033 from the upper end 2023 of the third window 2020 to the center position 2035 in the vertical direction for the repositioned content. In an embodiment, the electronic device 900 may identify the ratio of the distance 2033 related to the position of the repositioned content to the length 2029 of the third window 2020 in the vertical direction.

In an embodiment, referring to reference numeral 2040, the electronic device 900 may display content 1121 through the second display 820 based on the position of the repositioned content 2031. In an embodiment, the electronic device 900 may display the selected content 1121 according to the position determined on the third window 2020, through the second display 820, based on detecting a folding event. In an embodiment, the electronic device 900 may identify the position value corresponding to the selected content on the third window 2020. For example, the electronic device 900 may identify the DP value corresponding to the selected content 2031 which has been repositioned on the third window. In an embodiment, the electronic device 900 may identify the distance 2033 from the upper end 2023 of the third window 2020 in the vertical direction to the repositioned content 2031. In an embodiment, the electronic device 900 may identify the ratio of the distance 2033 from the upper end 2023 of the third window 2020 in the vertical direction to the repositioned content 2031 to the length 2029 of the third window 2020 in the vertical direction. In an embodiment, the electronic device 900 may determine the position of the selected content 1121 so that the ratio of the distance 1109 from the upper end 1100 of the electronic device 900 to the selected content 1121 to the distance 2001 of the electronic device 900 in the vertical direction remains the same as the ratio identified using the third window 2020, through the second display 820, based on detecting a folding event. In an embodiment, the electronic device 900 may display the selected content 1121 through the second display 820 based on the determined position. In an embodiment, the electronic device 900 may display the selected content on at least a partial area of the second display 820 corresponding to the intent of the user of the electronic device 900, based on the third window 2020.

Figure 21:
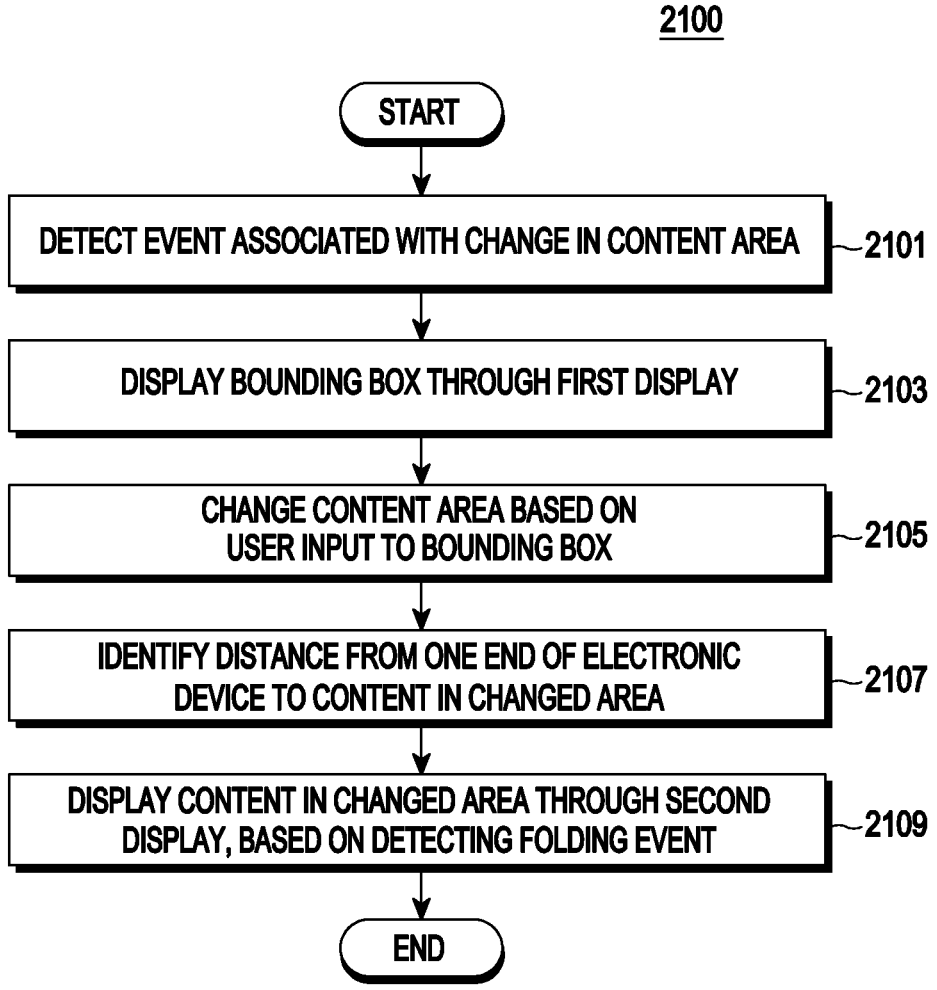
FIG. 21 is a flowchart illustrating a method for changing a content area, based on a user input to a bounding box of an electronic device according to an embodiment of the disclosure.

FIG. 21 is a flowchart 2100 illustrating a method for changing a content area, based on a user input to a bounding box 2220 of an electronic device 900 according to an embodiment of the disclosure.

Referring to FIG. 21, in operation 2101, in an embodiment, the electronic device 900 (e.g., the processor 940) may detect an event associated with a change in a content area. In an embodiment, the electronic device 900 may identify a plurality of user inputs on the first display 810. The electronic device 900 may select any one of one or more content displayed on the first display 810 based on a plurality of user inputs. In an embodiment, while identifying a plurality of user inputs to the first display 810, the electronic device 900 may detect an event by any one of the plurality of user inputs. In an embodiment, the event by the user input may be a rotation gesture for the selected content on the first display 810. The event by the user input is not limited to the above-described example.

In operation 2103, in an embodiment, the electronic device 900 may display a bounding box 2220 through the first display 810.

In an embodiment, the electronic device 900 may display a bounding box at the perimeter of the selected content through the first display 810, based on detecting an event associated with a change in the content area. In an embodiment, the electronic device 900 may display an object for changing the size or position of the bounding box. In an embodiment, the electronic device 900 may display an object for terminating the display of the bounding box.

In operation 2105, in an embodiment, the electronic device 900 may change the content area based on a user input to the bounding box. In an embodiment, the electronic device 900 may change the size of the content area based on a user input to the bounding box. In an embodiment, the electronic device 900 may change the number of content included in the bounding box, based on a user input to the bounding box. In an embodiment, the electronic device 900 may change the position of the content area based on a user input to the bounding box. In an embodiment, the electronic device 900 may select another content displayed on the first display 810, from the selected content, based on a user input to the bounding box.

In operation 2107, in an embodiment, the electronic device 900 may identify a distance from one end of the electronic device 900 to the content in the changed area. In an embodiment, the electronic device 900 may identify a distance from one end of the electronic device 900 to the center of the changed content area. For example, the electronic device 900 may identify the distance from one end of the electronic device 900 to the center position in the vertical direction for the changed content area. In an embodiment, the electronic device 900 may identify the center position in the vertical direction from the uppermost content to the lowermost content, based on identifying that the content area includes a plurality of content. For example, the electronic device 900 may identify the DP value corresponding to the center position in the vertical direction for the content area.

In operation 2109, in an embodiment, the electronic device 900 may display content in the changed area through the second display 820 based on detecting a folding event. In an embodiment, the electronic device 900 may determine the position of at least one content included in the changed content area on the second display 820 such that the distance from one end of the electronic device 900 to the center of the changed content area matches the identified distance, based on detecting a folding event. In an embodiment, the electronic device 900 may determine the DP value in the vertical direction corresponding to the changed content area so that the center position in the vertical direction for the changed content area remains the same on the first display 810 and the second display 820. The electronic device 900 may display one or more content included in the changed content area through the second display 820, based on the determined DP value. The electronic device 900 may maintain the center position in the vertical direction for the content area to be the same on the first display 810 and the second display 820, based on a user input to the bounding box.

Figure 22A:
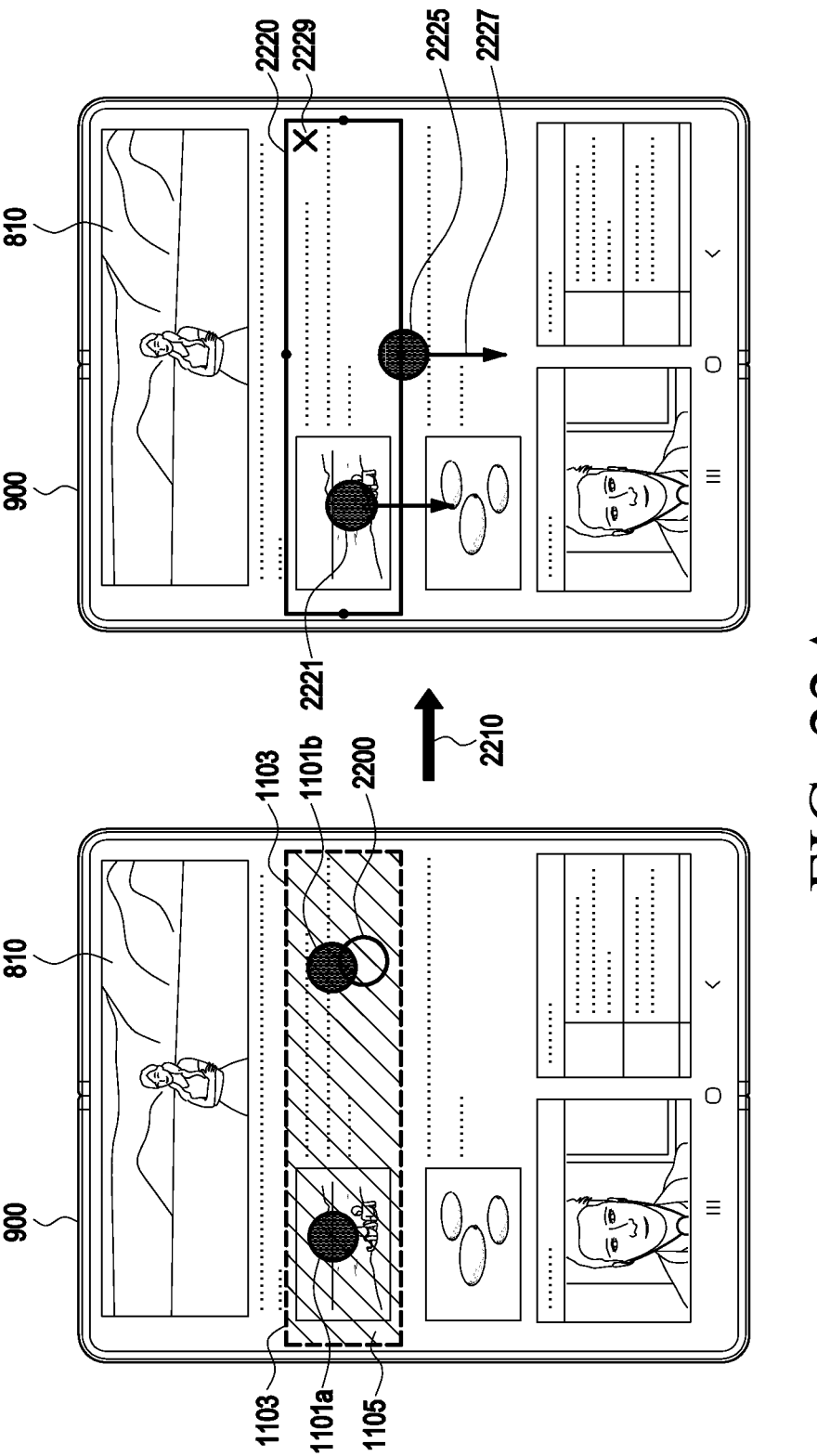
FIGS. 22A, 22B, and 22C are views illustrating an example of changing a content area, based on a user input to a bounding box of an electronic device according to various embodiments of the disclosure.
Figure 22B:
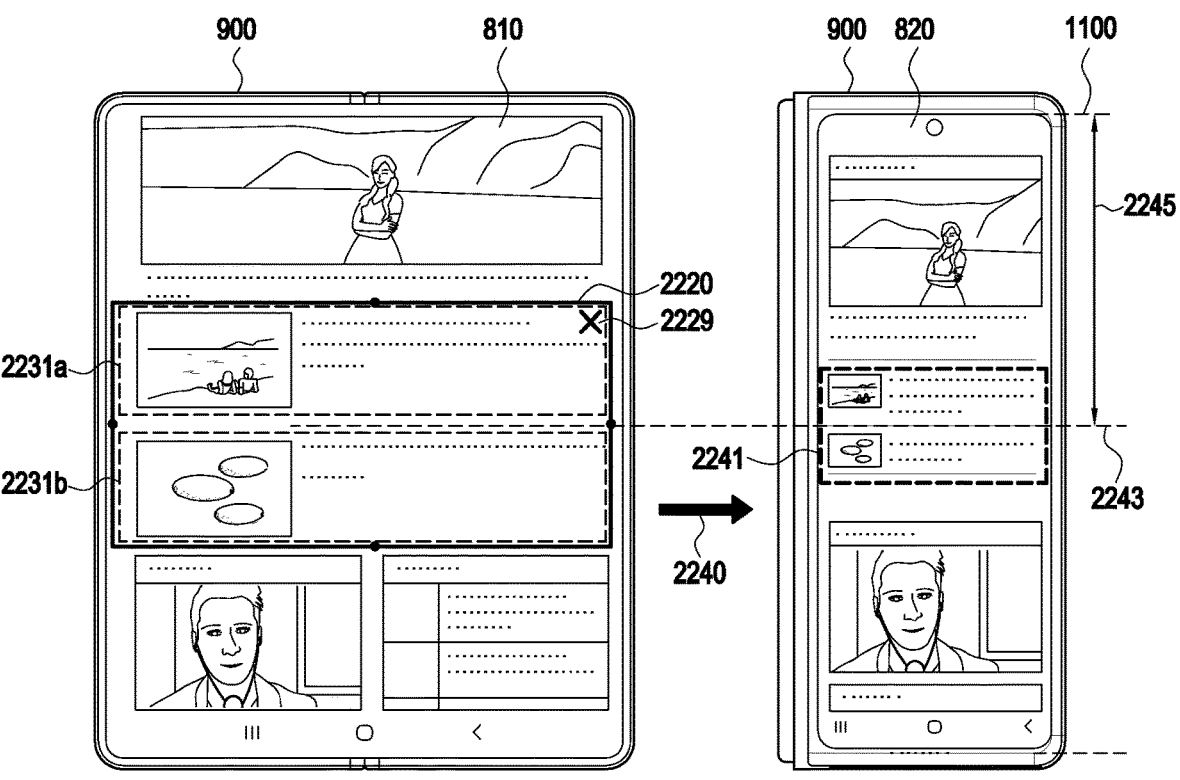
Figure 22C:
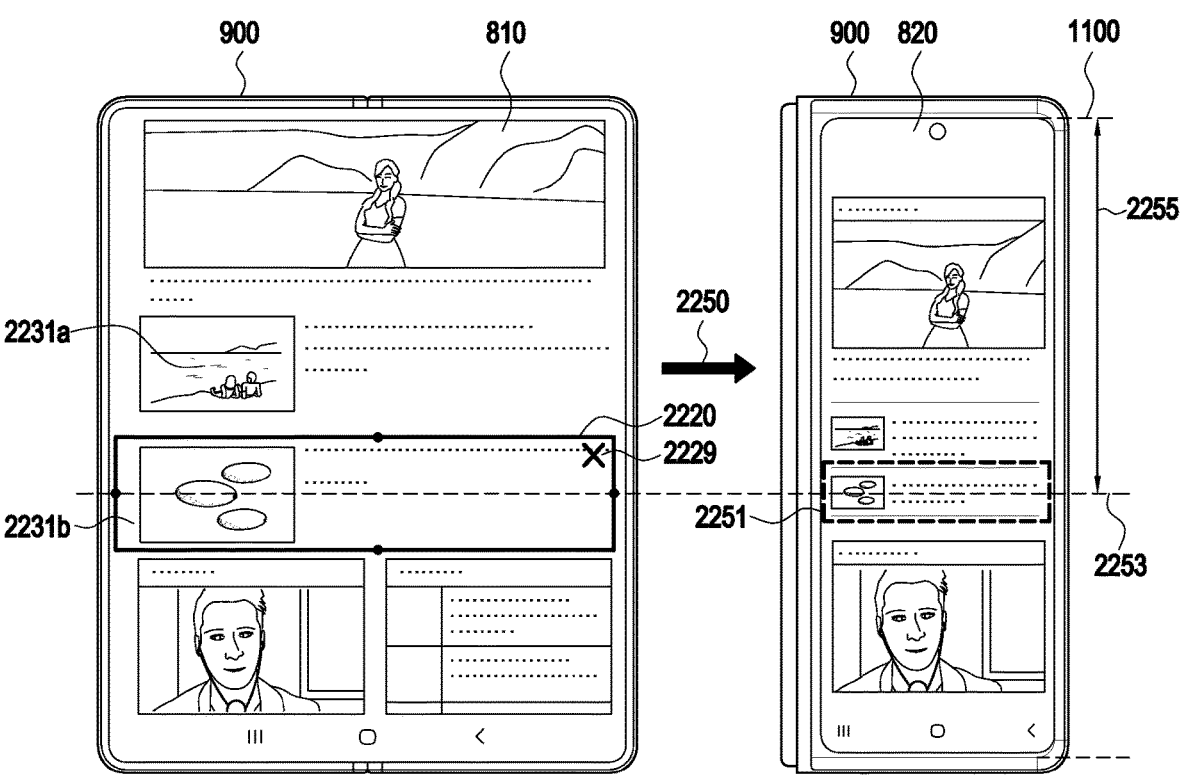

FIGS. 22A, 22B, and 22C are views illustrating an example of changing a content area, based on a user input to a bounding box of an electronic device according to various embodiments of the disclosure.

Referring to FIG. 22A, in an embodiment, the electronic device 900 (e.g., the processor 940) may detect an event associated with a change in a content area. In an embodiment, the electronic device 900 may identify a plurality of user inputs 1101a and 1101b for the first display 810. The electronic device 900 may select any one content 1103 from among one or more content displayed on the first display 810 based on the plurality of user inputs 1101a and 1101b. In an embodiment, while identifying a plurality of user inputs 1101a and 1101b to the first display 810, the electronic device 900 may detect an event by any one user input 1101b among the plurality of user inputs. In an embodiment, the event by the user input may be a rotation gesture 2200 for the selected content on the first display 810. The event by the user input is not limited to the above-described example.

In an embodiment, referring to reference numeral 2210, the electronic device 900 may display a bounding box 2220 through the first display 810. In an embodiment, the electronic device 900 may display a bounding box 2220 at the perimeter of the selected content through the first display 810, based on detecting an event associated with a change in the content area. In an embodiment, the electronic device 900 may display an object 2225 for resizing the bounding box. In an embodiment, the electronic device 900 may display an object 2229 for terminating the display of the bounding box.

In an embodiment, the electronic device 900 may change the content area based on a user input to the bounding box. In an embodiment, the electronic device 900 may change the size of the content area based on a user input to the bounding box. In an embodiment, the electronic device 900 may change the number of content included in the bounding box, based on a user input to the object 2225 for resizing the bounding box. In an embodiment, the user input to the object 2225 for resizing the bounding box may be an action of dragging (2227) the object 2225 for resizing the bounding box in the vertical or horizontal direction while pressing the object 2225. The user input to the object 2225 for resizing the bounding box is not limited to the above-described example.

In an embodiment, the electronic device 900 may change the position of the content area based on a user input to the bounding box. In an embodiment, the electronic device 900 may select another content displayed on the first display 810, from the selected content, based on a user input to an inner area 2221 of the bounding box. In an embodiment, the user input to the inner area 2221 of the bounding box may be an action of dragging 2223 the inner area 2221 of the bounding box in the vertical or horizontal direction while pressing the inner area 2221.

Referring to FIG. 22B, in an embodiment, the electronic device 900 (e.g., the processor 940) may change the number of content included in the bounding box 2220 by changing the content area based on a user input to the bounding box 2220. In an embodiment, the electronic device 900 may change the number of content included in the bounding box 2220 so that the content area includes a plurality of content 2231a and 2231b based on a user input to the bounding box 2220.

In an embodiment, the electronic device 900 may identify a distance from one end of the electronic device 900 to the content in the changed area. In an embodiment, the electronic device 900 may identify a distance from one end of the electronic device 900 to the center of the changed content area. For example, the electronic device 900 may identify a distance 2245 from an upper end 1100 of the electronic device 900 to a center position 2243 in the vertical direction for the changed content area. In an embodiment, the electronic device 900 may identify the center position 2243 in the vertical direction from the uppermost content 2231a to the lowermost content 2232b, based on identifying that the content area includes the plurality of content 2231a and 2232b. For example, the electronic device 900 may identify the DP value corresponding to the center position 2243 in the vertical direction for the content area.

In an embodiment, referring to reference numeral 2240, the electronic device 900 may display content 2241 in the changed area, through the second display 820 based on detecting a folding event. In an embodiment, the electronic device 900 may determine the position of at least one content 2241 included in the changed content area on the second display 820 such that the distance from one end of the electronic device 900 to the center of the changed content area matches the identified distance 2245, based on detecting a folding event. In an embodiment, the electronic device 900 may determine the DP value in the vertical direction corresponding to the changed content area so that the center position 2243 in the vertical direction for the changed content area remains the same on the first display 810 and the second display 820. The electronic device 900 may display one or more content 2241 included in the changed content area through the second display 820, based on the determined DP value. The electronic device 900 may maintain the center position in the vertical direction for the content area to be the same on the first display 810 and the second display 820, based on a user input to the bounding box 2220.

Referring to FIG. 22C, in an embodiment, the electronic device 900 (e.g., the processor 940) may change the content included in the bounding box 2220 by changing the content area based on a user input to the bounding box 2220. In an embodiment, the electronic device 900 may change the content included in the content area from the content 1105 selected based on the plurality of user inputs 1101a and 1101b to another content 2231b, based on a user input to the bounding box 2220.

In an embodiment, the electronic device 900 may identify a distance from one end of the electronic device 900 to the content in the changed area. In an embodiment, the electronic device 900 may identify a distance from one end of the electronic device 900 to the center of the changed content area. For example, the electronic device 900 may identify a distance 2255 from an upper end 1100 of the electronic device 900 to a center position 2253 in the vertical direction for the changed content area. For example, the electronic device 900 may identify the DP value corresponding to the center position 2253 in the vertical direction for the content area.

In an embodiment, referring to reference numeral 2250, the electronic device 900 may display content 2251 in the changed area, through the second display 820 based on detecting a folding event. In an embodiment, the electronic device 900 may determine the position of at least one content 2251 included in the changed content area on the second display 820 such that the distance from one end of the electronic device 900 to the center of the changed content area matches the identified distance 2255, based on detecting a folding event. In an embodiment, the electronic device 900 may determine the DP value in the vertical direction corresponding to the changed content area so that the center position 2253 in the vertical direction for the changed content area remains the same on the first display 810 and the second display 820. The electronic device 900 may display one or more content 2251 included in the changed content area through the second display 820, based on the determined DP value. The electronic device 900 may maintain the center position in the vertical direction for the content area to be the same on the first display 810 and the second display 820, based on a user input to the bounding box 2220.

Figure 23:
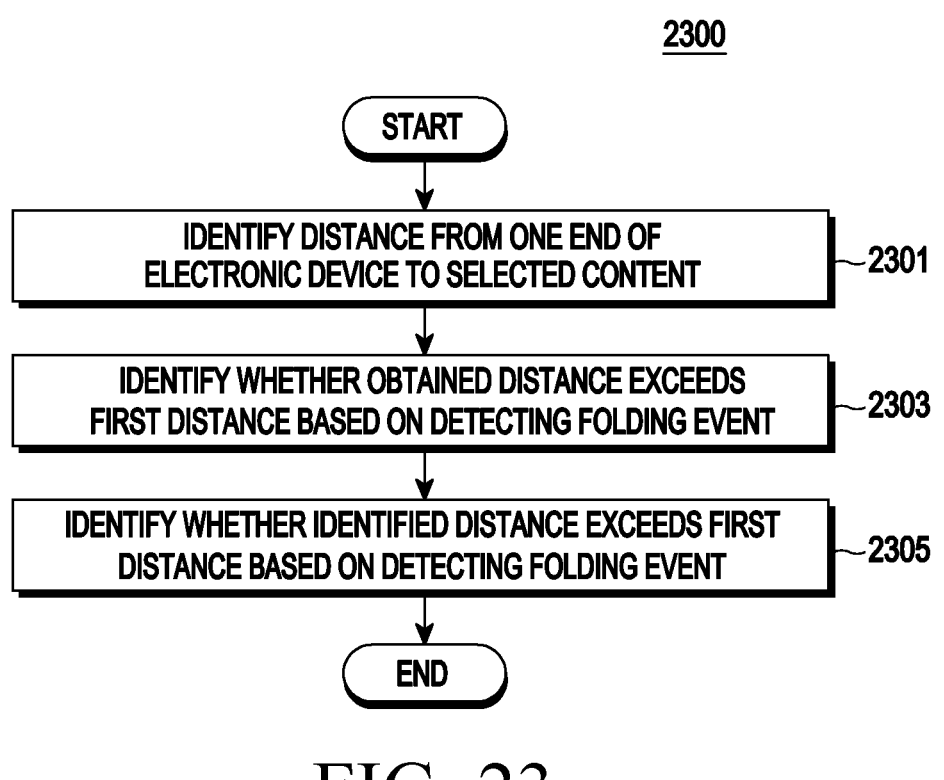
FIG. 23 is a flowchart illustrating a method for displaying selected content, based on detecting a folding event in a vertical direction of an electronic device according to an embodiment of the disclosure.

FIG. 23 is a flowchart 2300 illustrating a method for displaying selected content, based on detecting a folding event in a vertical direction of an electronic device 900 according to an embodiment of the disclosure.

Referring to FIG. 23, in operation 2301, in an embodiment, the electronic device 900 (e.g., the processor 940) may identify a distance from one end of the electronic device 900 to the selected content. In an embodiment, the electronic device 900 may select any one content from among one or more content displayed on the first display 810, based on at least one user input to the first display 810. In an embodiment, the electronic device 900 may identify a distance from one end of the electronic device 900 to the center of the selected content. For example, the electronic device 900 may identify a distance from an upper end of the electronic device 900 to a center position of the selected content in a vertical direction.

In operation 2303, in an embodiment, the electronic device 900 may identify whether the identified distance exceeds a first set distance, based on detecting a folding event. In an embodiment, the first set distance may be half the length of the electronic device 900 in the vertical direction. In an embodiment, based on identifying that the identified distance does not exceed the first set distance, the electronic device 900 may display the selected content in at least a partial area of the second display 820, wherein the at least a partial area of the second display 820 is distanced away from the upper end of the electronic device 900 by the identified distance. In an embodiment, the electronic device 900 may identify the identified distance minus the first set distance, based on identifying that the identified exceeds the first set distance.

In operation 2305, in an embodiment, the electronic device 900 may display the selected content through the second display 820. In an embodiment, the electronic device 900 may determine the position of the selected content such that the center of the selected content is positioned in the position which is away by the identified distance minus the first set distance, from one end of the electronic device 900, based on identifying that the identified distance exceeds the first set distance. In an embodiment, the electronic device 900 may display the selected content on at least a partial area of the second display 820, which is away by the identified distance minus the first set distance, from the upper end of the electronic device 900 through the second display 820, based on the determined position.

Figure 24A:
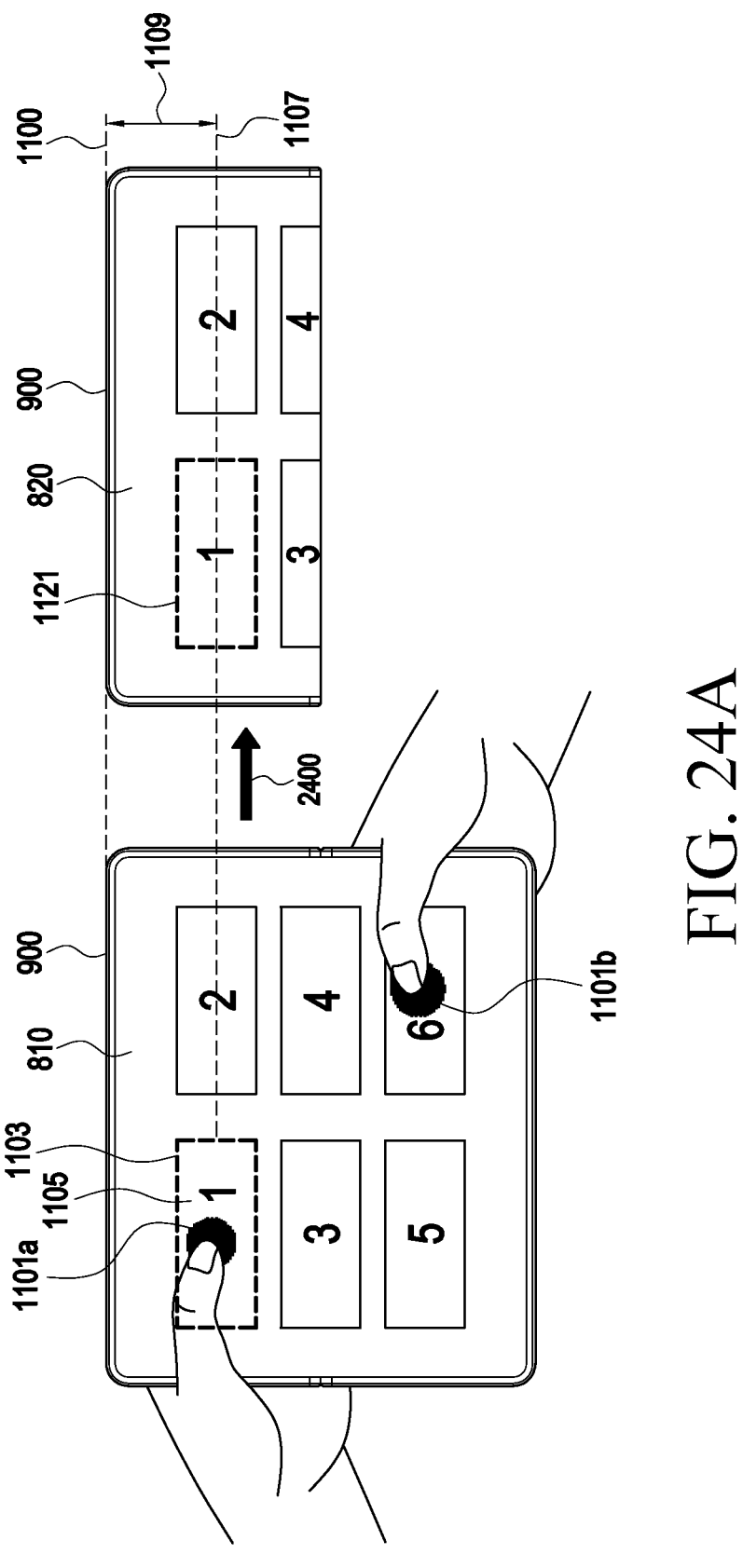
FIGS. 24A and 24B are views illustrating an example of displaying selected content, based on detecting a folding event in a vertical direction of an electronic device according to various embodiments of the disclosure.
Figure 24B:
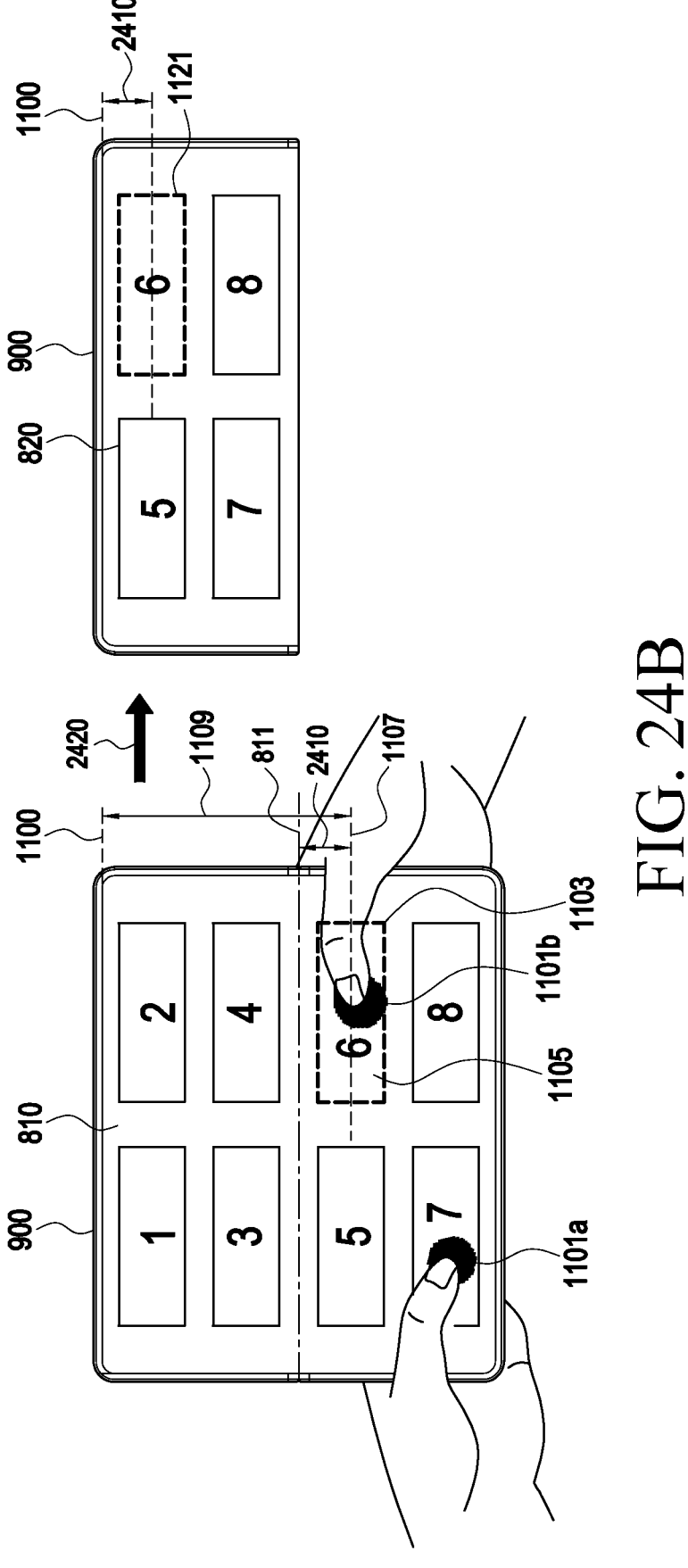

FIGS. 24A and 24B are views illustrating an example of displaying selected content, based on detecting a folding event in a vertical direction of an electronic device according to various embodiments of the disclosure.

Referring to FIG. 24A, in an embodiment, the electronic device 900 (e.g., the processor 940) may select any one content 1103 from among one or more content displayed on the first display 810, based on a plurality of user inputs 1101*a* and 1101*b* to the first display 810. In an embodiment, the electronic device 900 may identify the distance from an end of the electronic device 900 to the selected content 1103. In an embodiment, the electronic device 900 may identify a distance from one end of the electronic device 900 to the center of the selected content 1103. For example, the electronic device 900 may identify a distance 1109 from an upper end 1100 of the electronic device 900 to a center position 1107 of the selected content 1103 in the vertical direction.

In an embodiment, referring to reference numeral 2400, the electronic device 900 may identify whether the identified distance 1109 exceeds the first set distance based on detecting a folding event. In an embodiment, the first set distance may be half the length of the electronic device 900 in the vertical direction. In an embodiment, based on identifying that the identified distance does not exceed the first set distance, the electronic device 900 may display the selected content in at least a partial area of the second display 820, wherein the at least a partial area of the second display 820 is distanced away from the upper end 1100 of the electronic device 900 by the identified distance 1109. In an embodiment, the electronic device 900 may maintain the center position 1103 in the vertical direction for the selected content to be the same on the first display 810 and the second display 820 based on detecting a folding event even without an additional user input.

Referring to FIG. 24B, in an embodiment, the electronic device 900 (e.g., the processor 940) may select any one content 1103 from among one or more content displayed on the first display 810, based on a plurality of user inputs 1101*a* and 1101*b* to the first display 810. In an embodiment, the electronic device 900 may identify the distance from an end of the electronic device 900 to the selected content 1103. In an embodiment, the electronic device 900 may identify a distance from one end of the electronic device 900 to the center of the selected content 1103. For example, the electronic device 900 may identify a distance 1109 from an upper end 1100 of the electronic device 900 to a center position 1107 of the selected content 1103 in the vertical direction.

In an embodiment, referring to reference numeral 2420, the electronic device 900 may identify whether the identified distance 1109 exceeds the first set distance based on detecting a folding event. In an embodiment, the first set distance may be the length from the upper end 1100 of the electronic device 900 to the boundary line 811 of the first display 810. In an embodiment, the electronic device 900 may identify the distance 2410, resulting from subtracting the first set distance from the identified distance 1109, based on identifying that the identified distance 1109 exceeds the first set distance.

In an embodiment, the electronic device 900 may display the selected content 1121 through the second display 820. In an embodiment, the electronic device 900 may determine the position of the selected content such that the center of the selected content is positioned in the position which is away by the distance 2410, which is the identified distance minus the first set distance, from one end of the electronic device 900, based on identifying that the identified distance exceeds the first set distance. In an embodiment, the electronic device 900 may display the selected content on at least a partial area of the second display 820, which is away by the distance 2410, which is the identified distance minus the first set distance, from the upper end of the electronic device 900 through the second display 820 based on the determined position.

Figure 25A:
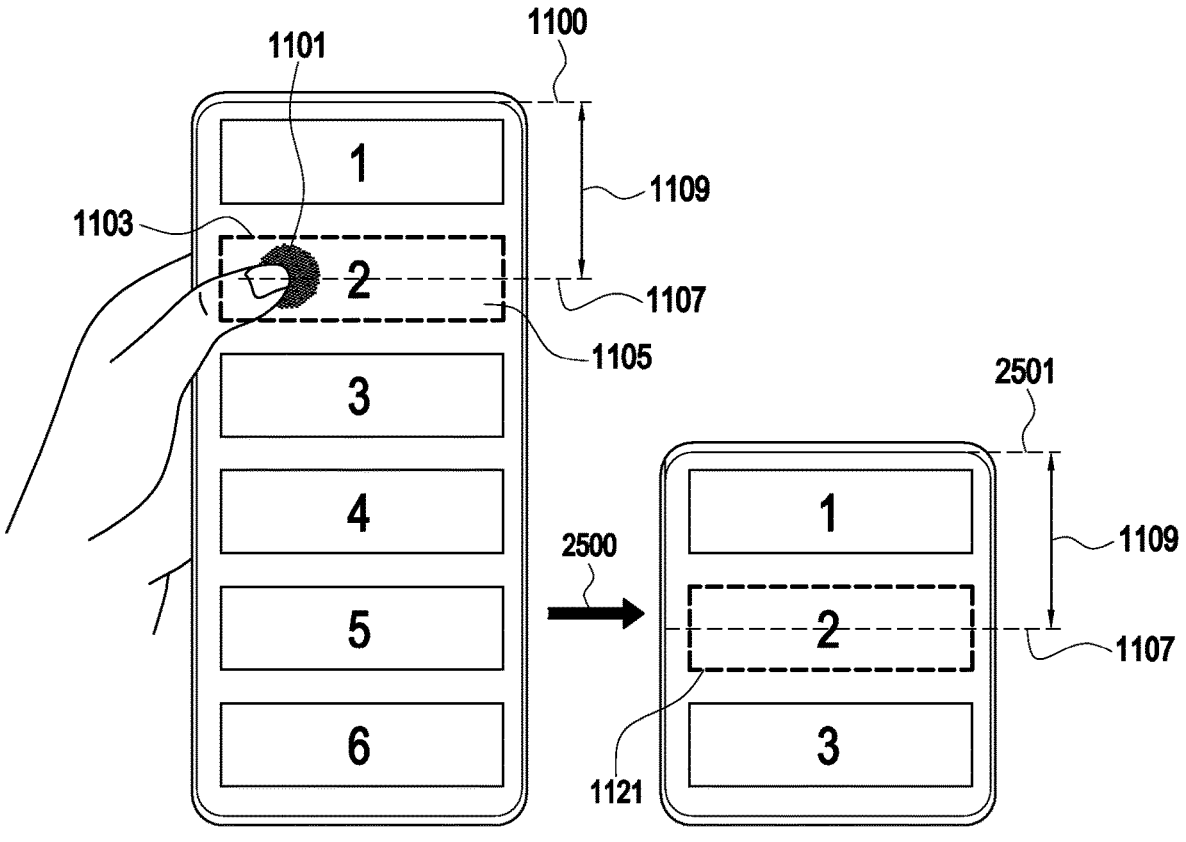
FIGS. 25A and 25B are views illustrating an example of displaying selected content, based on detecting a folding event in a vertical direction of an electronic device according to various embodiments of the disclosure.
Figure 25B:
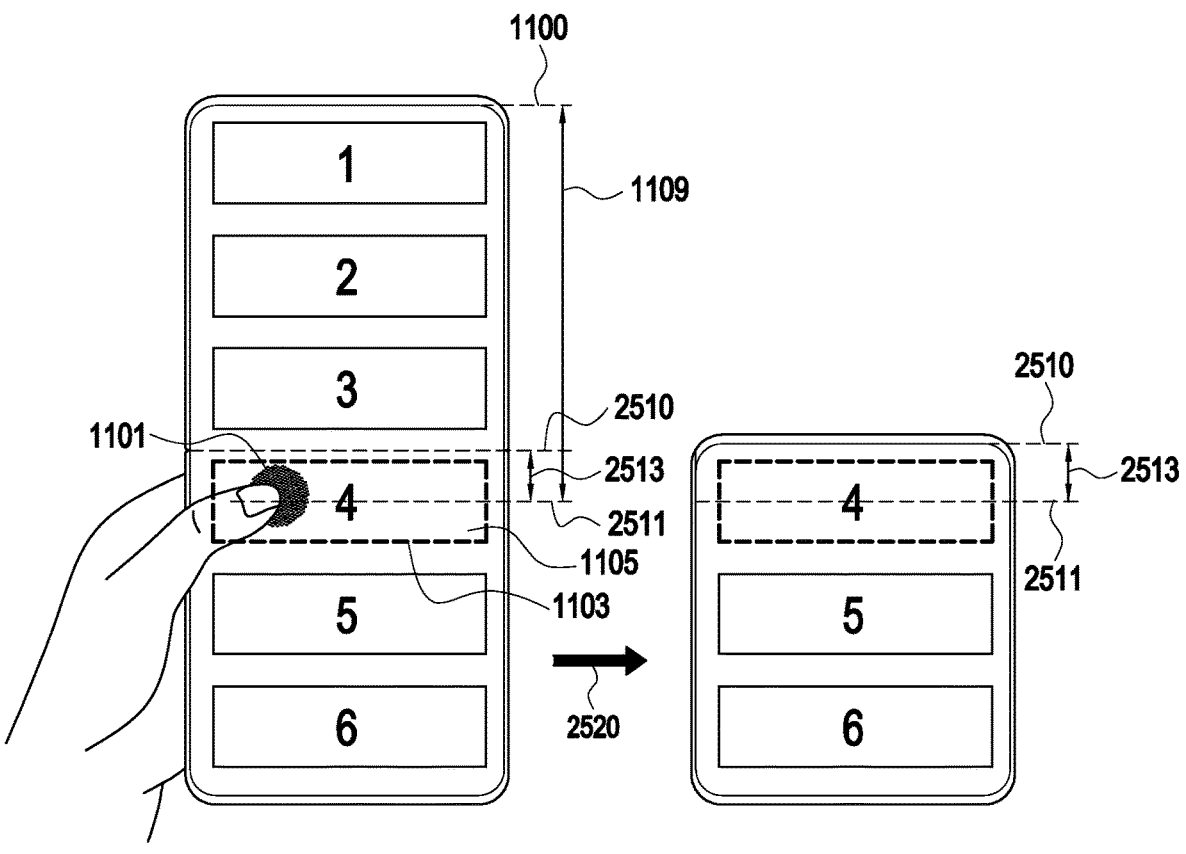

FIGS. 25A and 25B are views illustrating an example of displaying selected content, based on detecting a folding event in a vertical direction of an electronic device according to various embodiments of the disclosure.

In an embodiment, the electronic device 900 may be a foldable electronic device that may be folded on a horizontal boundary line.

Referring to FIG. 25A, in an embodiment, the electronic device 900 (e.g., the processor 940) may select any one content 1103 from among one or more content displayed on the first display based on at least one user input 1101 to the first display. In an embodiment, the electronic device 900 may identify the distance from an end of the electronic device 900 to the selected content 1103. In an embodiment, the electronic device 900 may identify a distance from one end of the electronic device 900 to the center of the selected content 1103. For example, the electronic device 900 may identify a distance 1109 from an upper end 1100 of the electronic device 900 to a center position 1107 of the selected content 1103 in the vertical direction.

In an embodiment, referring to reference numeral 2500, the electronic device 900 may identify whether the identified distance 1109 exceeds the first set distance based on detecting a folding event. In an embodiment, the first set distance may be half the length of the electronic device 900 in the vertical direction. In an embodiment, based on identifying that the identified distance does not exceed the first set distance, the electronic device 900 may display the selected content in at least a partial area of the second display, wherein the at least a partial area of the second display is distanced away from the upper end 2501 of the electronic device 900 by the identified distance 1109. In an embodiment, the upper end 2501 of the electronic device 900 may be an end of a housing of the electronic device 900 in a folded state.

Referring to FIG. 25B, in an embodiment, the electronic device 900 (e.g., the processor 940) may select any one content 1103 from among one or more content displayed on the first display based on at least one user input 1101 to the first display. In an embodiment, the electronic device 900 may identify the distance from an end of the electronic device 900 to the selected content 1103. In an embodiment, the electronic device 900 may identify a distance from one end of the electronic device 900 to the center of the selected content 1103. For example, the electronic device 900 may identify a distance 1109 from an upper end 1100 of the electronic device 900 to a center position 2511 of the selected content 1103 in the vertical direction.

In an embodiment, referring to reference numeral 2520, the electronic device 900 may identify whether the identified distance 1109 exceeds the first set distance based on detecting a folding event. In an embodiment, the first set distance may be the distance from the upper end 1100 of the electronic device 900 to the boundary line 2510. In an embodiment, the electronic device 900 may identify the distance 2513, resulting from subtracting the first set distance from the identified distance, based on identifying that the identified distance 1109 exceeds the first set distance. In an embodiment, the electronic device 900 may display the selected content through the second display. In an embodiment, the electronic device 900 may determine the position of the selected content so that the center of the selected content is positioned in the position which is away by the distance 2513, which is the identified distance minus the first set distance, from an upper end 2510 of the electronic device 900, based on identifying that the identified distance exceeds the first set distance. In an embodiment, the upper end 2501 of the electronic device 900 may be an end of a housing of the folded electronic device 900. In an embodiment, the electronic device 900 may display the selected content on at least a partial area of the second display which is away, by the distance 2513 which is the identified distance minus the first set distance, from the upper end 2510 of the electronic device 900, through the second display 820, based on the determined position.

According to an embodiment, an electronic device 101 or 900 may comprise a display module 160, 613, or 910 including a plurality of displays; and at least one processor 120, 605, or 940 operatively connected with the display module 160, 613, or 910. The at least one processor 120, 605, or 940 may be configured to identify one or more user inputs to a first display 200, 502, or 810 among the plurality of displays. The at least one processor 120, 605, or 940 may be configured to select a content from among one or more content displayed on the first display 200, 502, or 810, based on the identified one or more user inputs. The at least one processor 120, 605, or 940 may be configured to identify a distance from one end of the electronic device 101 or 900 to the selected content, based on a position of the selected content. The at least one processor 120, 605, or 940 may be configured to display the selected content on at least a partial area of a second display 501 or 820 among the plurality of displays based on the identified distance, in response to detecting a folding event of the electronic device 101 or 900, wherein the at least a partial area of the second display 501 or 820 is distanced away from the one end of the electronic device 101 or 900 by the identified distance.

In an embodiment, the at least one processor 120, 605, or 940 may be configured to identify a first distance from the one end of the electronic device 101 or 900 to the selected content on the first display 200, 502, or 810). The at least one processor 120, 605, or 940 may be configured to determine the position of the selected content on the second display 501 or 820, such that a second distance from the one end of the electronic device 101 or 900 to the selected content on the second display 501 or 820 matches the first distance on the first display 200, 502, or 810, based on detecting the folding event. The at least one processor 120, 605, or 940 may be configured to display the selected content, through the second display 501 or 820, based on the determined position.

The at least one processor 120, 605, or 940 may be configured to identify whether a length of the selected content in a second direction on the first display 200, 502, or 810 exceeds a threshold length, based on detecting the folding event. The at least one processor 120, 605, or 940 may be configured to resize the selected content, according to a length of the second display 501 or 820 in the second direction, based on identifying that the length of the selected content in the second direction on the first display 200, 502, or 810 exceeds the threshold length. The at least one processor 120, 605, or 940 may be configured to display the resized content, through the second display 501 or 820.

The at least one processor 120, 605, or 940 may be configured to identify position values respectively corresponding to a plurality of user inputs to the first display 200, 502, or 810. The at least one processor 120, 605, or 940 may be configured to identify whether the position values in a first direction of the user inputs are identical. The at least one processor 120, 605, or 940 may be configured to select a content corresponding to the user inputs, based on identifying that the position values in the first direction of the user inputs are identical. The at least one processor 120, 605, or 940 may be configured to select a content corresponding to a user input closest in distance to one end of the electronic device 101 or 900 from among the plurality of user inputs, based on identifying that the position values in the first direction of the user inputs are different.

The at least one processor 120, 605, or 940 may be configured to select a content corresponding to a user input most adjacent to one end of the electronic device 101 or 900, based on identifying that the position values in the first direction of the user inputs are different.

The at least one processor 120, 605, or 940 may be configured to identify position values corresponding to user inputs for a first surface 813 and a second surface 815, respectively, of the first display 200, 502, or 810. The at least one processor 120, 605, or 940 may be configured to identify whether the position values in a first direction of the user inputs are identical. The at least one processor 120, 605, or 940 may be configured to select a content satisfying a condition associated with content selection from among content respectively corresponding to the user inputs, based on identifying that the position values in the first direction of the user inputs are identical.

In an embodiment, the condition associated with content selection may include being a content positioned on a primary surface among the first surface 813 and the second surface 815. The at least one processor 120, 605, or 940 may be configured to identify the primary surface among the first surface 813 and the second surface 815, based on an input pattern for the first display 200, 502, or 810. The at least one processor 120, 605, or 940 may be configured to select the content positioned on the primary surface from among content respectively corresponding to the user inputs.

In an embodiment, the at least one processor 120, 605, or 940 may be configured to display a first window 1700 and a second window 1710 through the first display 200, 502, or 810. The at least one processor 120, 605, or 940 may be configured to identify user inputs on the first window 1700 and the second window 1710, respectively. The at least one processor 120, 605, or 940 may be configured to select a content corresponding to a user input closest in distance to one end of the electronic device 101 or 900 from among the user inputs. The at least one processor 120, 605, or 940 may be configured to display the selected content and a window including the selected content among the first window 1700 and the second window 1710, through the second display 501 or 820, based on detecting the folding event.

In an embodiment, the at least one processor 120, 605, or 940 may be configured to identify whether user inputs on the first display 200, 502, or 810 are input during a preset time. The at least one processor 120, 605, or 940 may be configured to display a third window 2020 for determining a position of the selected content on the second display 501 or 820, through the first display 200, 502, or 810, based on identifying that the user inputs are input during the preset time. The at least one processor 120, 605, or 940 may be configured to determine the position of the selected content on the second display 501 or 820, based on a user input to the third window 2020. The at least one processor 120, 605, or 940 may be configured to display the selected content, based on the determined position on the third window 2020, through the second display 501 or 820, based on detecting the folding event.

In an embodiment, the at least one processor 120, 605, or 940 may be configured to display a bounding box 2220 at a perimeter of the selected content, through the first display 200, 502, or 810, based on detecting an event associated with a change in a content area. The at least one processor 120, 605, or 940 may be configured to change the content area, based on a user input to the bounding box 2220. The at least one processor 120, 605, or 940 may be configured to identify a distance from one end of the electronic device 101 or 900 to a first position for the changed content area. The at least one processor 120, 605, or 940 may be configured to determine a position of at least one content included in the changed content area on the second display 501 or 820, such that the distance from the one end of the electronic device 101 or 900 to the first position for the changed content area matches the identified distance, based on detecting the folding event. The at least one processor 120, 605, or 940 may be configured to display the at least one content included in the changed content area, through the second display 501 or 820, based on the determined position.

In an embodiment, the at least one processor 120, 605, or 940 may be configured to identify a distance from the one end of the electronic device 101 or 900 to the selected content on the first display 200, 502, or 810. The at least one processor 120, 605, or 940 may be configured to identify whether the identified distance exceeds a first set distance, based on detecting the folding event. The at least one processor 120, 605, or 940 may be configured to determine a position of the selected content on the second display 501 or 820, such that the selected content is distanced from the one end of the electronic device 101 or 900 by the identified distance on the first display minus the first set distance, based on identifying that the identified distance exceeds the first set distance. The at least one processor 120, 605, or 940 may be configured to display the selected content, through the second display 501 or 820, based on the determined position.

According to an embodiment, a method for processing content by an electronic device 101 or 900 may comprise identifying one or more user inputs to a first display 200, 502, or 810 among a plurality of displays of the electronic device 101 or 900. The method may comprise selecting a content from among one or more content displayed on the first display 200, 502, or 810, based on the identified one or more user inputs. The method may comprise identifying a distance from one end of the electronic device 101 or 900 to the selected content, based on a position of the selected content. The method may comprise displaying the selected content on at least a partial area of a second display 501 or 820 among the plurality of displays based on the identified distance, in response to detecting a folding event of the electronic device 101 or 900, wherein the at least a partial area of the second display 501 or 820 is distanced away from the one end of the electronic device 101 or 900 by the identified distance.

In an embodiment, the method may comprise identifying a first distance from the one end of the electronic device 101 or 900 to the selected content on the first display 200, 502, or 810. The method may comprise determining the position of the selected content on the second display 501 or 820, such that a second distance from the one end of the electronic device 101 or 900 to the selected content on the second display 501 or 820 matches the first distance on the first display 200, 502, or 810, based on detecting the folding event. The method may comprise displaying the selected content, through the second display 501 or 820, based on the determined position.

In an embodiment, the method may comprise identifying whether a length of the selected content in a second direction on the first display 200, 502, or 810 exceeds a threshold length, based on detecting the folding event. The method may comprise resizing the selected content, according to a length of the second display 501 or 820 in the second direction, based on identifying that the length of the selected content in the second direction on the first display 200, 502, or 810 exceeds the threshold length. The method may further comprise displaying the resized content, through the second display 501 or 820.

In an embodiment, the method may comprise identifying position values respectively corresponding to a plurality of user inputs to the first display 200, 502, or 810. The method may comprise identifying whether the position values in a first direction of the user inputs are identical. The method may comprise selecting a content corresponding to the user inputs, based on identifying that the position values in the first direction of the user inputs are identical. The method may further comprise selecting a content corresponding to a user input closest in distance to one end of the electronic device 101 or 900 from among the plurality of user inputs, based on identifying that the position values in the first direction of the user inputs are different.

In an embodiment, the method may comprise identifying position values corresponding to user inputs for a first surface 813 and a second surface 815, respectively, of the first display 200, 502, or 810. The method may comprise identifying whether the position values in a first direction of the user inputs are identical. The method may further comprise selecting a content satisfying a condition associated with content selection from among content respectively corresponding to the user inputs, based on identifying that the position values in the first direction of the user inputs are identical.

In an embodiment, in selecting the content meeting the condition associated with content selection, the condition associated with content selection may include being a content positioned on a primary surface among the first surface 813 and the second surface 815. The method may further comprise identifying the primary surface among the first surface 813 and the second surface 815, based on an input pattern for the first display 200, 502, or 810. The method may further comprise selecting the content positioned on the primary surface from among content respectively corresponding to the user inputs.

In an embodiment, the method may comprise displaying a first window 1700 and a second window 1710 through the first display 200, 502, or 810. The method may comprise identifying user inputs on the first window 1700 and the second window 1710, respectively. The method may comprise selecting a content corresponding to a user input closest in distance to one end of the electronic device 101 or 900 from among the user inputs. The method may further comprise displaying the selected content and a window including the selected content among the first window 1700 and the second window 1710, through the second display 501 or 820, based on detecting the folding event.

In an embodiment, the method may comprise identifying whether user inputs on the first display 200, 502, or 810 are input during a preset time. The method may comprise displaying a third window 2020 for determining a position of the selected content on the second display 501 or 820, through the first display 200, 502, or 810, based on identifying that the user inputs are input during the preset time. The method may comprise determining the position of the selected content on the second display 501 or 820, based on a user input to the third window 2020. The method may further comprise displaying the selected content, based on the determined position on the third window 2020, through the second display 501 or 820, based on detecting the folding event.

In an embodiment, the method may comprise displaying a bounding box 2220 at a perimeter of the selected content, through the first display 200, 502, or 810, based on detecting an event associated with a change in a content area. The method may comprise changing the content area, based on a user input to the bounding box 2220. The method may comprise identifying a distance from one end of the electronic device 101 or 900 to a first position for the changed content area. The method may comprise determining a position of at least one content included in the changed content area on the second display 501 or 820, such that the distance from the one end of the electronic device 101 or 900 to the first position for the changed content area matches the identified distance, based on detecting the folding event. The method may further comprise displaying the at least one content included in the changed content area, through the second display 501 or 820, based on the determined position.

In an embodiment, the method may comprise identifying a distance from the one end of the electronic device 101 or 900 to the selected content on the first display 200, 502, or 810. The method may comprise identifying whether the identified distance exceeds a first set distance, based on detecting the folding event. The method may comprise determining a position of the selected content on the second display 501 or 820, such that the selected content is distanced from the one end of the electronic device 101 or 900 by the identified distance on the first display minus the first set distance, based on identifying that the identified distance exceeds the first set distance. The method may comprise displaying the selected content, through the second display 501 or 820, based on the determined position.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An embodiment of the disclosure and terms used therein are not intended to limit the technical features described in the disclosure to specific embodiments, and should be understood to include various modifications, equivalents, or substitutes of the embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Further, the structure of the data used in embodiments of the disclosure may be recorded in a computer-readable recording medium via various means. The computer-readable recording medium includes a storage medium, such as a magnetic storage medium (e.g., a read only memory (ROM), a floppy disc, or a hard disc) or an optical reading medium (e.g., a CD-ROM or a digital versatile disc (DVD)).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
memory storing instructions; and
one or more processors communicatively coupled to the memory,
wherein the instructions, when executed by the one or more processors individually or collectively, cause the electronic device to:
    identify a first input and a second input on a first display among a plurality of displays of the electronic devices;
    identify a first position value in a first direction corresponding to the first input and a second position value in the first direction corresponding to the second input on the first display,
    identify whether the first position value in the first direction of the first input corresponds to the second position value in the first direction of the second input,
    based on the first position value corresponding to the second position value, select a content, displayed where the first input and the second input are input, from among one or more content displayed on the first display,
    based on a position of the selected content, identify a distance from one end of the electronic device to the selected content, and
    in response to detecting a folding event of the electronic device, display the selected content on at least a partial area of a second display among the plurality of displays based on the identified distance, and
    wherein the at least a partial area of the second display is distanced away from the one end of the electronic device by the identified distance.

2. The electronic device of claim 1, wherein the instructions, when executed by the one or more processors individually or collectively, further cause the electronic device to:
    identify a first distance from the one end of the electronic device to the selected content on the first display,
    determine the position of the selected content on the second display, such that a second distance from the one end of the electronic device to the selected content on the second display matches the first distance on the first display, based on detecting the folding event, and
    display the selected content, through the second display, based on the determined position.

3. The electronic device of claim 1, wherein the instructions, when executed by the one or more processors individually or collectively, further cause the electronic device to:
    identify whether a length of the selected content in a second direction on the first display exceeds a threshold length, based on detecting the folding event,
    resize the selected content, according to a length of the second display in the second direction, based on identifying that the length of the selected content in the second direction on the first display exceeds the threshold length, and
    display the resized content, through the second display.

4. The electronic device of claim 1, wherein the instructions, when executed by the one or more processors individually or collectively, further cause the electronic device to:
    select a content corresponding to the first input and the second input, based on identifying that the position values in the first direction of the first input and the second input are identical, and
    select a content corresponding to a user input closest in distance to one end of the electronic device from among the first input and the second input, based on identifying that the position values in the first direction of the first input and the second input are different.

5. The electronic device of claim 1, wherein the instructions, when executed by the one or more processors individually or collectively, further cause the electronic device to:
    identify position values corresponding to first input and the second input for a first surface and a second surface, respectively, of the first display,
    identify whether the position values in a first direction of the first input and the second input are identical, and
    select a content satisfying a condition associated with content selection from among content respectively corresponding to the first input and the second input, based on identifying that the position values in the first direction of the first input and the second input are identical.

6. The electronic device of claim 5,
wherein the condition associated with content selection includes being a content positioned on a primary surface among the first surface and the second surface, and
wherein the instructions, when executed by the one or more processors individually or collectively, further cause the electronic device to:
    identify, based on an input pattern for the first display, the primary surface among the first surface and the second surface, and
    select the content positioned on the primary surface from among content respectively corresponding to the first input and the second input.

7. The electronic device of claim 1, wherein the instructions, when executed by the one or more processors individually or collectively, further cause the electronic device to:
    display a first window and a second window through the first display,
    identify user inputs on the first window and the second window, respectively,
    select a content corresponding to a user input closest in distance to one end of the electronic device from among the user inputs, and
    displaying-display the selected content and a window including the selected content among the first window and the second window, through the second display, based on detecting the folding event.

8. The electronic device of claim 1, wherein the instructions, when executed by the one or more processors individually or collectively, further cause the electronic device to:
    identify whether user inputs on the first display are input during a preset time,
    displaying-display a third window for determining a position of the selected content on the second display, through the first display, based on identifying that the user inputs are input during the preset time,

determine the position of the selected content on the second display, based on a user input to the third window, and display the selected content, based on the determined position on the third window, through the second display, based on detecting the folding event.

9. The electronic device of claim 1, wherein the instructions, when executed by the one or more processors individually or collectively, further cause the electronic device to:

display a bounding box at a perimeter of the selected content, through the first display, based on detecting an event associated with a change in a content area, change the content area, based on a user input to the bounding box, identify a distance from one end of the electronic device to a first position for the changed content area, determine, based on detecting the folding event, a position of at least one content included in the changed content area on the second display, such that the distance from the one end of the electronic device to the first position for the changed content area matches the identified distance, and display the at least one content included in the changed content area, through the second display, based on the determined position.

10. The electronic device of claim 1, wherein the instructions, when executed by the one or more processors individually or collectively, further cause the electronic device to:

identify a distance from one end of the electronic device to the selected content on the first display, identify whether the identified distance exceeds a first set distance, based on detecting the folding event, determine a position of the selected content on the second display, such that the selected content is distanced from the one end of the electronic device by the identified distance on the first display minus the first set distance, based on identifying that the identified distance exceeds the first set distance, and displaying-display the selected content, through the second display, based on the determined position.

11. A method for processing content by an electronic device, the method comprising:

identifying a first input and a second input on a first display among a plurality of displays of the electronic device;

identifying a first position value in a first direction corresponding to the first input and a second position value in the first direction corresponding to the second input on the first display;

identifying whether the first position value in the first direction of the first input corresponds to the second position value in the first direction of the second input;

based on the first position value corresponding to the second position value, selecting a content, displayed where the first input and the second input are input, from among one or more content displayed on the first display;

based on a position of the selected content, identifying a distance from one end of the electronic device to the selected content; and in response to detecting a folding event of the electronic device, displaying the selected content on at least a partial area of a second display among the plurality of displays based on the identified distance,

wherein the at least a partial area of the second display is distanced away from the one end of the electronic device by the identified distance.

12. The method of claim 11, further comprising:

identifying a first distance from the one end of the electronic device to the selected content on the first display;

determining the position of the selected content on the second display, such that a second distance from the one end of the electronic device to the selected content on the second display matches the first distance on the first display, based on detecting the folding event; and displaying the selected content, through the second display, based on the determined position.

13. The method of claim 11, further comprising:

identifying whether a length of the selected content in a second direction on the first display exceeds a threshold length, based on detecting the folding event;

resizing the selected content, according to a length of the second display in the second direction, based on identifying that the length of the selected content in the second direction on the first display exceeds the threshold length; and displaying the resized content, through the second display.

14. The method of claim 11, further comprising:

selecting a content corresponding to the first input and the second input, based on identifying that the position values in the first direction of the first input and the second input are identical; and selecting a content corresponding to a user input closest in distance to one end of the electronic device from among the first input and the second input, based on identifying that the position values in the first direction of the first input and the second input are different.

15. The method of claim 11, further comprising:

identifying position values corresponding to first input and the second input for a first surface and a second surface, respectively, of the first display;

identifying whether the position values in a first direction of the first input and the second input are identical; and selecting a content satisfying a condition associated with content selection from among content respectively corresponding to the first input and the second input, based on identifying that the position values in the first direction of the first input and the second input are identical.

16. The method of claim 15, wherein in selecting the content meeting the condition associated with content selection, the condition associated with content selection includes being a content positioned on a primary surface among the first surface and the second surface, and wherein the method further comprises:

identifying, based on an input pattern for the first display, the primary surface among the first surface and the second surface; and selecting the content positioned on the primary surface from among content respectively corresponding to the first input and the second input.

17. The method of claim 11, further comprising:

displaying a first window and a second window through the first display;

identifying user inputs on the first window and the second window, respectively;

selecting a content corresponding to a user input closest in distance to one end of the electronic device from among the user inputs; and displaying the selected content and a window including the selected content among the first window and the second window, through the second display, based on detecting the folding event.

18. The method of claim 11, further comprising:

based on detecting the folding event, resizing the selected content, according to a length of the second display in a second direction in case that a length of the selected content in the second direction on a first display exceeds a threshold length; and displaying the resized content, through the second display.

19. The method of claim 18, further comprising:

selecting a content corresponding to a plurality of user inputs, in case that position values in a first direction of the plurality of user inputs are identical; and selecting a content corresponding to a user input closest in distance to one end of the electronic device from among the plurality of user inputs, in case that the position values in the first direction of the user inputs are different.

20. One or more non-transitory computer-readable storage media storing one or more computer programs including computer-executable instructions that, when executed by one or more processors of an electronic device individually or collectively, cause the electronic device to perform operations, the operations comprising:

identifying a first input and a second input on a first display among a plurality of displays of the electronic device;

identifying a first position value in a first direction corresponding to the first input and a second position value in the first direction corresponding to the second input on the first display;

identifying whether the first position value in the first direction of the first input corresponds to the second position value in the first direction of the second input;

based on the first position value corresponding to the second position value, selecting a content, displayed where the first input and the second input are input, from among one or more content displayed on the first display;

based on a position of the selected content, identifying a distance from one end of the electronic device to the selected content; and in response to detecting a folding event of the electronic device, displaying the selected content on at least a partial area of a second display among the plurality of displays based on the identified distance, wherein the at least a partial area of the second display is distanced away from the one end of the electronic device by the identified distance.

* * * * *